United States Patent [19]

Springer

[11] Patent Number: 5,426,900
[45] Date of Patent: Jun. 27, 1995

[54] MULTI-PURPOSE HEXAGONAL BUILDING MODULE

[76] Inventor: Robert H. Springer, 1247 Martin Dr., Cincinnati, Ohio 45202

[21] Appl. No.: 849,739

[22] Filed: Mar. 11, 1992

[51] Int. Cl.⁶ .......................... F04B 1/34; A47K 3/22
[52] U.S. Cl. ...................................... 52/79.1; 52/79.4; 52/81.4; 52/236.1; 4/460; 4/610; 4/613
[58] Field of Search ............. 52/71, 79.1, 79.4, 236.1, 52/588, 581, 583, 613, 782, 798, 802, 811, 822, 79.5, 82, 277, 272, 264, 284; 4/460, 610, 611, 613

[56] References Cited

U.S. PATENT DOCUMENTS

| Re. 25,820 | 7/1965 | Macchione | 93/80 |
|---|---|---|---|
| 1,054,961 | 3/1913 | Dean . | |
| 1,625,471 | 4/1927 | Jauch . | |
| 1,806,354 | 5/1931 | Lange . | |
| 1,912,502 | 6/1933 | Stotzer et al. . | |
| 2,402,038 | 6/1946 | Goldman et al. | 154/83 |
| 2,656,064 | 10/1953 | Bues | 52/277 |
| 2,709,400 | 5/1955 | Bugg | 93/80 |
| 3,102,458 | 9/1963 | Schur | 93/80 |
| 3,152,366 | 10/1964 | McCrory et al. | 20/2 |
| 3,284,969 | 11/1966 | Walters et al. | 52/81.4 |
| 3,316,682 | 5/1967 | Natalis | 52/71 |
| 3,395,407 | 8/1968 | Teschner | 52/73 |
| 3,430,543 | 3/1969 | Cunningham | 93/94 |
| 3,513,608 | 5/1970 | Nagrod | 52/82 |
| 3,550,335 | 12/1970 | Huffman | 52/82 |
| 3,769,766 | 11/1973 | Speidel | 52/73 |
| 3,791,080 | 2/1974 | Sjoberg | 52/79 |
| 3,921,354 | 11/1975 | Connelly et al. | 52/237 |
| 4,125,972 | 11/1978 | Pate | 52/284 |
| 4,283,898 | 8/1981 | Claver | 52/309.9 |
| 4,480,414 | 11/1984 | Tschudy et al. | 52/82 |
| 4,546,583 | 10/1985 | Hussar | 52/236.1 |
| 4,680,914 | 7/1987 | Migliore | 52/811 |
| 4,759,158 | 7/1988 | Aubry | 52/79.3 |
| 4,779,388 | 10/1988 | Gibney | 52/71 |
| 5,093,941 | 3/1992 | Muller | 52/79.1 |

FOREIGN PATENT DOCUMENTS

| 0495238 | 4/1992 | European Pat. Off. | 4/613 |
|---|---|---|---|
| 2440443 | 7/1980 | France . | |
| 865800 | 6/1953 | Germany . | |
| 1043396 | 3/1966 | United Kingdom . | |

Primary Examiner—Carl D. Friedman
Assistant Examiner—Winnie Yip
Attorney, Agent, or Firm—Wood, Herron & Evans

[57] ABSTRACT

A multi-purpose hexagonal building module constructed of identically configured panels connected together at lap joints, with each panel having a large flat rectangular section and an integral smoothly curved section. When the panels are interconnected to form a hexagonal module, the relatively large rectangular flat sections collectively constitute the module's six planar walls and the relatively small smoothly curved panel sections function as rounded module corners. The module can be disposed with its central symmetrical axis vertical or horizontal, and can be used as a housing unit or as a container for product storage. The module, whether used for storage or as a living unit, and whether disposed horizontally or vertically, can be permanently mounted at a single site or made mobile by mounting on a vehicle or ship for transport across land or water. The module is relatively inexpensive in terms of cost of material and assembly, exhibits substantial structural strength against loads of various types in an axial, horizontal, or torsional direction, and is readily erected with simple tools and without special skills. The modules can be stacked vertically to form a multi-level building, arranged compactly in a tightly nested honeycomb arrangement, or spaced horizontally and interconnected by filler panels for a more expansive building.

35 Claims, 55 Drawing Sheets

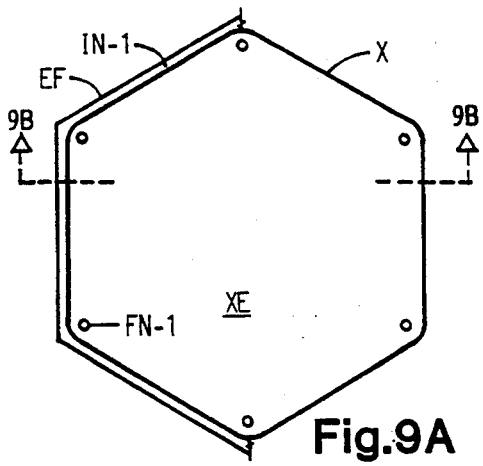
Fig.9A
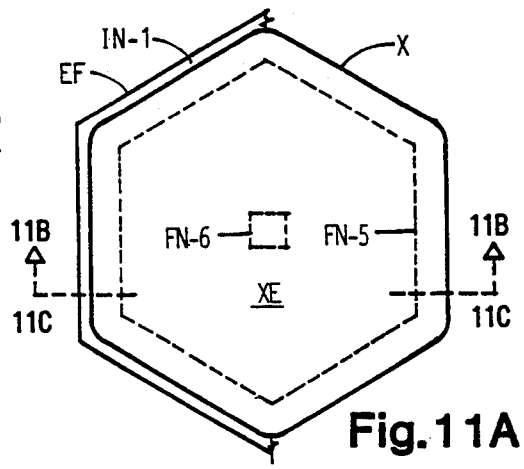
Fig.11A
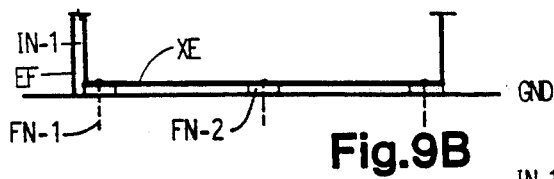
Fig.9B
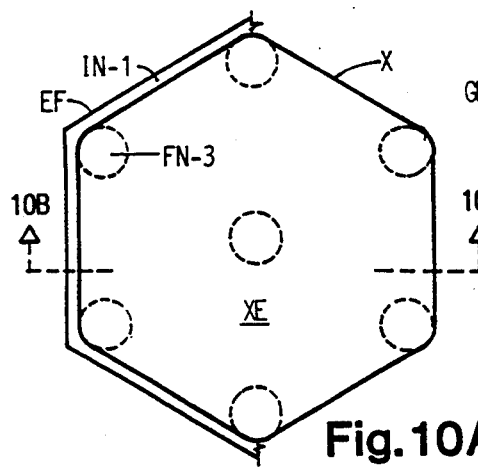
Fig.10A
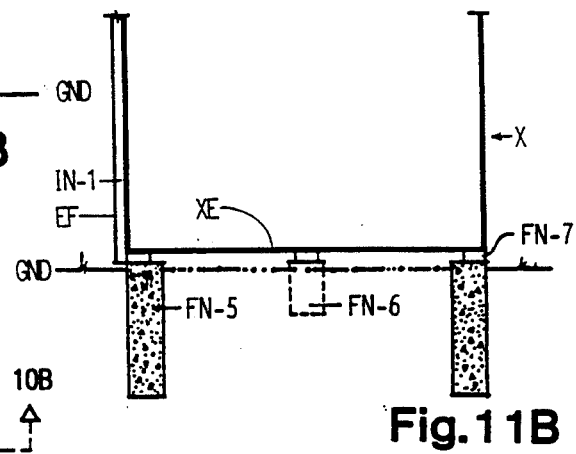
Fig.11B
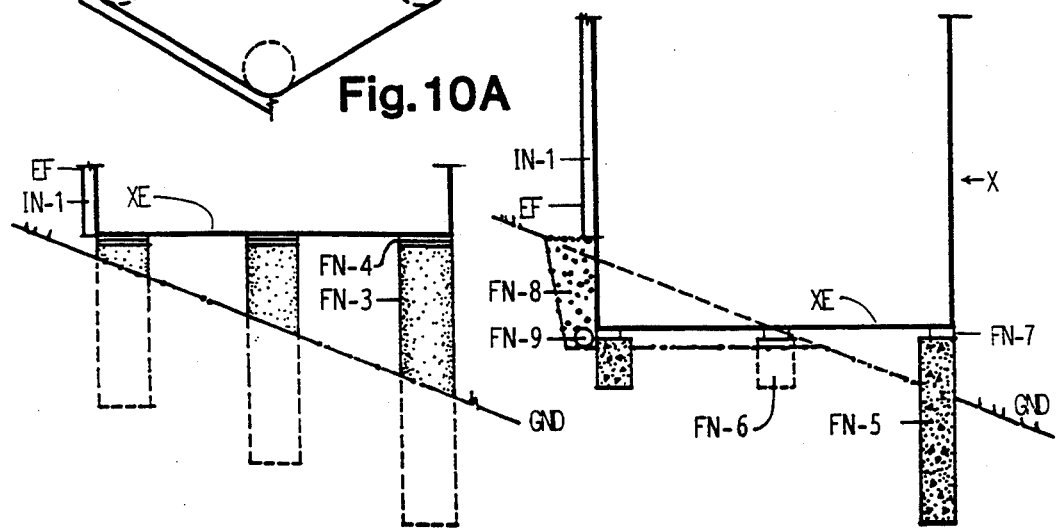
Fig.10B
Fig.11C

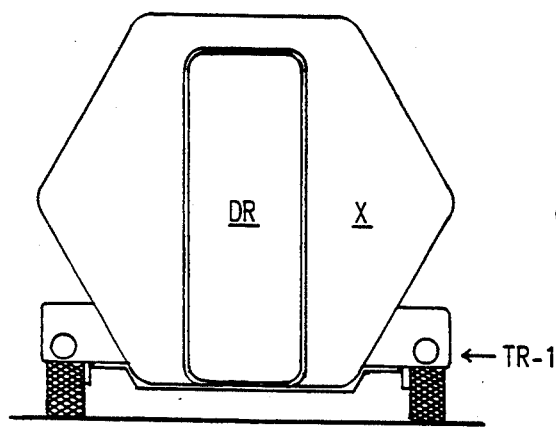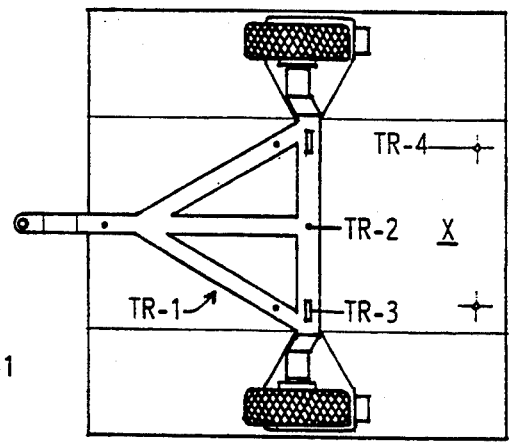
Fig.68A  Fig.68B
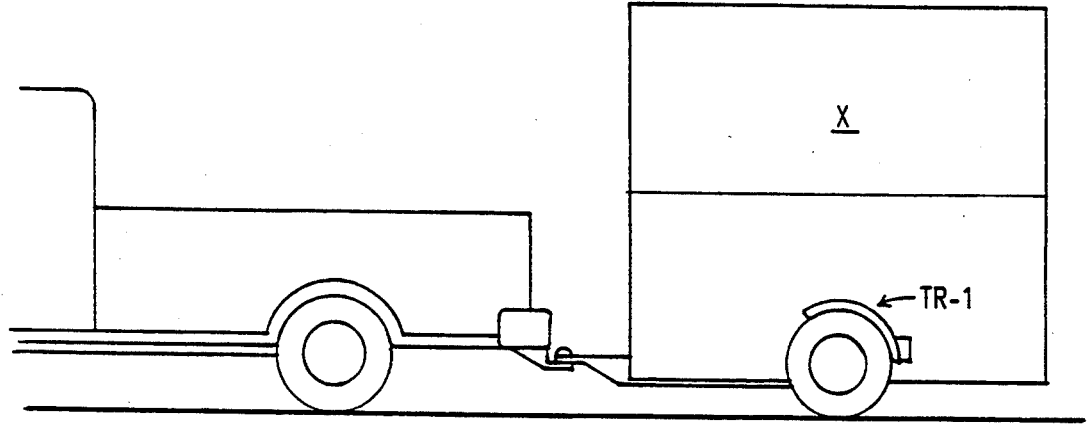
Fig.68C
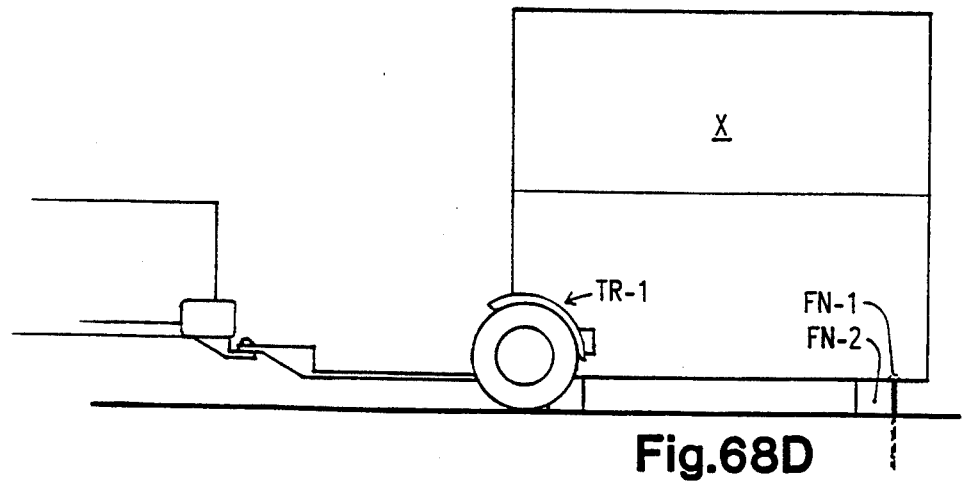
Fig.68D

MULTI-PURPOSE HEXAGONAL BUILDING MODULE

BACKGROUND OF THE INVENTION

This invention relates to modular structures, and more particularly to hexagonal building modules which are easily assembled of relatively low cost materials and adaptable for a wide variety of uses including living units, work spaces, equipment enclosures and containers for shipping or storage.

The need for low cost easily transported and readily assembled structures has been a known consideration for many, many years. Such is useful in providing housing and ancillary facilities in timely response to major migrations of people. Whether these needs are caused by political, economic or climatic changes, by wars or revolutions, by natural disasters, or by innate inclinations to seek a better life in another place, the availability of safe and sanitary housing remains the most persistent of unmet human needs (a crisis now compounded by global population growth of 92 million people a year). Even in the relative affluence of suburban USA, the shortage of storage space is pervasive, and an extra bathroom may often save a marriage. Diverse groups such as armed forces, prisoners, construction crews, miners, field hands, cinematographic crews and geophysical scientists must be sheltered and sustained, often in remote and hostile environments, and often without recourse to conventional construction methods.

While modular building units are well known, those that have existed have not been entirely satisfactory for the above-described purposes. For example, components used to construct the individual modules have often required many specialized parts, such as specialized wall constructions, corner constructions, etc. Often, specialized machinery or tooling is required to construct them. In many cases, the components are heavy, bulky, and uneconomical to erect, and do not store compactly for shipment in unassembled form. A further disadvantage of known building modules is that they do not exhibit substantial strength against a wide variety of loads including vertical, horizontal and torsional loads. Many make no provisions for thermal insulation when required. A further disadvantage of existing building modules is that they lack a high degree of flexibility in terms of the various applications and functions for which they can be used or are suited.

Accordingly, it has been an objective of this invention to provide a building module which obviates the aforedescribed disadvantages of known modular building constructions. This objective has been accomplished in accordance with certain of the principles of this invention by providing a building module which is of hexagonal tubular configuration and preferably provided with hexagonal planar panels at opposite ends. In one preferred embodiment of the invention, the six generally planar walls of the hexagonal tubular building module are integral, the module being formed by spirally wrapping and gluing, in slightly overlapping relation, multiple plies of wood or fibrous composite veneers around a rotating hexagonal cross-section mandrel. The same result can be achieved through convolute wrapping of the plies instead of spiral wrapping. In either case, the mandrel configuration is slightly rounded along the six axially parallel edges to provide a slightly rounded shape to the six corners of the module which otherwise consists of six planar rectangular walls. Adhesive is provided between the wood or fibrous composite veneer plies of the the hexagonal tubular building module to provide a rigid construction which retains its hexagonal shape. In another embodiment of the invention, the hexagonal tubular building module is constructed of six substantially identical individual panels which are interconnected in the desired hexagonal configuration by lapped joints provided by cooperating internal and external rabbets along the vertical edges of adjacent panels. The individual panels each include a relatively large rectangular flat section and a relatively small smoothly curved section along each of two parallel edges. When the panels are hexagonally arranged and interconnected along their curved edges by lap joints, the flat sections of the panels constitute the planar walls of the hexagonal building module while the smoothly curved edge sections of the panels constitute rounded corners of the module. The lap joints between adjacent panels, which are preferably located in the centers of the rounded corners, are each constituted by an internal rabbet formed along the edge of one of the panels and an external rabbet formed along the confronting edge of the next panel. In a preferred form, the rabbetted edges of the panels are provided with aligned holes to facilitate convenient interconnection with rivets or other fasteners when the panels are lapped along their edges to form an hexagonal module.

Preferably, the hexagonal building module is provided with an end wall of hexagonal configuration at each end. The end panels are provided on their opposite faces with a liquid-impervious membrane. The membranes are hexagonal and slightly larger than the end panels to provide margins which extend beyond the edge of end panels. Both membrane margins are folded inwardly with the outer margin extending over the edge of the hexagonal tubular wall section, as well as around a marginal outer portion of the hexagonal tubular wall section adjacent to the edge. The inner and outer membrane margins intimately contact the inner and outer marginal portions of the hexagonal tubular wall section adjacent to the edge. The margin of the outer membrane is larger than that of the inner membrane to enable the edges of the respective membranes to lie in substantially the same plane when they are folded. Collectively, when cemented and sealed with appropriate sealant, the outer and inner membrane margins provide a strong and liquid-impervious seal at the joint formed by the end panels and the tubular wall section.

The hexagonal building modules of this invention, whether of integral construction or interconnected panel construction, exhibit a very high degree of strength against horizontal, vertical, and torsional loading, and do so with a minimum of bulk and weight. The modules can be compactly nested in honeycomb fashion, if desired, or horizontally spaced with their central symmetrical axis disposed vertically in an array of any desired configuration, with the spaced modules interconnected by flat filler panels, providing enormous flexibility in building design. Windows and/or doors can be provided in the panels 1where desired for light or ingress/egress. The hexagonal modules can also be stacked vertically to form a multi-level building with floors and roofs spanning between and supported by modules where desired. When needed, spiral stairways or elevators can be located within two or more of the modules to provide access to the different levels of the stacked array.

The individual panels which are used in constructing the fabricated panel hexagonal module, stack very compactly in nesting relationship for shipping. Once at the building site, the individual panels can be readily erected and secured in lapped relation to construct the hexagonal building module. Preferably, the panels are fabricated of wood or composite veneers, with $4' \times 8' \times \frac{3}{4}''$ sheets being the desired dimensions from the standpoint of convenience in shipping, handling, erection and initial fabrication. Panels of these dimensions provide a fabricated panel module having a diameter and axial dimension which are each approximately 8'. Of course, other sheet materials and dimensions may be used. In the integral mandrel-wound tubular construction, the walls can be thinner and are preferably $\frac{1}{2}''$ thick and the six integral rectangular side walls each approximately $4' \times 8'$ in size, providing for the entire module a diameter and axial dimension of approximately 8' each.

The hexagonal modules can be equipped for a wide variety of uses including bathroom, bedroom, store room, closet, kitchen, latrine, work spaces, stairs and the like. As appropriate to interior use and desired appearance, each module can be fitted with doors, windows, louvers or hatches in a large selection, shapes and styles. The building modules are susceptive of use with a wide range of roof constructions to provide a variety of different building appearances. Roof constructions can be provided with gutters and down spouts to facilitate convenient draining of precipitation, and with ventilation systems and skylights, as desired. Further, a variety of foundation schemes can be employed to secure the module to the ground or other support surface.

If desired, flat panels of rigid insulation can be provided on the exterior walls of the building modules, and the walls clad in exterior finish sheathing to enhance the appearance of the module and protect the insulation against weather. Wood, metal, masonry veneer and many versions of a type of cladding, known as E.I.F.S. (Exterior Insulation and Finishing Systems) are currently used in the construction industry.

The hexagonal building module can be arranged with its central symmetrical axis disposed vertically or horizontally, and can be mounted at one site on temporary or permanent foundations; or can be placed on a vehicle, ship, or plane for transportation as desired. When sealed and finished for the purpose, the modules can be linked together, floated and towed to their destination on the waterways of the world. In either orientation, and whether permanently located or mobile, the module can be used for equipment housing, storage, a work space, or as a living unit.

BRIEF DESCRIPTION OF THE DRAWINGS

These and other features, advantages and objectives of the invention will become more readily apparent from a description of the preferred embodiments thereof taken in conjunction with the drawings in which:

FIG. 9A is a top plan view of a module secured to the ground with stakes or the like driven through the module floor and leveling blocks located between the floor and the ground, or a flat rooftop, a pavement, etc.

FIG. 9B is an cross section view of the module of FIG. 9A.

FIG. 10A is a top plan view of a module mounted on piers.

FIG. 10B is an cross section view of the module of FIG. 10A.

FIG. 11A is plan view of a module mounted on level ground on a hexagonally shaped foundation wall and a centrally located pier.

FIG. 11B is a cross section view of the module of FIG. 11A mounted on level ground.

FIG. 11C is a cross section view of a module mounted on sloping ground on a hexagonally shaped foundation and a centrally located pier with gravel backfill and a drain tile on the uphill side.

FIG. 68A is a vertical end view of a hexagonal building module disposed with its longitudinal axis parallel to the ground and equipped as a mobile building unit.

FIG. 68B is a bottom plan view of the module of FIG. 68A.

FIG. 68C is a side elevational view of the building unit of FIGS. 68A and 68B shown attached to a tow vehicle.

FIG. 68D is a side elevational view of the mobile building unit of FIGS. 68A, 68B and 68C shown supported on blocks prior to complete removal of the undercarriage.

FIG. 72B is rear elevational view of the truck/food service unit of FIG. 72A.

FIG. 72C is a top plan view of the truck/food service unit of FIGS. 72A and 72B.

FIG. 72D is a side elevational view of the truck/food service unit of FIG. 72A, 72B and 72C.

FIG. 73A is a front elevational view of a truck having mounted on its contoured bed a horizontally disposed hexagonal building module of this invention for use as a cargo container.

FIG. 73B is a rear elevational view of the truck/cargo container of FIG. 73A.

FIG. 73C is a top plan view of the truck/cargo container of 73A and 73B.

FIG. 73D is a side elevational view of the truck/cargo container of FIG. 73A, 73B and 73C.

FIG. 74A is a front elevational view of a multi-purpose truck having mounted on its contoured bed a horizontally disposed hexagonal building module of this invention equipped with two doors and a roof hatch.

FIG. 74B is a rear elevational view of the truck with attached module shown in 74A.

FIG. 74C is a top plan view of the truck with attached module shown in FIGS. 74A and 74B.

FIG. 74D is a side elevational view of the truck with attached horizontally disposed module shown in FIGS. 74A, 74B and 74C.

FIG. 75A is a cross sectional view along line 75A—75A of FIG. 75B.

Figure 75A:
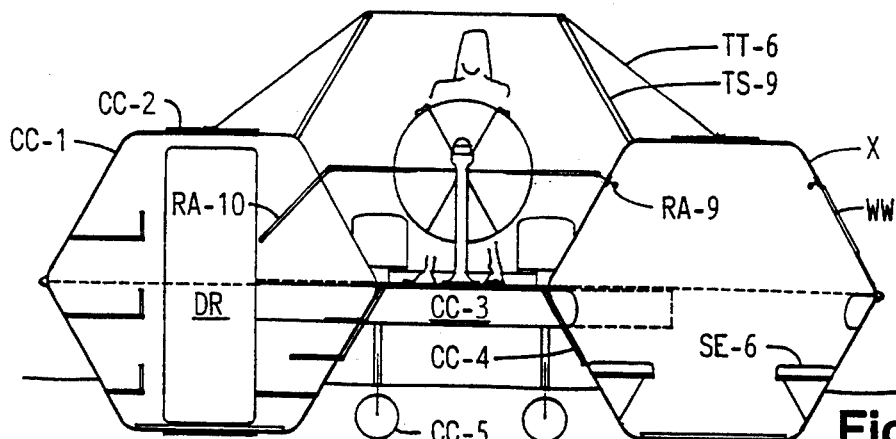
Figure 75B:
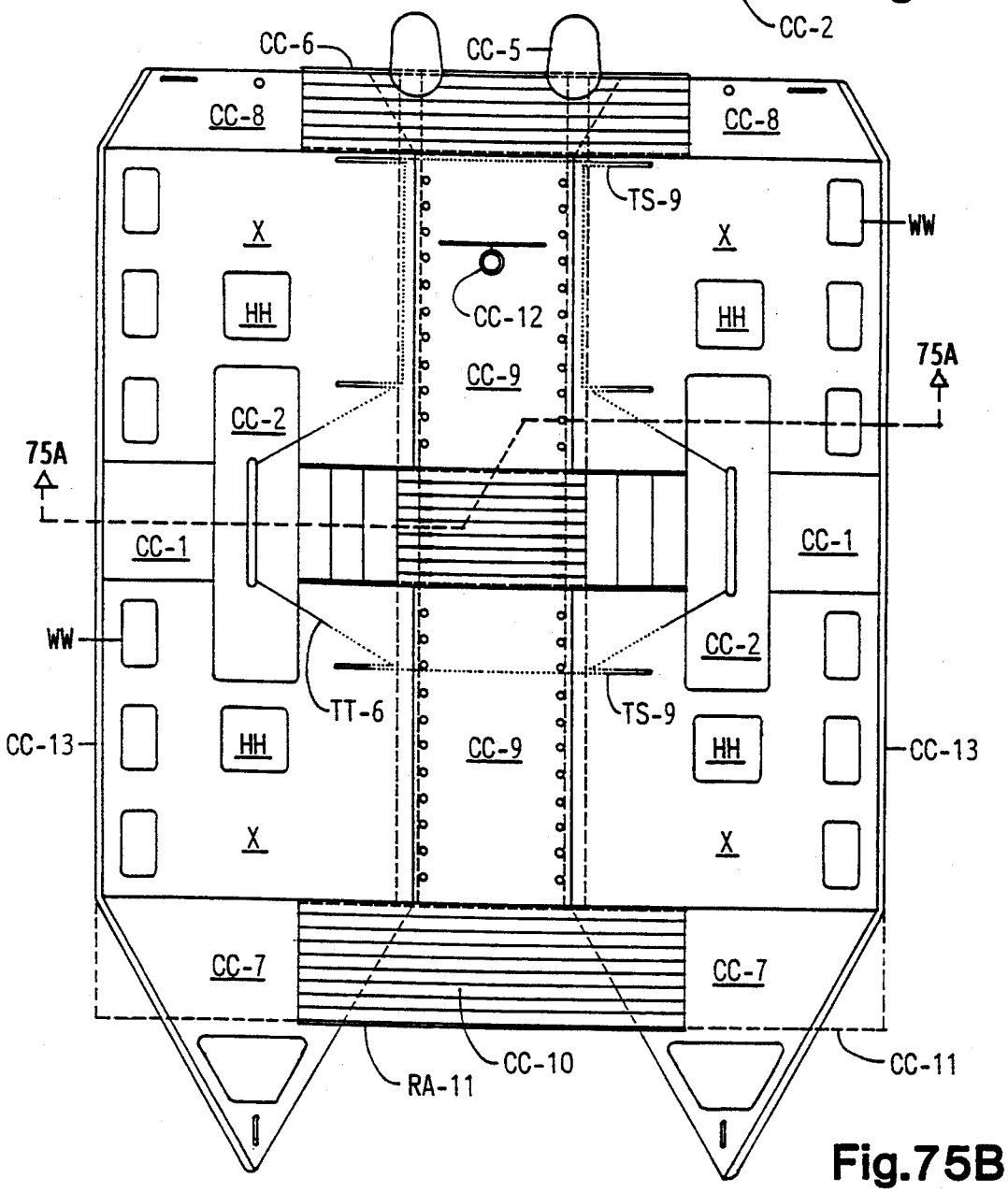

FIG. 75B is a top plan view of a dual pontoon or catamaran/style boat in which the pontoons are fabricated of plural coaxial horizontally disposed hexagonal modules of this invention with various deck panels and canopies spanning the hexagonal building modules of the pontoons to accommodate passengers, or cargo, crew and means of propulsion.

Figure 76A:
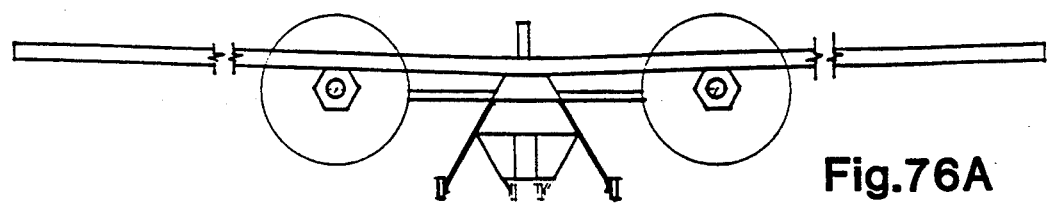

FIG. 76A is a front elevational view of an airplane having a contoured fuselage capable of holding a plurality of axially arranged horizontally disposed hexagonal modules of this invention for cargo or troop or module transport purposes, but with the modules being removed from the fuselage.

Figure 76B:
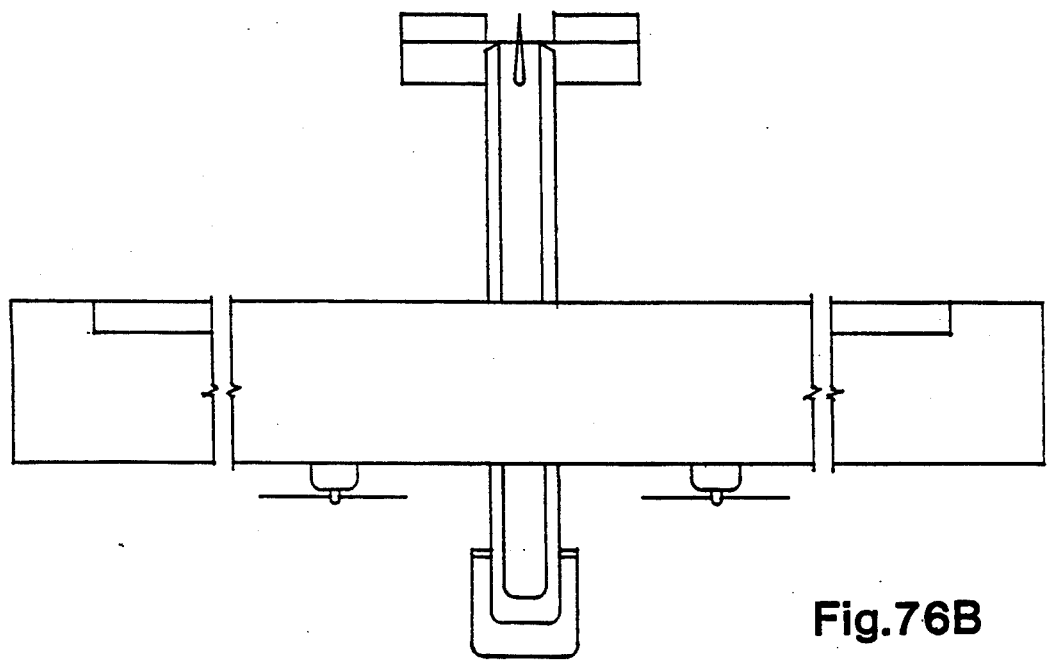

FIG. 76B is a top plan view of the plane shown in 76A.

Figure 76C:
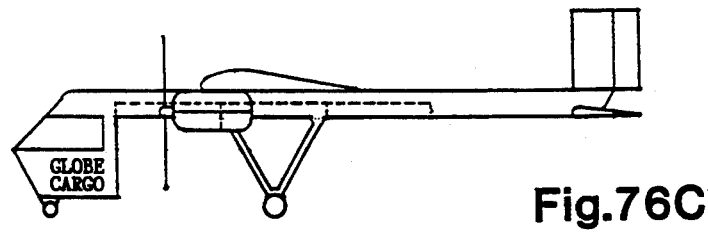

FIG. 76C is a side elevational view of the plane shown in 76A and 76B.

Figure 77A:
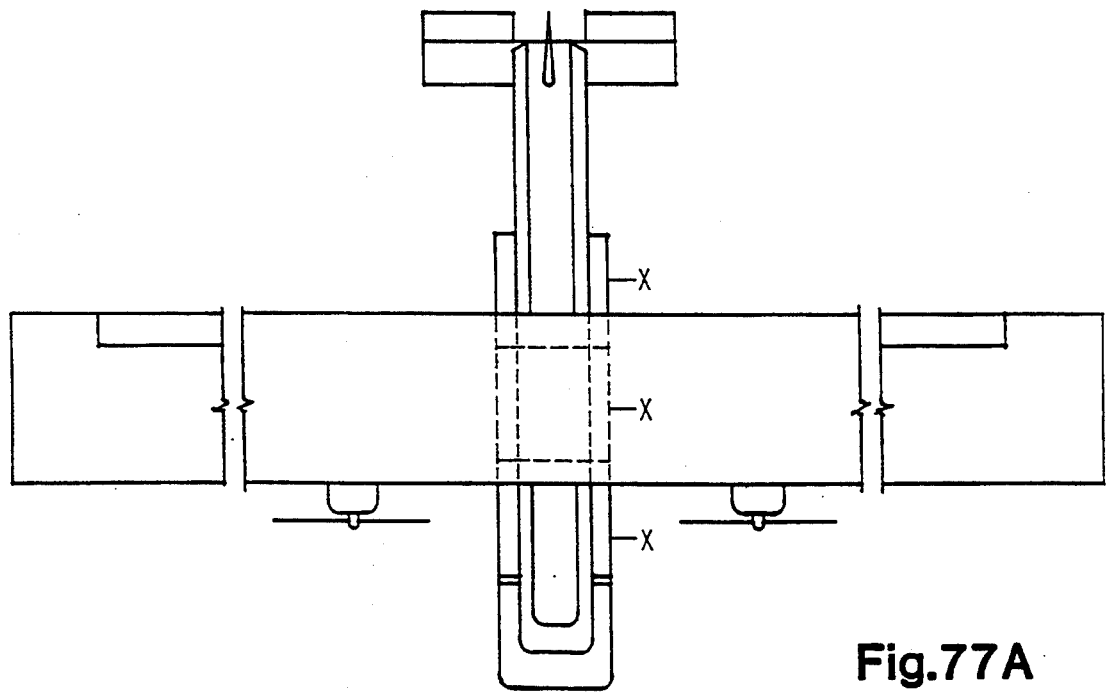

FIG. 77A is a top plan view of the plane shown in FIG. 76B wherein the three axially arranged horizontally disposed hexagonal building modules of this invention are secured to the fuselage.

Figure 77B:
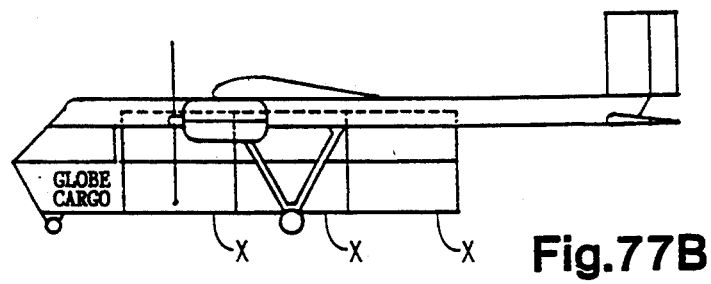

FIG. 77B is a side elevational view of the plane shown in 77C with the three axially arranged horizontally disposed hexagonal building modules secured to the fuselage.

DETAILED DESCRIPTION OF THE DRAWINGS

Figure 1:
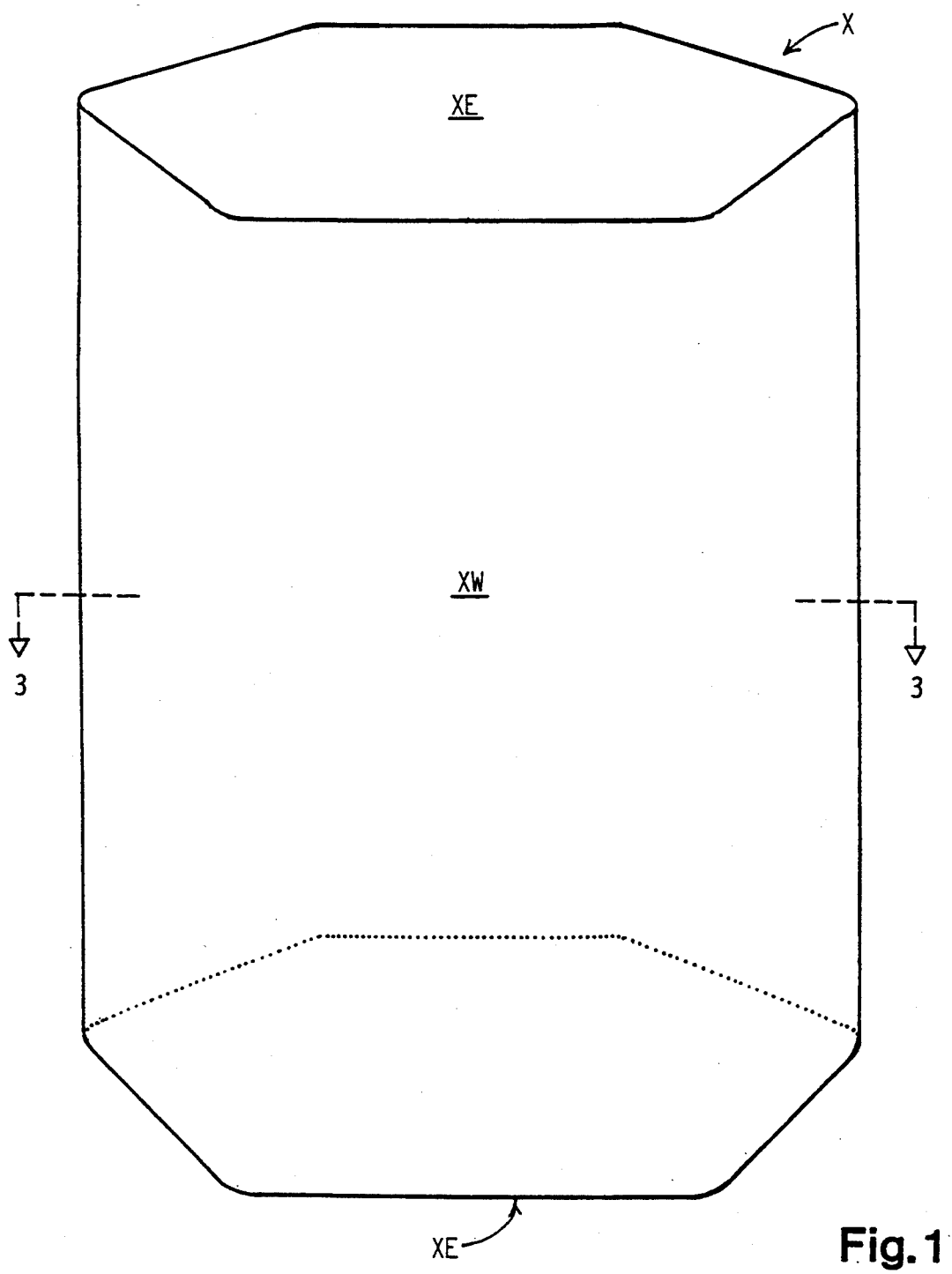
FIG. 1 is a perspective view of the hexagonal building module of this invention having panels at its opposite ends, the module being shown disposed with its longitudinal axis of symmetry in a vertical direction.

With reference to FIG. 1, the hexagonal building module X of this invention, which is shown with its axis of symmetry vertically disposed, is seen to include a tubular wall section XW having a generally hexagonal cross-section, an upper and lower hexagonal end panels XE, as will become more apparent hereafter, the building module X can be provided with windows, doorways, hatches, and the like as desired for a wide range of uses, including storage, living units, and work spaces. The hexagonal building module X can be disposed vertically as shown in FIG. 1, as well as horizontally as shown in FIGS. 50–77, or any other orientation as desired. A vertical disposition is assumed in the detailed description of components of the hexagonal building module X illustrated in FIGS. 1 through 5 and FIGS. 7 through 49. A tubular wall section XW can be fabricated of identically constructed individual wall panels XWA as shown more particularly in FIGS. 2, 3, 4 and 5, or can be constructed as an integral tubular member shown in FIG. 7 using the machine of FIG. 6. A building module X can be mounted on level or sloping terrain in several different manners as shown more particularly in connection with FIGS. 9, 10 and 11, to be described. A variety of roof constructions for use in connection with the hexagonal building module X as shown more particularly in FIGS. 39, 40, 41 and 42, for example, to be described hereafter. The building modules can be stacked vertically to provide a variety of different building constructions as will be described in more detail hereafter in connection with FIGS. 25, 26, 27, 41 and 49.

With reference to FIGS. 2A and 2B, FIG. 3, FIG. 4 and FIG. 5, a preferred embodiment of the tubular wall section XW of the hexagonal building module X of this invention is seen to include six panels XWA of a novel and unobvious construction to be described in more detail hereafter. Panels XWA are substantially rectangular, having a rectangular flat section XWA' bordered by smoothly rounded one-half corner sections XD-1 and XD-2 and by rabbeted edges XD-11 & XD-12 on opposite vertical sides thereof. The panels XWA are connected to each other along their vertical edges at lap joints XD-4. Thus, the fabricated panel hexagonal building module wall section XW consists of six substantially flat rectangular sections XWA between which are located rounded corner sections formed by lapped one-half corners XD-1 and XD-2. Suitable fasteners XD-3', such as pop rivets or threaded fasteners, secure the lapped edges XD-11 and XD-12 of adjacent panels XWA to maintain the six wall panels in the hexagonal configuration shown in FIG. 1. Preferably, the module also includes flat hexagonal end caps XE which are secured to the upper and lower horizontal edges of the panels XWA by suitable means to be described hereafter.

Figures 2A, 2B:
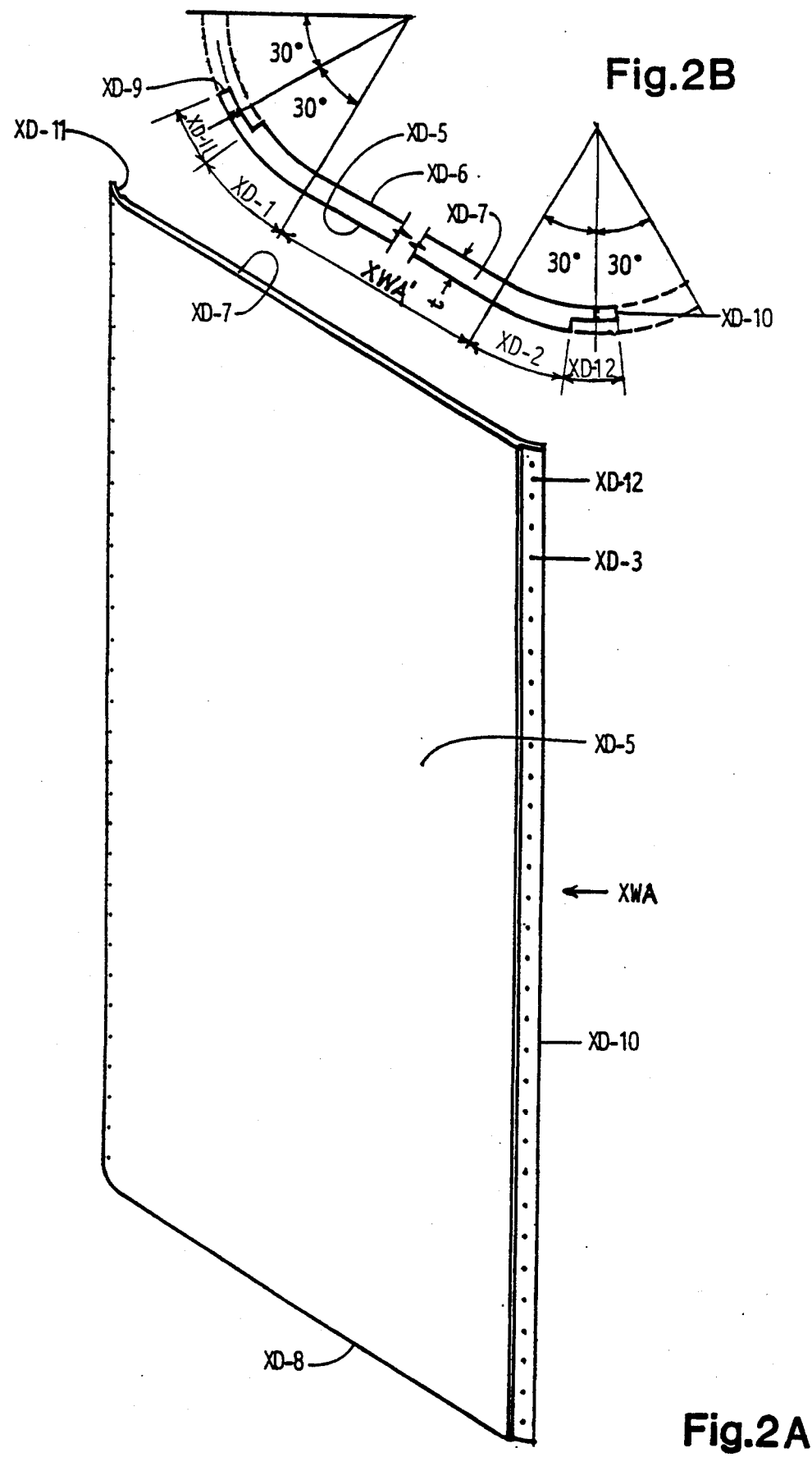
FIG. 2A is a perspective view of one embodiment of one of the basic panels used in constructing the fabricated panel version of hexagonal building module.
FIG. 2B is a top plan view of the panel of FIG. 2A.

With reference to FIG. 2B and FIG. 2A, which is a perspective view of one of the building panels XWA, the panel XWA is seen to include a first or outer surface or face XD-5 and a second or inner surface or face XD-6. The panel XWA is generally rectangular consisting of an upper edge XD-7 and a lower edge XD-8 which are substantially parallel to each other. Extending between the upper edge XD-7 and lower edge XD-8 are parallel vertical edges XD-9 and XD-10. The vertical edges XD-9 and XD-10 are substantially perpendicular to the upper and lower horizontal edges XD-7 and XD-8. The panel XWA consists of a rectangular section XWA' which is substantially flat, integral and contiguous smoothly curved sections XD-1 and XD-2, and integral and continuous curved inside and outside rabbeted sections XD-11 & XD-12. Curved section XD-1 terminates at its left (as viewed in FIG. 2) edge in an internal rabbet XD-11, while rounded panel section XD-2 terminates at its right (as viewed in FIG. 2) edge in an external rabbet XD-12. Internal rabbet XD-11 proximate the left vertical edge XD-9 includes a shoulder and a face which runs substantially along the entire length of the edge XD-9. The rabbet face is parallel to the inner and outer surfaces or faces XD-5 and XD-6. The depth of the shoulder is approximately one-half the thickness t of the substantially flat section XWA'; and curved corner XD-1 and XD-2 of the panel XWA. The external rabbet XD-12 consists of a shoulder which runs along the length of the corner section XD-2 and a face which runs along the length of the rounded one-half corner section. The shoulder is perpendicular to the outer face XD-5 and inner face XD-6 of the rounded one-half corner section XD-2 at the point where it intersects the outer face XD-7. The face of the external rabbet XD-12 is perpendicular to the shoulder and generally parallel to the outer face XD-5 and inner face XD-6 in the region of the marginal vertical edge XD-10 of the panel XWA. The thickness of the shoulder of rabbet XD-12 is equal to the thickness of the shoulder of rabbet XD-11. Similarly, the widths of the faces of internal rabbet XD-11 and of external rabbet XD-12, measured in a horizontal direction, are equal.

Figure 3:
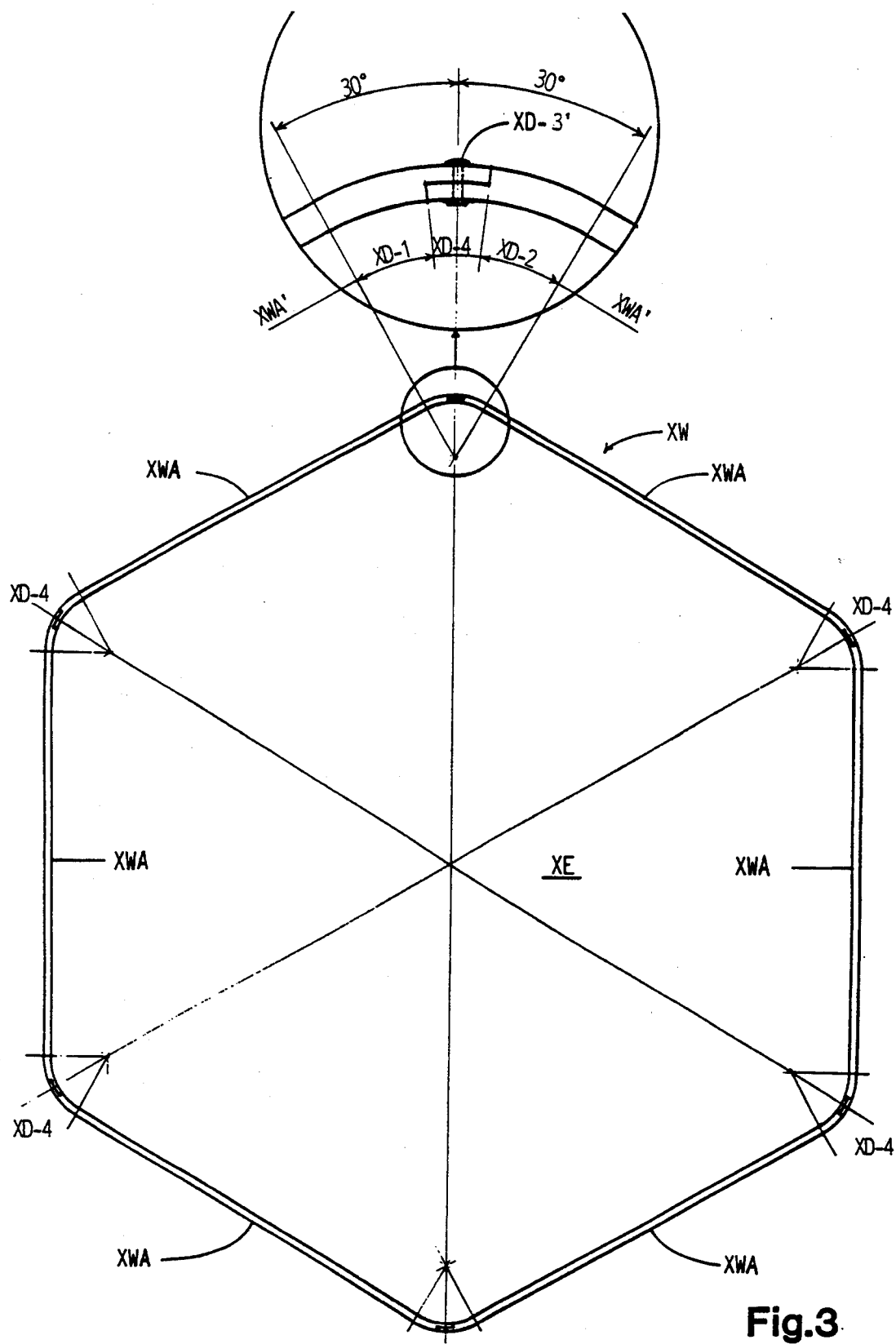
FIG. 3 is a top plan view of the fabricated panel version of the hexagonal building module.
Figure 4A:
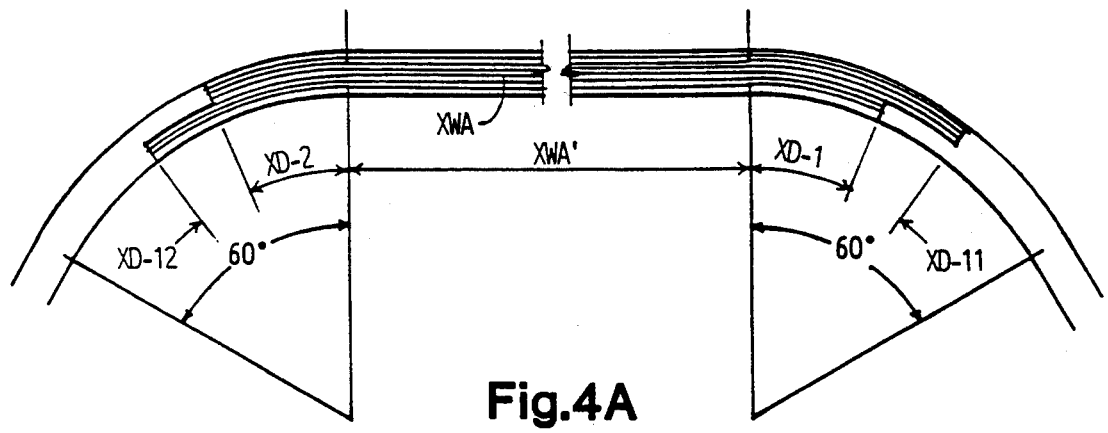
FIG. 4A is an enlarged top plan showing the centered corner location of the lap joints formed by the panel of FIG. 2A when it is connected to similar panels disposed on its opposite sides in the construction of the fabricated panel hexagonal building module shown in FIG. 3.

As is apparent from FIG. 3, the edge of the substantially flat section XWA' and the edge of the smoothly curving section XD-2, which meet at an imaginary vertical line L-1 are integral with each other. Similarly, the edge of rectangular section XWA' of panel XWA and its associated edge of one-half corner section XD-1 meet at an imaginary line L-2. The rounded corner section collectively defined by rounded corner sections XD-1 and XD-2 and lap joints XD-4 subtends in an angle of approximately 60°. As shown in FIG. 4A and the corner detail of FIG. 3, the panel XWA comprises a flat rectangular section XWA' bordered on each side with a smoothly rounded curved section. The left curved section (FIG. 4A) is identified as XD-2 plus rabbet XD-12, while the right curved section is identified as XD-1 plus rabbet XD-11. As shown in FIG. 4A, a subtended arc of 30° is provided for the corner between a) the center of the rabbet XD-12 and b) an imaginary line L-1 at the junction of curved section XD-2 and the flat panel section XWA'. Similarly, a subtended arc of 30° is provided for the corner between a) the center of the rabbet XD-11 and b) an imaginary line L-2 at the junction of curved section XD-1 and the flat panel section XWA'. Referring to the detail of the corner shown in FIG. 3, the lap joint XD-4 is clearly shown as established by the overlapped rabbets of adjacent panels. In the preferred embodiment, the overall length of the panel measured between the upper and lower edges XD-7 and XD-8 is eight feet, while the overall width measured in the horizontal direction between the vertical edges XD-9 and XD-10 is four feet, enabling the panel XWA to be fabricated in a similar manner as commercially available four foot by eight foot sheet material, preferably seven-ply plywood. In the preferred embodiment, the thickness t of the panel XWA is approximately three-quarters of an inch.

Through holes XD-3 in spaced vertical alignment, preferably on four inch centers, are provided in internal and external rabbets XD-11 and XD-12 passing entirely through their respective faces. Preferably, the through holes XD-3 are placed centrally in each rabbet between the shoulder and the outer edge of the panel. The vertical elevations of the through holes XD-3 on each rabbet section XD-11 and XD-12 correspond such that when adjacent panels XWA are formed into lap joint XD-4, the holes XD-3 proximate the right vertical edge XD-10 of one panel will be in alignment with the holes XD-3 proximate the left edge XD-9 of the adjacent panel, with the shoulder of the external rabbet XD-11 of the one panel being in snug engagement with the outer edge of the internal rabbet XD-12 of the adjacent panel and face of the external rabbet of the one panel in snug engagement with the face of the internal rabbet of the adjacent panel. With the holes XD-3 of adjacent panels so aligned, when a lap, joint XD-4 is formed in the manner indicated, suitable fasteners XD-3' such as pop rivets, threaded fasteners or the like, will easily pass through the aligned holes associated with the cooperating inner and outer rabbets of the adjacent panels, enabling the right edge XD-10 of one panel to be securely and conveniently fastened to the left edge XD-9 of the adjacent panel. For a permanent assembly this lap joint will also be glued as well as riveted.

If desired, the rabbet XD-11 associated with the outer vertical edge XD-9 of the corner section XD-1 could be an internal rabbet and the rabbet XD-12 associated with the outer edge XD-10 could be an external rabbet. Regardless of which edge has the internal rabbet and which has the external rabbet, the resulting lap joint XD-4 between adjacent panels is structurally identical.

In the preferred form of the invention wherein the length and width of the panels XWA are eight feet and four feet respectively, the width of the lap joint between the adjacent panels is approximately one and one-half inches.

Figure 4B:
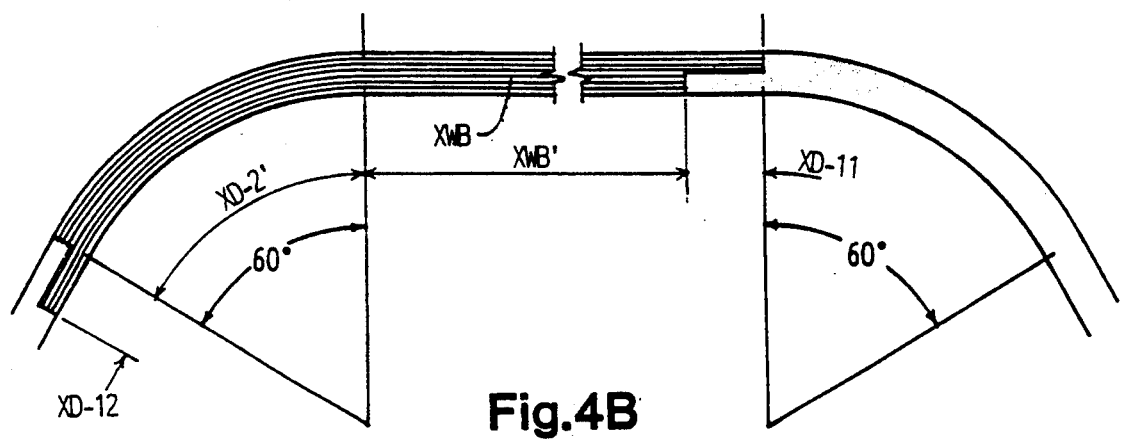
FIG. 4B is a view similar to that of FIG. 4A showing lap joint locations for a modified form of the basic wall panel of this invention when used to construct a fabricated panel hexagonal module.

FIG. 4A depicts the relationship, with respect to the corners of the fabricated panel hexagonal module XW, the orientation of the external rabbet XD-12 and internal rabbet XD-11 of the panel XWA for panels of the type depicted in FIGS. 2 and 3. In accordance with a modified form of the panel of this invention depicted in FIG. 4B, the 60° curvature collectively provided by adjacent curved sections XD-1 and XD-2 and lapped rabbet sections of the module XW can be located solely along one vertical edge of the panel XWB, such as along edge XD-10, as shown in FIG. 4B. When this is done, the panel XWB is seen to include a planar flat section XWB', a smoothly curved section XD-2' which subtends an angle of 60°. The curved section XD-2' has extending from its left edge as seen in FIG. 4B, the external rabbet XD-12. Constituting the right of the rectangular panel XWB is the internal rabbet XD-11.

Figure 4C:
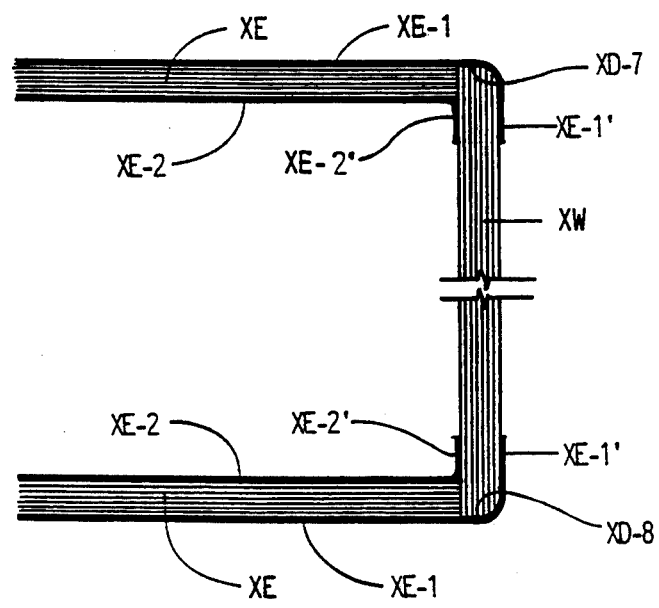
FIG. 4C is a vertical cross-sectional view of a portion of the module of FIG. 1 showing the joint formed by the floor and ceiling panels or end caps, including the inner and outer membranes thereof, and a side wall panel of the hexagonal module.
Figure 5:
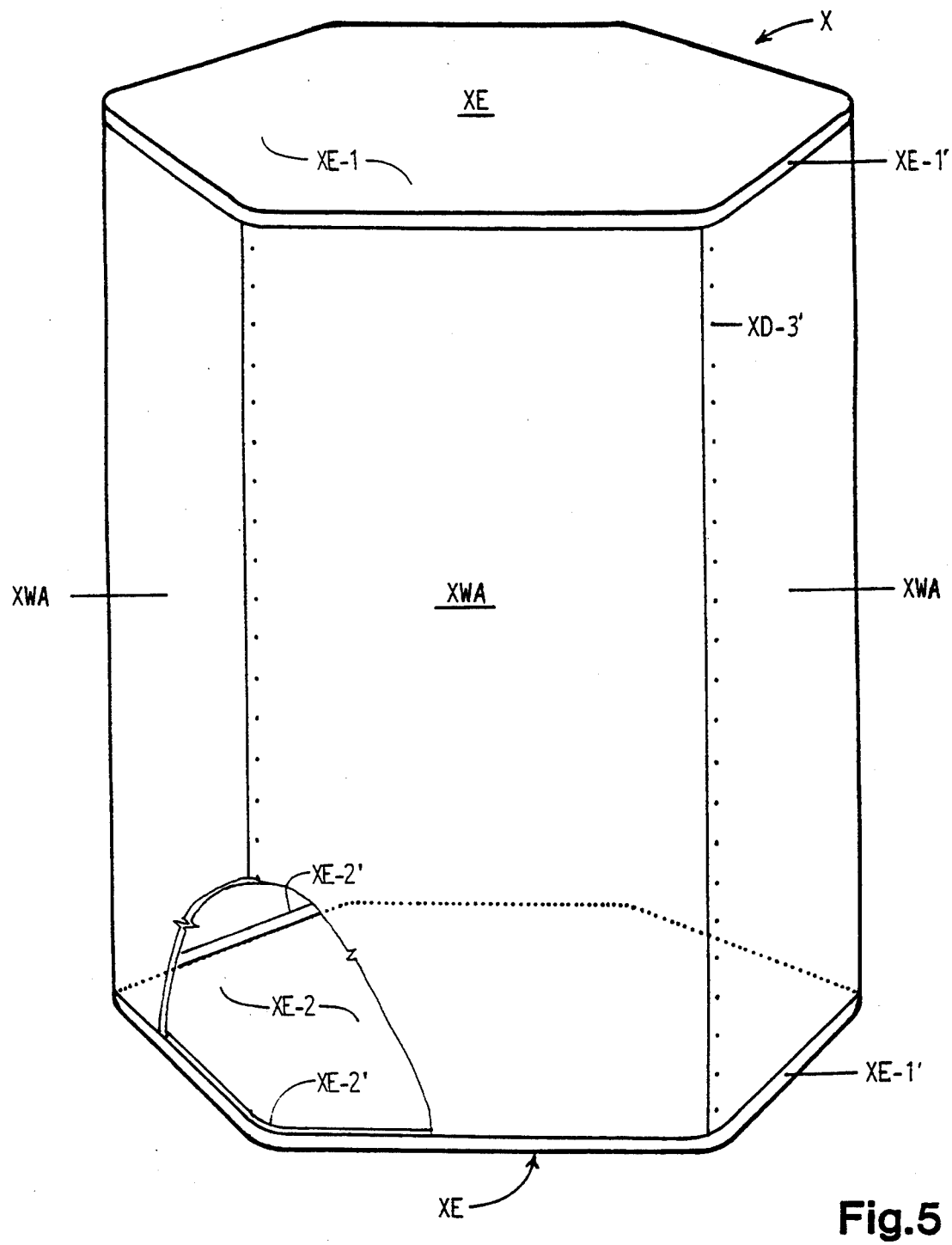
FIG. 5 is a perspective view of a vertically oriented fabricated panel hexagonal building module, showing the six wall panels, two end panels each with inner and outer membranes, and 144 fasteners on 4" centers.

With reference to FIG. 4C the upper and lower hexagonal end caps or panels XE are seen to each include an outer liquid-impervious membrane XE-1 and an inner liquid-impervious membrane XE-2. The outer and inner membranes XE-1 and XE-2 are each generally hexagonal in shape with the outer membrane being slightly larger than the inner membrane for reasons to become apparent hereafter. The outer marginal region XE-1' is folded inwardly such that it extends over the upper edge XD-7 of the wall panels XW of the module X as well as around a portion of the panels XWA of the module XW adjacent the upper edge XD-7. The outer marginal XE-1' of the outer membrane XE of the lower ended cap is similarly turned inwardly to snugly embrace the lower edge XD-8 of the wall panels XWA of the module XW and a portion of the lower outer face XD-5 of the panels XWA adjacent the lower edge XD-8. The marginal edge XE-2' of the inner membrane XE-2 associated with both the upper end cap XE and the lower end cap XE is turned inwardly to snugly embrace portions of the inner surface XD-6 of the panels XWA constituting module wall XW approximate the edges of the upper and lower end caps XE. The edges of the outer and inner membranes XE-1 and XE-2 are located in approximately the same horizontal plane. The membranes XE-1 and XE-2 can be fabricated of a variety of liquid-impervious materials including cast, vacuum formed or blow molded fiber-reinforced resin composites. The membranes XE-1 and XE-2 can be secured to the end caps XE using suitable adhesives, and their outer margins XE-1' and XE-2' may be secured to the wall panels XWA of module X in a similar manner using adhesives, thereby providing a strong and liquid-impervious seal at the joint defined by the peripheral edge of the end caps XE and the upper and lower edges of the wall panels XW of module X.

Figure 6A:
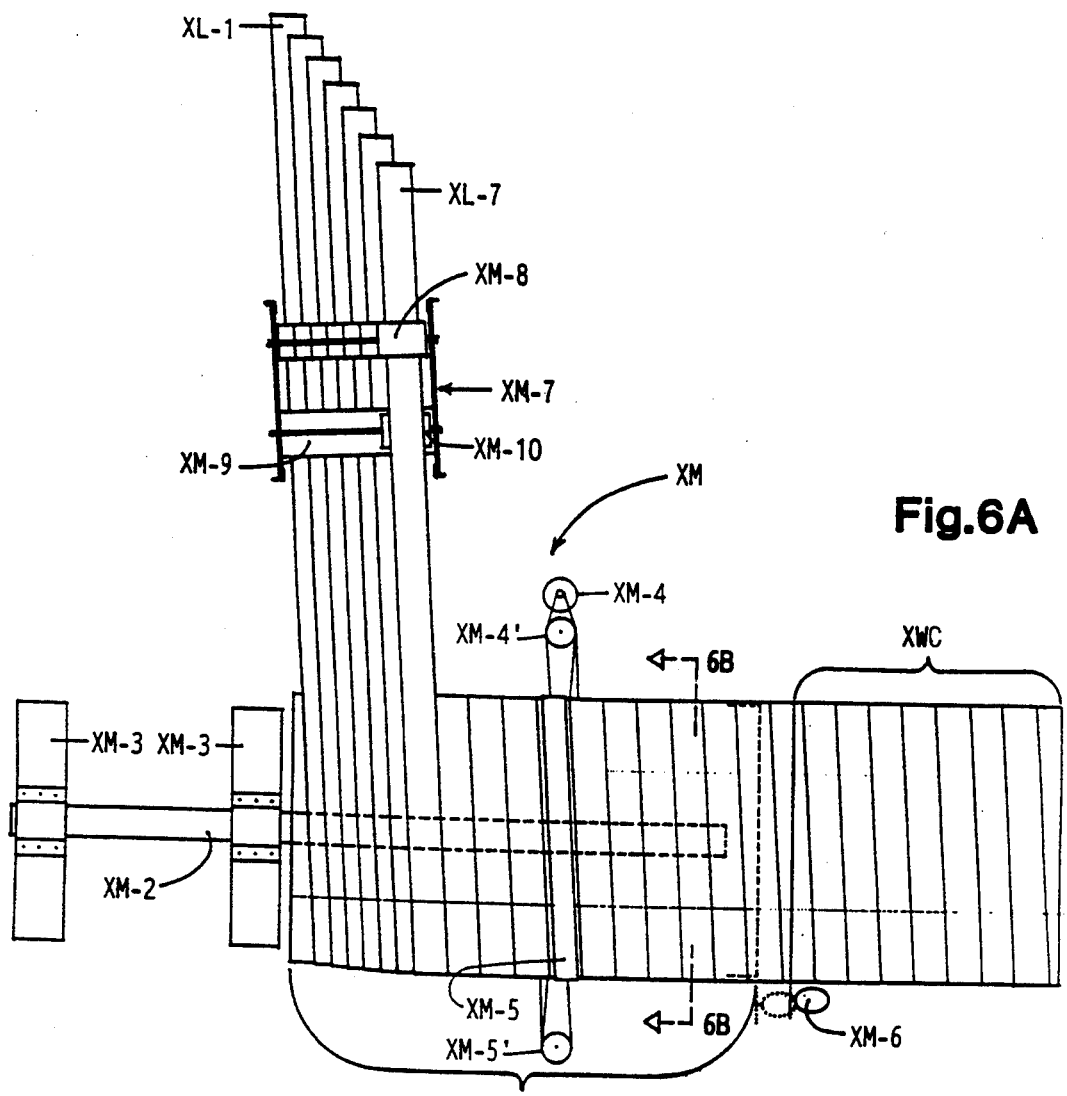
FIG. 6A is a top plan view of a multiple veneer winding machine for producing, on a continuous basis, integral tubular hexagonal building module walls.
Figure 6B:
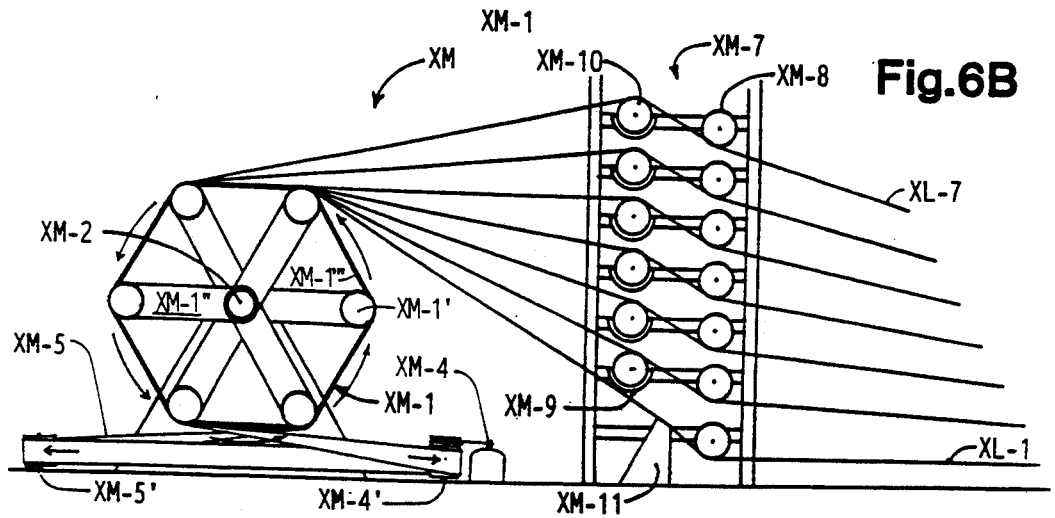
FIG. 6B is a right side elevational view of the machine shown in FIG. 6A.
Figure 7:
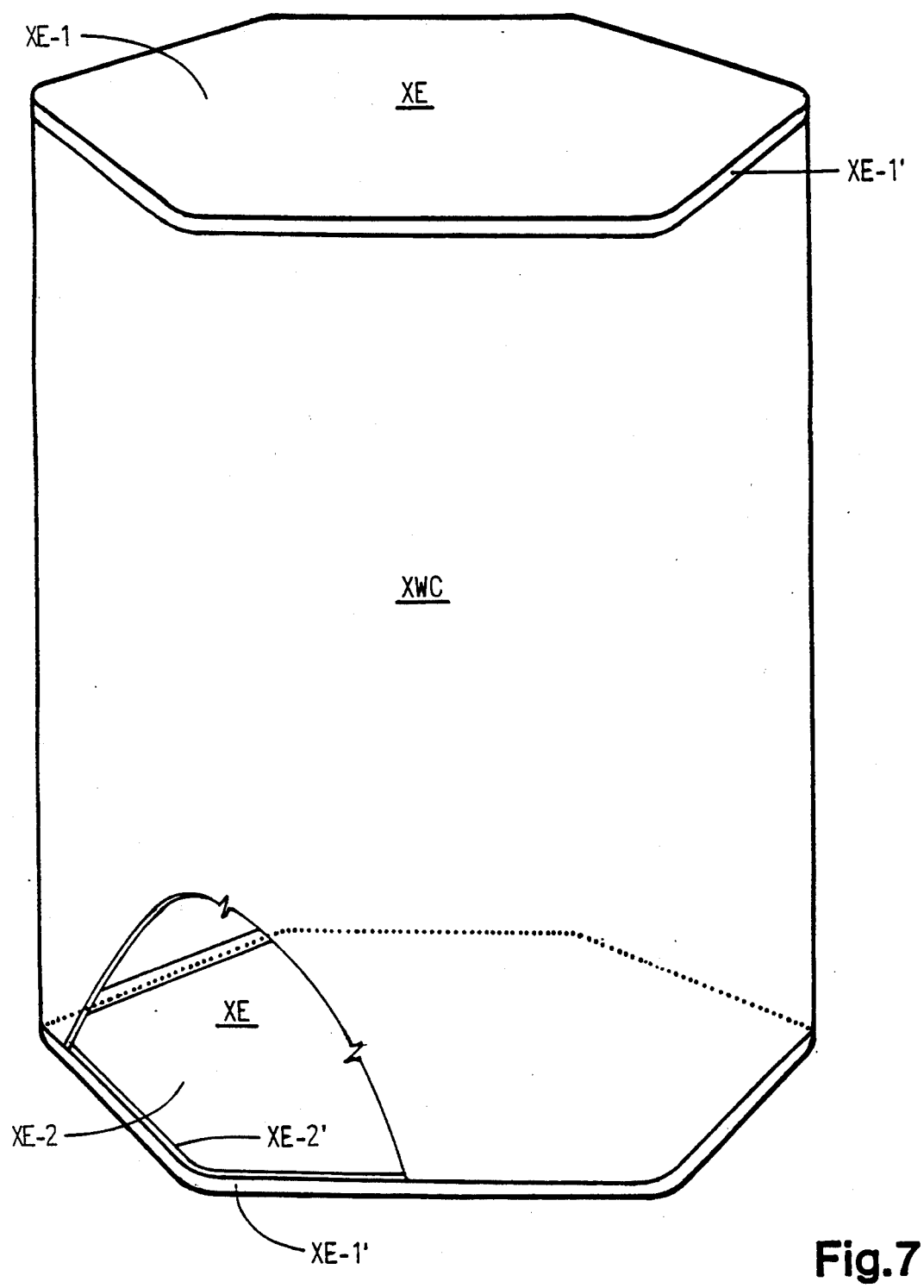
FIG. 7 is a perspective view of an integral tubular hexagonal building module showing the single hexagonal tube and two end panels each with inner and outer membranes.

The wall XW of the hexagonal building module X depicted in FIG. 1, in addition to being fabricated of individual panels XWA or XWE as described in connection with FIGS. 2, 3, 4 and 5, can also be fabricated as an integral or unitary hexagonally shaped tube XWC as shown in FIG. 7 of multiple overlapping spirally wound plies or lamination layers XL-1 through XL-7 using the machine of FIGS. 6A and 6B. The hexagonal building module X shown in FIG. 7 incorporating an integral hexagonal tubular wall module XWC, like the fabricated panel wall module XW shown in FIG. 5 which is fabricated of individual panels XWA, is provided with upper and lower end caps XE having outer and inner membranes XE-1 and XE-2 constructed as discussed in connection with FIG. 4C.

As shown in FIGS. 6A and 6B, the machine for fabricating the integral or unitary hexagonal wall XWC includes a mandrel XM-1, generally hexagonal in vertical cross-section, which is mounted for rotation about a horizontal axis onto a fixed shaft XM-2 which is cantilevered from spaced base supports XM-3. The mandrel XM-1 is formed of seven horizontal pipes XM-1', one at the core and six circumferentially spaced at equal radial distances from the core which snugly fits and rotates about shaft XM-2. The pipes XM-1', which define the corners of the hexagonal wall module XWC, are parallel to each other as well as parallel to the shaft XM-2 and are maintained in this position by radially extending spokes XM-1" located at opposite ends of the mandrel XM-1. Thus, there are six spokes XM-1" at each end of the mandrel XM-1 which supports the six horizontal pipes XM-1' which in turn support the six flat surfaces XM-1" of the mandrel which are faired to and tangent with the curved surfaces of the pipes MX-1' which form the corners of the hexagonal module wall XWC.

Seven layers or plies of lamination material, preferably ribbons of fabric reinforced wood veneer or of fibrous composite material made for this use, are fed to the mandrel XM-1 in overlapping configuration at a slight angle to a plane perpendicular to the length of the mandrel sufficient to spirally wind the laminations XL-1 through XL-7 when the mandrel is rotated in a manner to be described. The laminations XL-1 through XL-7 are successively fed through a glue rack XM-7 which supports and contains a set of horizontally disposed vertically superimposed guide rulers XM-8 and a set of horizontally disposed vertically superimposed glue rollers XM-10. Associated with each glue roller XM-10, is an underlying glue trough XM-9. As the the glue rollers XM-10 rotate about their respective horizontal axis, the surface thereof picks up glue from its associated trough XM-9 and in turn applies glue to the bottom surface of the laminations XL-1 through XL-7 as they pass in contact with the upper portion of the glue rollers XM-10.

A lubricant applicator XM-11 located below the lowermost ply XL-1 applies a lubricant to the underside of lamination XL-1 assisting the spirally wound tube being formed on the mandrel XM-1 to advance longitudinally over the mandrel in a rightwardly direction as viewed in FIG. 6A. If needed to further assist this longitudinal advance of the tube, the tube-forming surfaces of the mandrel XM-1 can be perforated, the ends of the entire mandrel can be capped and pressurized air introduced into the mandrel interior to create air-layer lubrication between the mandrel and the hexagonal module wall as it is being wound on the mandrel.

The mandrel XM-1 with the spirally wound laminations XL-1 through XL-7 laminations thereon is rotated by an endless drive belt XM-5 driven from a stationarily mounted motor XM-4. The drive belt XM-5 is angled with respect to a vertical plane perpendicular to the shaft XM-2 the same angle as the angle at which the lamination plies or layers XL-1 through XL-7 are fed through the mandrel. The drive belt XM-5 in addition to being wrapped around the tube, also passes over an idler pulley XM-5' and drive pulley XM-4' along with the latter pulley being driven by the motor XM-4 as shown in FIGS. 6A and 6B.

A flying cut-off saw XM-6, which advances rightwardly in a direction parallel to the axis of shaft XM-2 at the same speed as the spirally wound hexagonal wall XWC moves rightwardly, as viewed in FIG. 6A, operates to cut the spirally wound tube formed by the mandrel as it leaves the right hand end of the mandrel with the cut being made along a plane perpendicular to the symmetrical axis of the hexagonal wall module XWC. At the conclusion of the cutting operation, the flying cut-off saw XM-6 reciprocates back leftwardly, as viewed in FIG. 6A, to a home or start position shown in phantom lines. Thus, each cut is initiated with the saw XM-6 in the dotted line position and concluded with the saw in the solid line position as shown in FIG. 6A.

Acting in concert with the cut-off saw XM-6, a reciprocating cylindrical catcher (not shown) will support the hexagonal module wall XWC during the cut-off operation and when this is completed will clear the cut-off area deposit the wall XWC in the end capping area and return to receive the next section of hexagonal tube.

In other embodiments of the invention, the use of convolute wrapping techniques and the use, with spiral or convolute wrapping, of fewer or a greater number of plies can approximate the same result.

Figure 8:
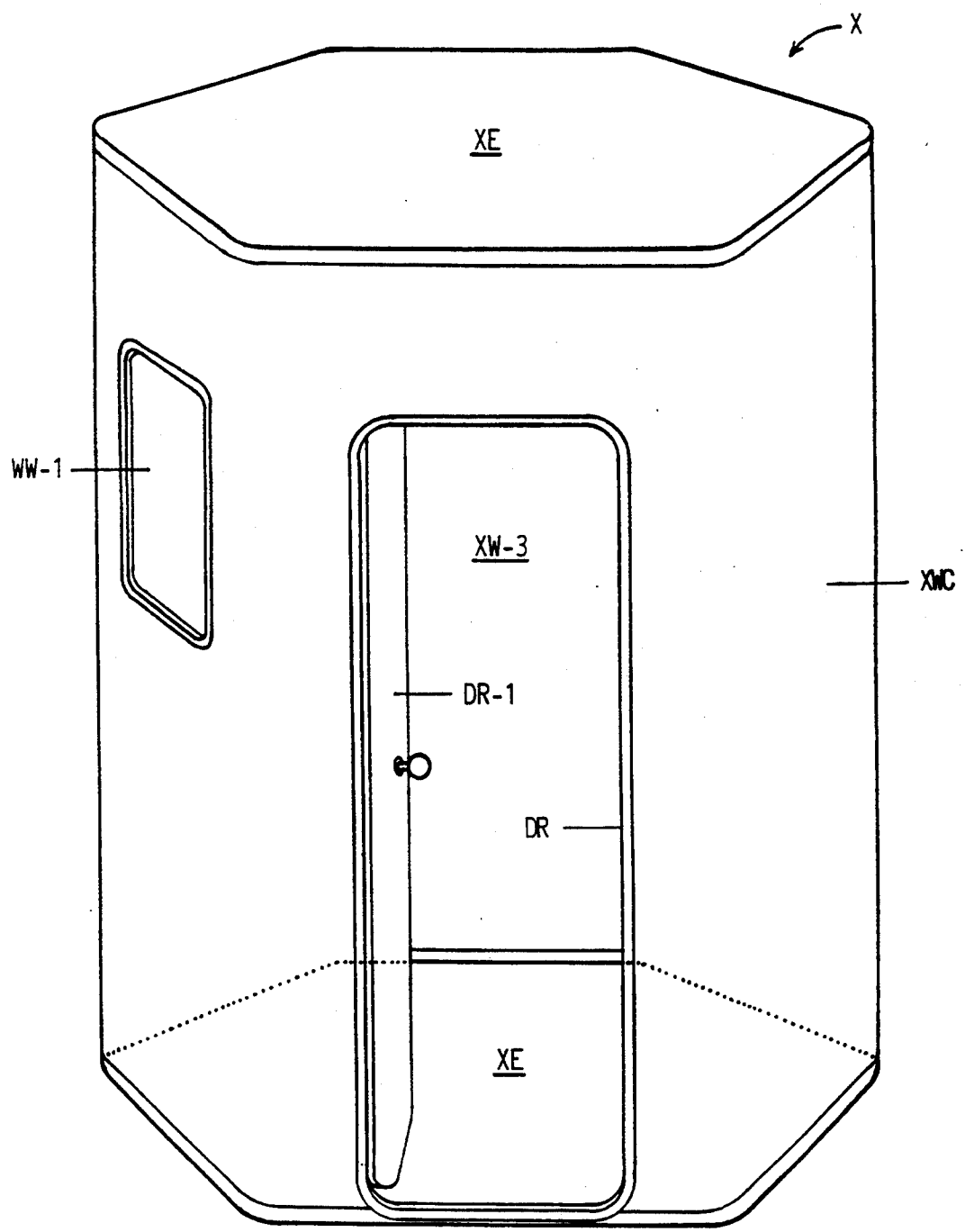
FIG. 8 is a perspective view of a hexagonal building module including floor and ceiling end caps, provided with a window and a door.

As viewed in FIG. 8, the hexagonal building module X can be provided with a doorway DR fitted with a hinged DR-1 which swings inwardly, as well as with a window WW-1. The upper end cap XE can be also be provided, if desired, with a suitable skylight, hatch, or the like. The number of window, doors, hatches, skylights, etc., can be varied as desired. Additionally, doorways may be provided which do not have doors.

With reference to FIGS. 9A and 9B, a vertically disposed module X is shown which, on the left half thereof as viewed in these figures, are provided with rigid insulation IN-1. The insulation extends from the outer surface of the upper end cap XE to the ground or other support surface GND shown in FIG. 9B. The lower end cap XE is ported by the ground GND on leveling block FN-2 to secure it in place using suitable fasteners such as anchor bolts, stakes or like which penetrate through the lower end cap XE and the underlying leveling block FN-2 into the ground (or flat rooftop or pavement) as shown by the fasteners FN-1 extending below the surface of the ground or other supporting surface.

With reference to FIGS. 10A and 10B, a hexagonal building module X of this invention is shown mounted on an inclined surface GND by a plurality of piers FN-3 the upper ends of which are in a common horizontal plane above the level of the ground GND. Sill blocks FN-4 located between the lower surface of the lower end cap XE and the upper surface of the piers FN-3 are provided. The blocks FN-4 are preferably anchored to the piers FN-3 by suitable anchor bolts which extend through blocks FN-4 into the upper end of the piers FN-3 suitable lag bolts through the end cap XE into sill blocks FN-4 then secure module X to the piers FN-3. The insulation IN-1 shown on the left side of the module of FIGS. 10A and 10B extends down flush with the lower surface of the end cap XE. Rigid floor insulation must be placed below or above end cap XE.

With reference to FIG. 11A, a hexagonal building module X of this invention is shown mounted on a hexagonal foundation wall FN-5 extending slightly above the surface of the ground GND with the center portion of the lower surface of the end cap XE being supported by a pier FN-6. A sill FN-7 and a sill block FN-2 are located between the upper surface of the hexagonal foundation FN-5 and the bottom surface of the lower end cap XE. If desired the foundation wall support scheme for the hexagonal building module shown in FIGS. 11A and 11B can be used to support the building module on an inclined ground surface GND as shown in FIG. 11C. As viewed in FIG. 11C, the ground slopes downwardly to the right. A hexagonal foundation wall FN-5 and a pier FN-6, each with appropriate sills mounted at the top thereof, support the lower end cap XE of the hexagonal building module X. A drain tile F-9 is provided at the bottom of a trench in the ground beside the module which is back-filled with gravel FN-8. In FIGS. 9–11, the rigid insulation IN-1 can be provided with any suitable exterior finish EF, such as siding, sheeting, shingles and the like.

Figure 12:
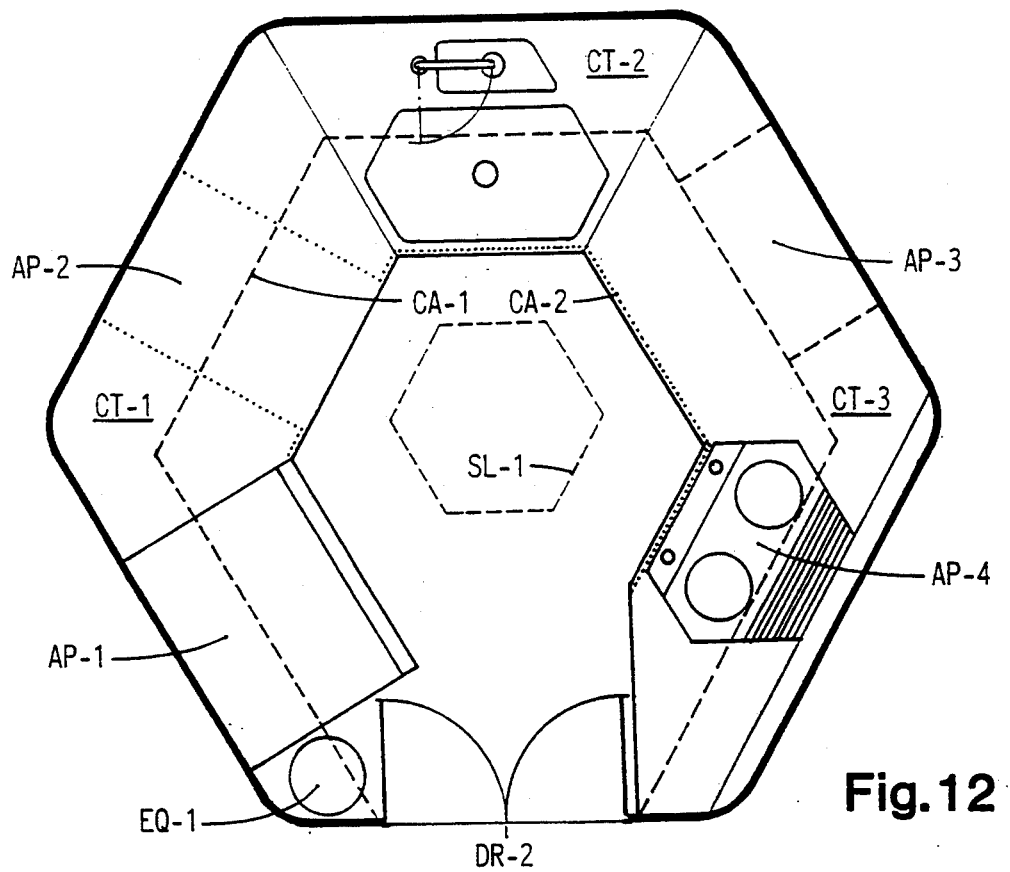
FIG. 12 is a top plan view of a vertically disposed hexagonal building module of this invention equipped as a kitchen.

The interior of the basic hexagonal building module may be equipped as a kitchen, as shown schematically in FIG. 12. With reference to this Figure, standard kitchen appliances, such as a refrigerator AP-1, a dishwasher AP-2, and a microwave convection oven AP-3 are provided with their generally flat vertical rear walls being positioned proximate the flat wall sections of the hexagonal module wall XW. Located in the roof centrally of the building module is an optional vented skylight SL-1. The interior of the kitchen building module is provided with a horizontal counter CT1, CT-2 and CT3 throughout, except where the doors DR-2 and the refrigerator AP-1 are located. A waste receptacle EQ-1 can be conveniently placed in the small region between the refrigerator and doors. The dishwasher AP-2 is placed below the counter CT-3 while the microwave convection oven AB-3 is wall-hung above the counter. In the preferred form of kitchen module shown in FIG. 12, an integral sink is provided in the portion of the counter CT-2 located opposite the doors DR-2. A counter top range AP-4 with an integral exhaust fan is provided in that portion of the counter CT-3 between the doors DR-2 and the oven AP-3. Wall-mounted cabinets shown schematically by reference number CA-1 can be provided (with no inaccessible corners) around the entire perimeter of the kitchen except where the doors, DR-2 are located and except where a suitable cut-out to accommodate the oven AP-3 is provided. Similarly, base cabinets shown schematically by reference number CA-2 can be provided under all countertop areas except where the dishwasher AP-2 is located.

Figure 13:
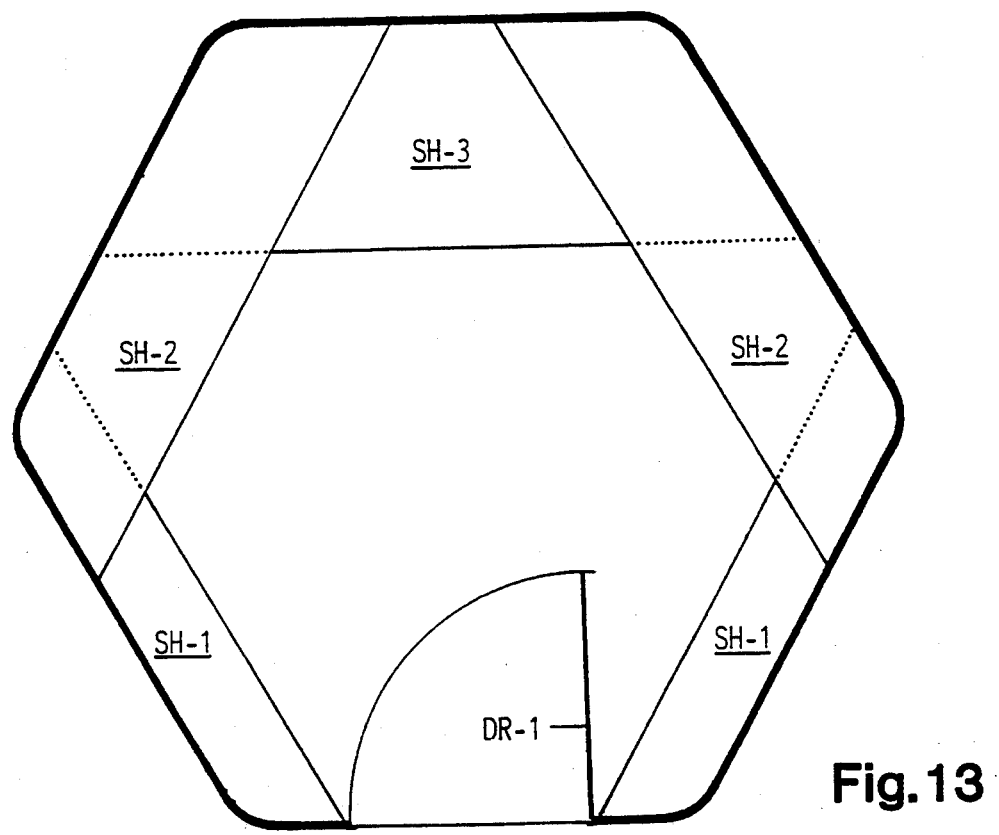
FIG. 13 is a top plan view of a vertically disposed hexagonal building module of this invention equipped as a storage unit.

As shown in FIG. 13, the basic hexagonal building module X of this invention can be used as a storeroom. In the storeroom module, vertically adjustable and interchangeable arrays of horizontal shelves SH-1, SH-2, and SH-3 are provided interiorly of walls. A door DR-1 providing access to the storeroom is also provided. The adjustable shelves can be supported on cleats or on suitable supports (not shown) cantilevered from their associated building module walls or hung vertically from the top of the module.

Figure 14A:
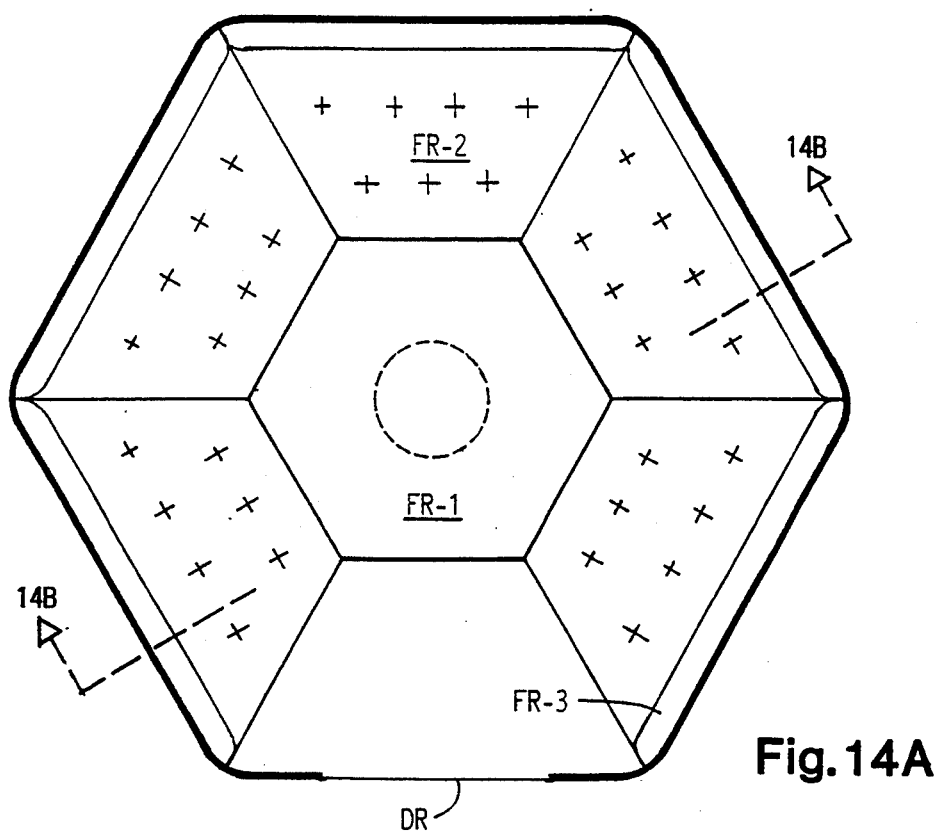
FIG. 14A is a top plan view of a vertically disposed hexagonal building module of this invention equipped with a table and seats for dining.
Figure 14B:
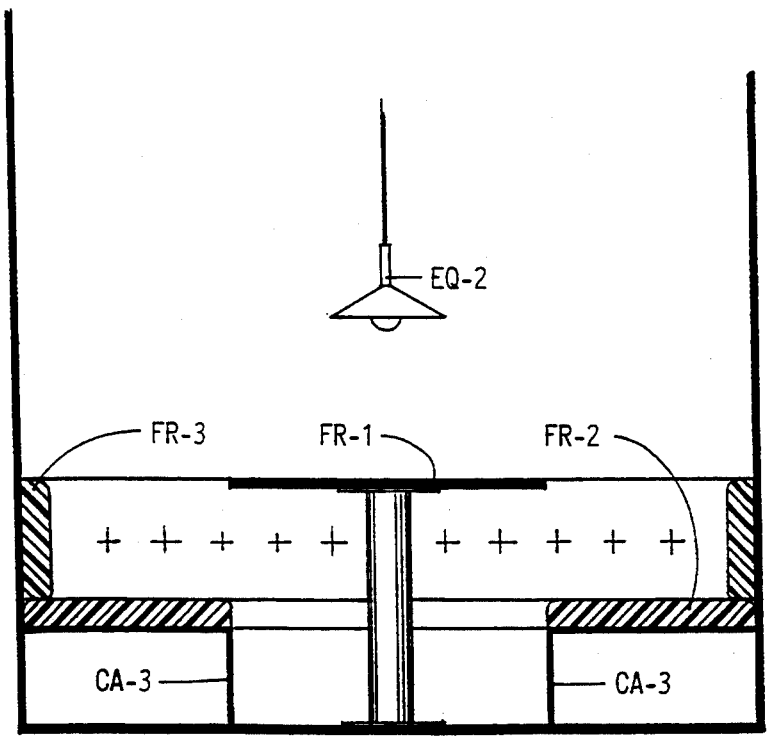
FIG. 14B is a vertical cross-sectional view along lines 14B—14B of FIG. 14A.

AS shown in FIGS. 14A and 14B, the hexagonal building module of this invention can be used as a dining module. With reference to these Figures, the dining module is seen to include a central horizontal hexagonal table FR-1 with a vertical centrally disposed pedestal. Located around the table FR-1 are horizontal seat cushions FR-2 extending radially inwardly from the walls which are supported by seat base cabinet units CA-3. Associated with seat cushions FR-2 are vertical back support cushions FR-3, secured to the interior walls of the module. Doorway and frame (without doors) DR-0 provides access to the module. Windows and a lighting fixture EQ-2, as desired, can be provided.

Figure 15:
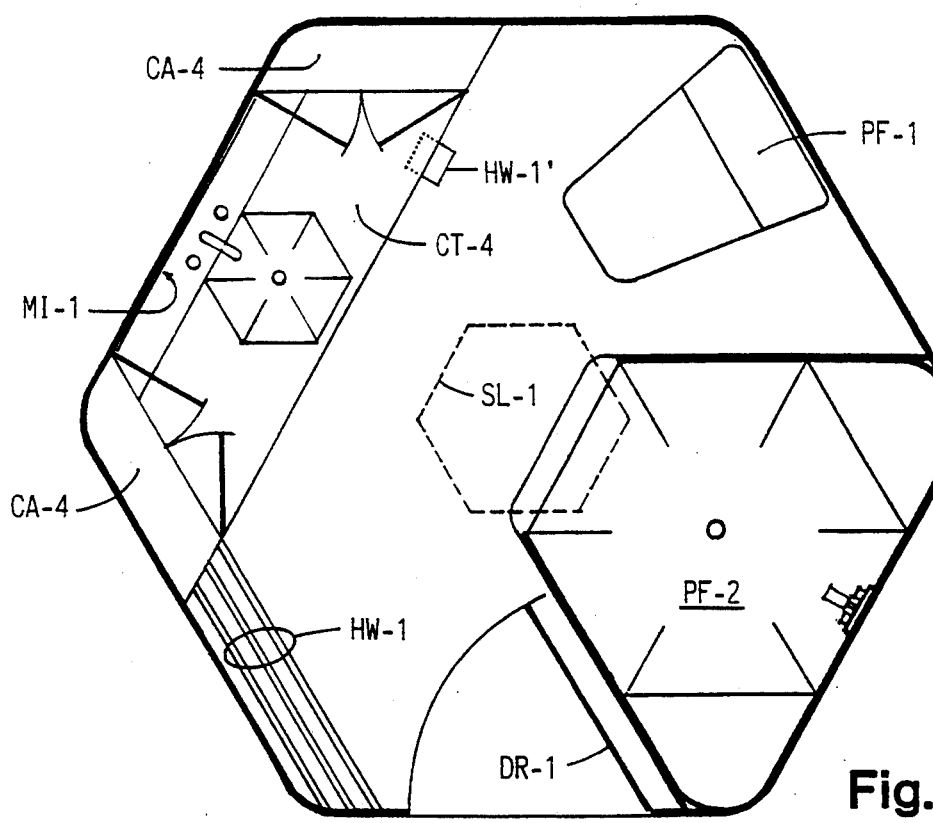
FIG. 15 is a top plan view of a vertically disposed hexagonal building module of this invention equipped as a bathroom.

The hexagonal building module of this invention can be configured as a bathroom, as shown in FIG. 15, including a commode PF-1, a tub and shower unit PF-2 with integral seats, and a countertop CT-4 incorporating an integral ledge on three sides and an integral sink. Located on opposite sides of the sink are invertable medicine cabinets CA-4 each having a pair of externally mirrored doors and above the sink is a wall-mounted mirror MI-1 providing three-way reflection with the flanking cabinets. Off-set towel bars H-1 are also provided adjacent the door DR-1. If desired, a ventilating skylight SL-1 can be provided in the bath and/or a wall fan (not shown) for ventilation. A suitable toilet paper dispenser HW-1' is provided below the countertop CT-4 adjacent the commode PF-1.

Figure 16:
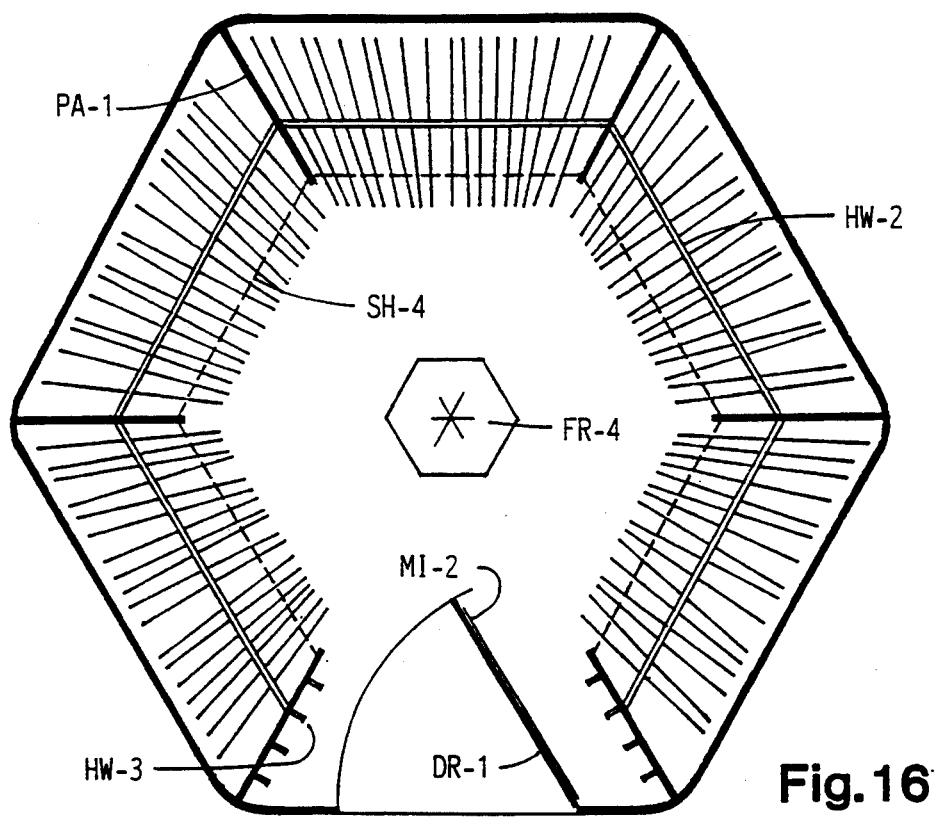
FIG. 16 is a top plan view of a vertically disposed hexagonal building module of this invention equipped as a walk-in closet.

The basic hexagonal building module of this invention can also be equipped as a clothes closet as shown in FIG. 16. As shown in this Figure, horizontal clothes hanger support rods HW-2 are provided at an appropriate height from the floor and at an appropriate distance from the walls. The horizontal clothes hanger support rods HW-2 can be supported by brackets (not shown) cantilevered from the walls. Alternatively, the rods HW-2 can be supported at their opposite ends between vertical dividers PA-1 extending radially inwardly from the corners of the module which are each anchored at their respective outer vertical edge to their respectively associated module corners. If desired, horizontal shelf arrays SH-4 can be placed above the clothes hanger rods HW-2. The shelves SH-4 are secured at their opposite sides between adjacent pairs of the vertical dividers PA-1. A door DR-1, hinged for inward movement, is provided to access the closet module. A seat FR-4 is provided in the center of the module with a centrally positioned lighting fixture (not shown) provided above the seat. Hooks HW-3 for hanging articles of clothing are provided on the vertical divider panels flanking the door, and a full length mirror MI-1 is secured to the rear of the door DR-1.

Figure 17:
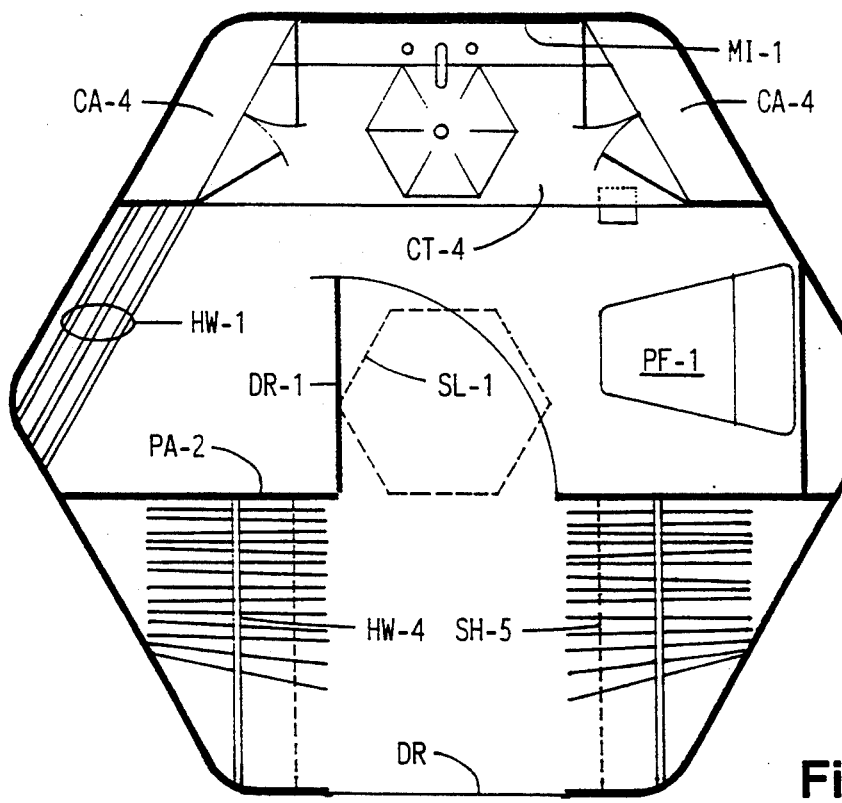
FIG. 17 is a top plan view of a vertically disposed hexagonal building module of this invention equipped as a combination lavatory and closet.

The building module of this invention can also be equipped as a combination lavatory and closet, as shown in FIG. 17. Located inside the module is a commode PF-1 and sink provided in the horizontal counter CT-4 which extends between the interior walls of the module. Located above the counter CT-4 and flanking the sink are mirrored door medicine cabinets CA-4. An interior partition PA-2 extending between opposed module walls has a door DR-1 which separates the lavatory area from the closet area. Extending between the left cabinet CA-4 and divider panel are towel rods HW-1. Located within the closet area are horizontal closet rods HW-2 which extend between the divider panel and the module walls on either side of a doorless doorway DR-0 which permits access to the closet area. Located above the closet rods HW-2 are shelves SH-4 which extend between the divider panel and the module walls on either side of the doorway.

Figure 18:
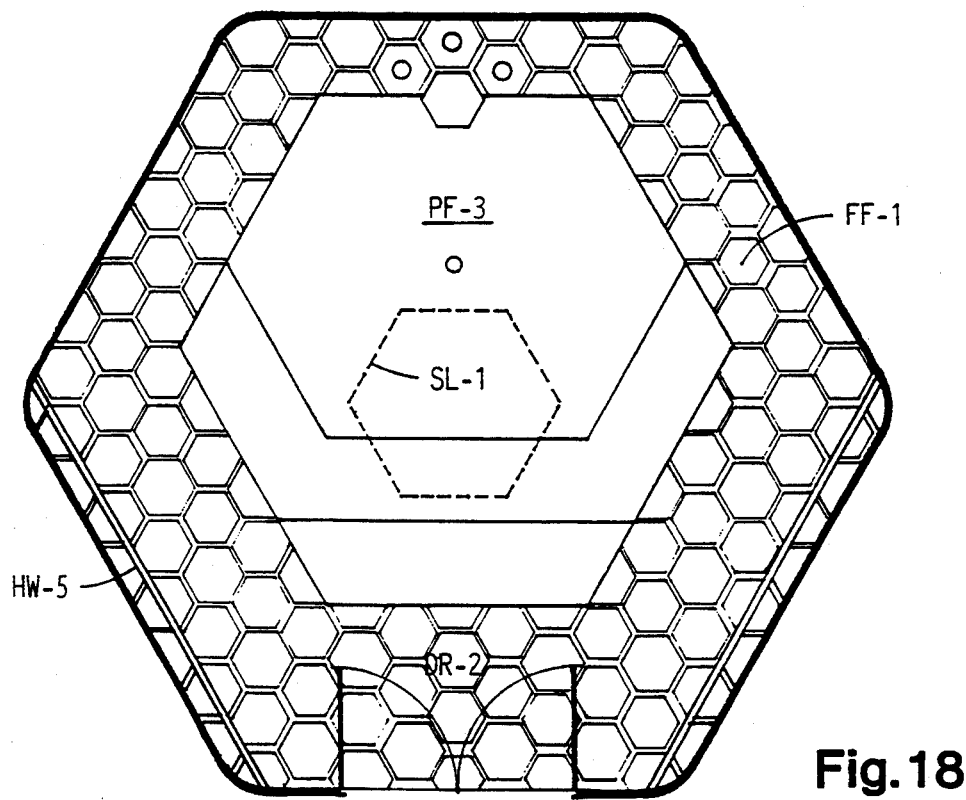
FIG. 18 is a top plan view of a vertically disposed hexagonal building module of this invention equipped with a bathing pool.

As shown in FIG. 18, the building module of this invention can be equipped as a bathing pool. One wall of the module is provided with a pair of inwardly opening doors DR-2. Located within the bathing pool module of FIG. 18 is a sunken pool PF-3 which is provided with a drain. A water spout PF-3 and associated controls are provided to control the flow of hot and cold water to the spout which can also incorporate a hand-held shower (not shown). Surrounding the pool PF-3 is a deck area with a suitable ceramic tile finish FF-1. To facilitate convenient access to the pool PF-3, three integral steps are provided between the deck level and the lowest pool level. Horizontal towel rods HW-5 are mounted across the inside faces of the module walls. If desired, a ventilating skylight SL-1 can be provided in the ceiling of the bathing pool module.

Figure 19:
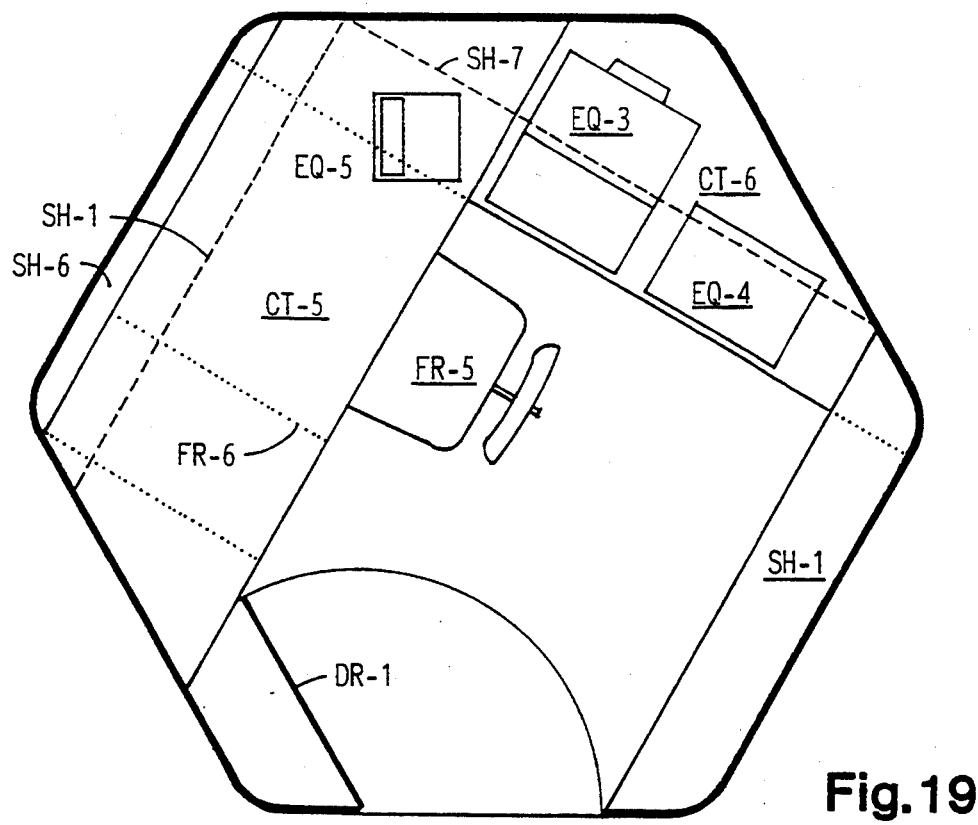
FIG. 19 is a top plan view of a vertically disposed hexagonal building module of this invention equipped as an office work space.

As shown in FIG. 19, the building module of this invention can be equipped as a work space. A module so equipped could include vertically spaced horizontal shelves SH-1 extending inwardly from module walls, and a countertop desk CT-5 provided with a chair FR-5. Located beneath the desk CT-5 is a file cabinet FR-6. An additional countertop desk CT-6, atop which can be placed a computer EQ-3 and printer EQ-4 is also provided. A phone EQ-5 can be located on either desk CT-5 or CT-6. A door DR-1 is provided in one wall to permit ingress and egress.

Figure 20:
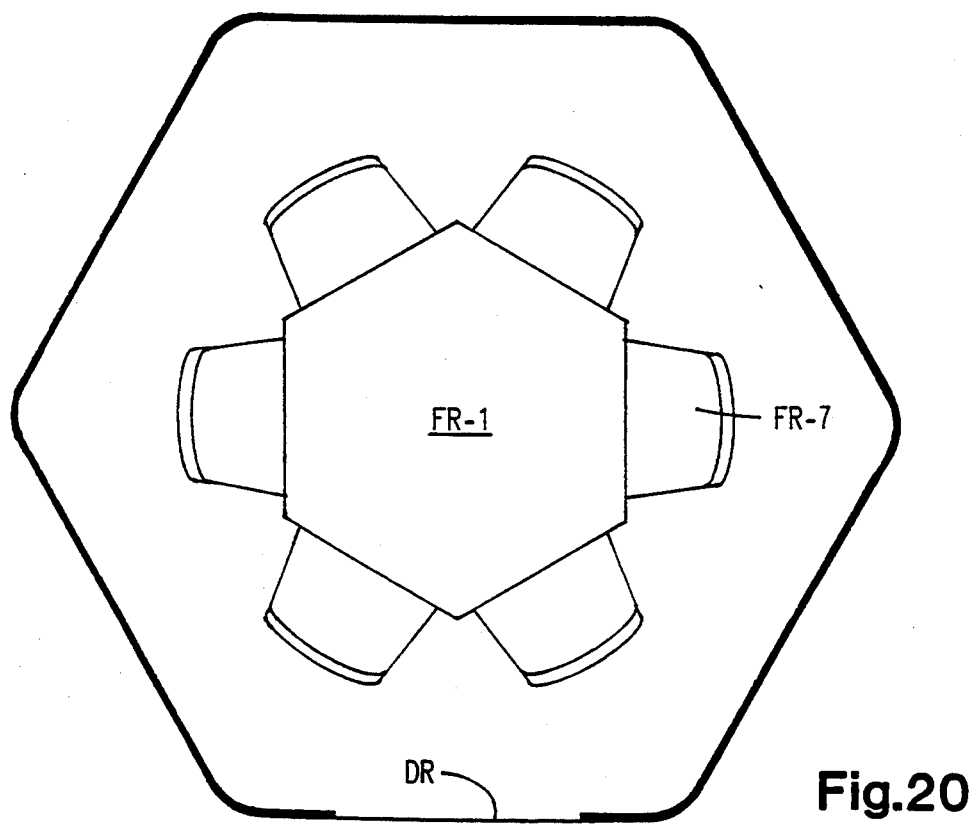
FIG. 20 is a top plan view of a vertically disposed hexagonal building module of this invention equipped with a pedestal table and chairs for use as a conference room.

FIG. 20 depicts the module X as a conference room, which includes a pedestal table FR-1 and six chairs FR-7. A doorless doorway DR-0 provides access to the conference room.

Figure 21A:
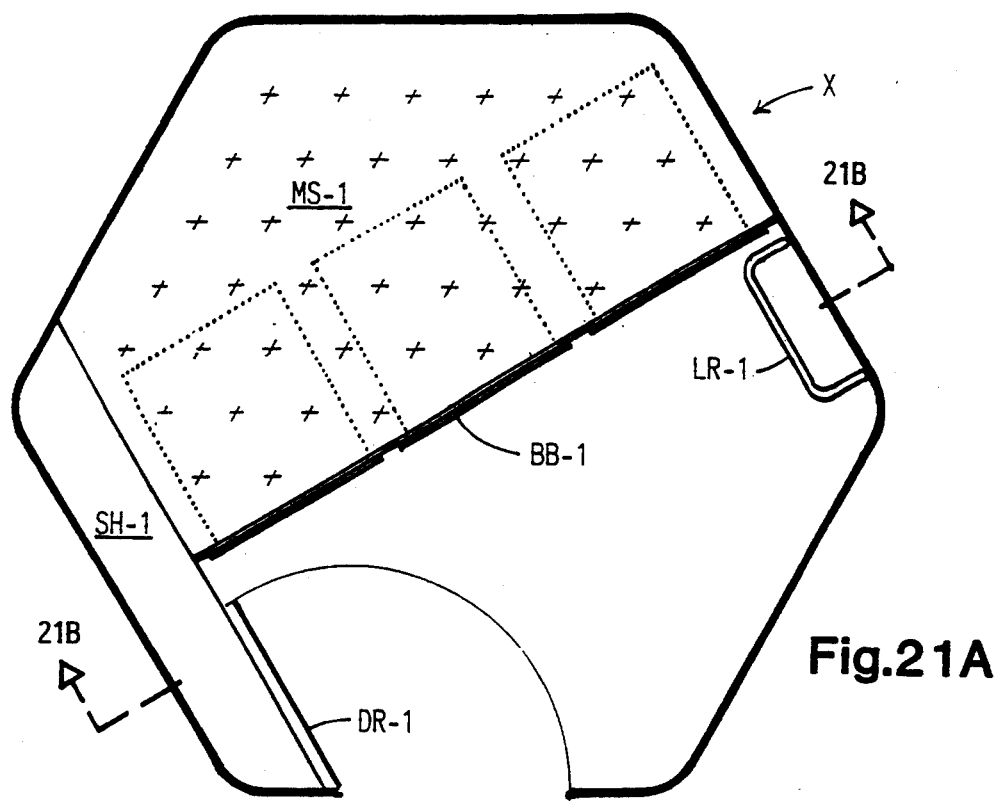
FIG. 21A is a top plan view of a vertically disposed hexagonal building module of this invention equipped as a sleeping space with upper and lower bunk beds.
Figure 21B:
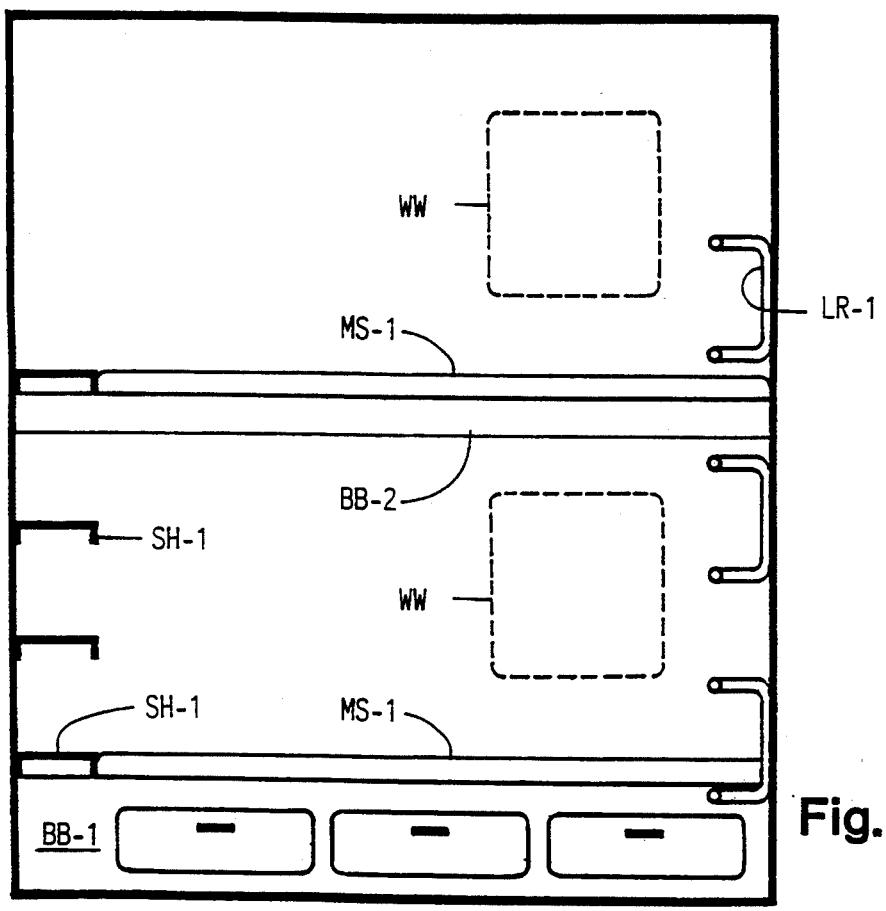
FIG. 21B is a vertical cross-sectional view along lines 21B—21B of FIG. 12A.

The hexagonal building module X of this invention, as shown in FIGS. 21A and 21B, may also be outfitted as a sleeping space. The sleeping space module includes a door DR-1. Located within the sleeping module are lower and upper bunk beds BB-1 and BB-2 which span substantially the entire distance, except for horizontal shelf sections SH-1, between opposite module walls. Bunk bed bases BB-1 and BB-2 have mattresses MS-1. Located in the lower bunk bed base BB-1 are drawers. Secured to one wall of the module is a multi-rung ladder LR-1. Located between the uppermost and lowermost shelves are a pair of intermediate shelves. If desired, windows WW may be provided above each bed.

Figure 22A:
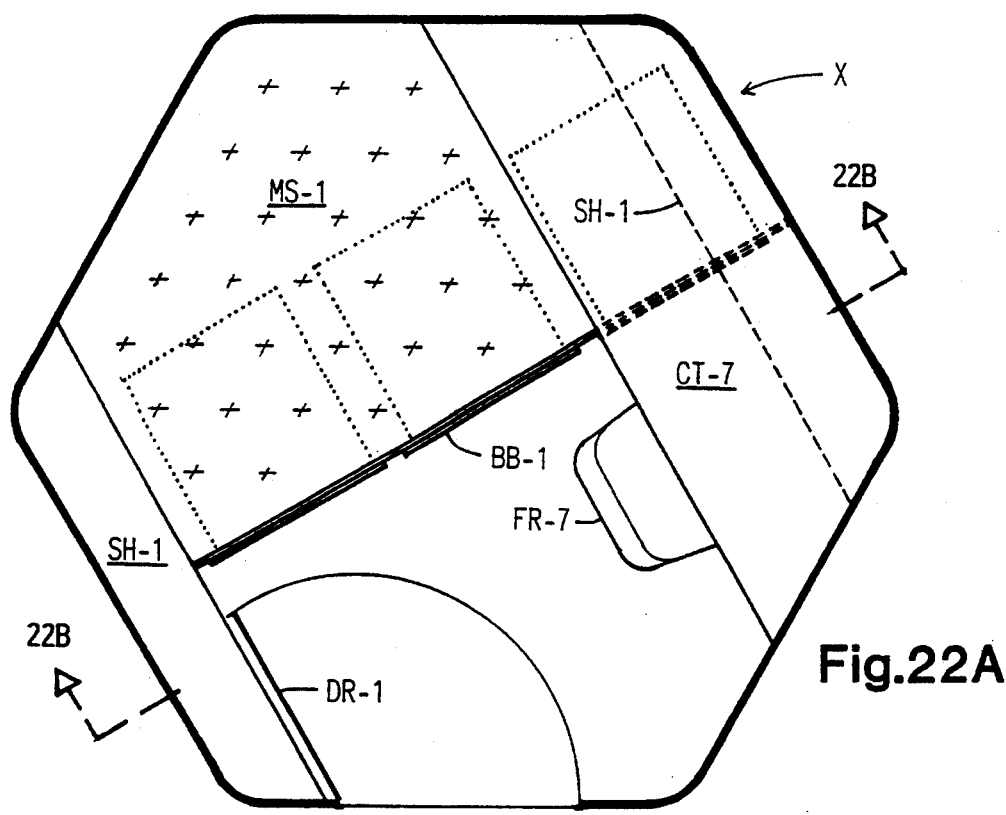
FIG. 22A is a top plan view of a vertically disposed hexagonal building module of this invention equipped with a bed, desk and chair, and shelves for use as a bedroom/study room.
Figure 22B:
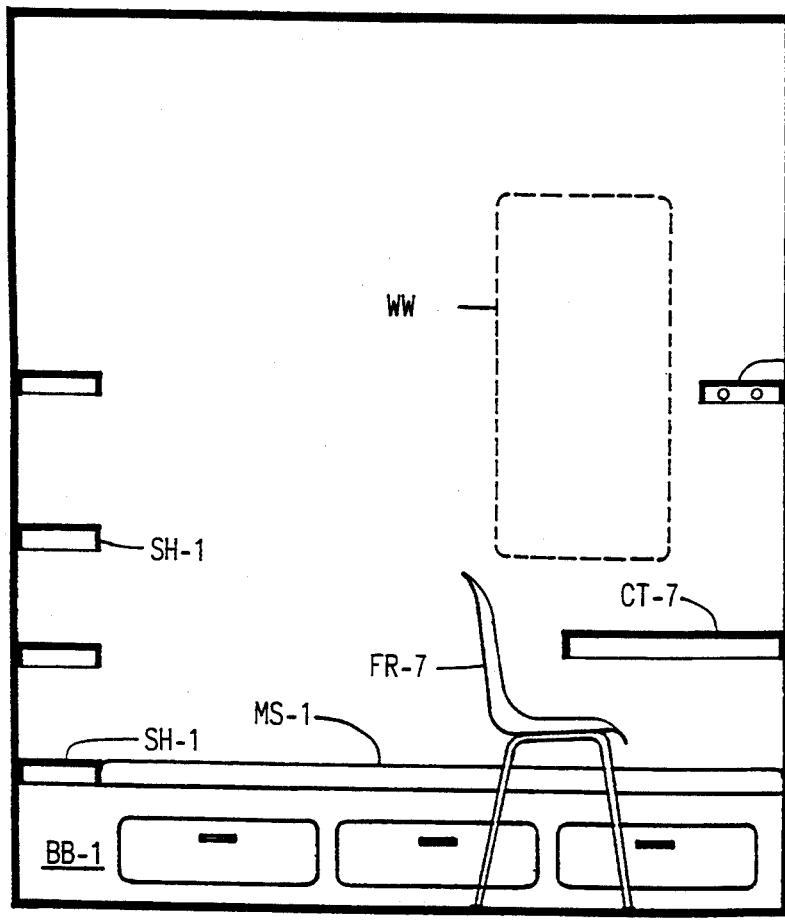
FIG. 22B is a vertical cross-sectional view along lines 22B—22B of FIG. 22A.

FIGS. 22A and 22B depict the building module X as a combined sleeping and work space for use as a student's room. A built-in bunk base B-1, having three drawers in the lower section thereof and a mattress MS-1 spans a pair of opposite walls of the module. Adjacent one end of the mattress MS-1 is a lower shelf SH-1 which spans one wall of the module. Located above the shelf SH-1 adjacent the mattress MS-1 are three additional vertically superimposed shelves SH-1 which also span the wall of the module spanned by the lowermost shelf SH-1. A countertop CT-7 spaced vertically above one end of the mattress MS-1 spans the wall of the module opposite the wall spanned by the vertically superimposed shelves SH-1. Located above the countertop desk CT-7 is a shelf SH-1' which incorporates a fluorescent light. A desk chair FR-7 is provided adjacent the countertop desk CT-7. An optional window WW may be provided in one of the walls of the building module.

Figure 23:
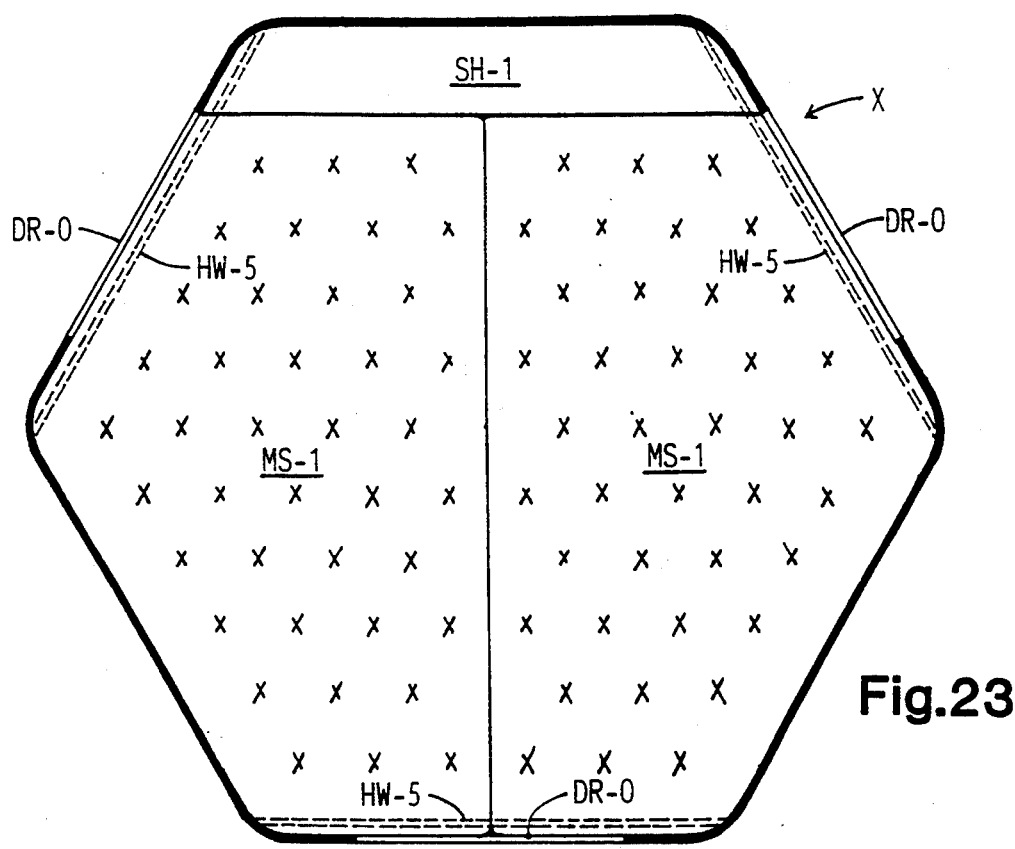
FIG. 23 is a top plan view of a vertically disposed hexagonal building module of this invention equipped with a mattress and shelf for use as a bedroom.

FIG. 23 depicts the hexagonal building module X as a sleeping space. The sleeping space includes a doorless doorway DR-0 on each of three opposed walls of the module. A shelf SH-1 spans a wall of the module between two opposed doorways DR-0. Mattresses MS-1 on appropriate supports (not shown), are identically configured, and are provided for each half of the sleeping space. Rods HW-5 are located above each of the three doorways DR-0 to support curtains (not shown) used to provide privacy for the sleeping space or to support mosquito netting in tropical climates. For exterior exposures, windows can be placed in any of the DR-0 openings.

Figure 24:
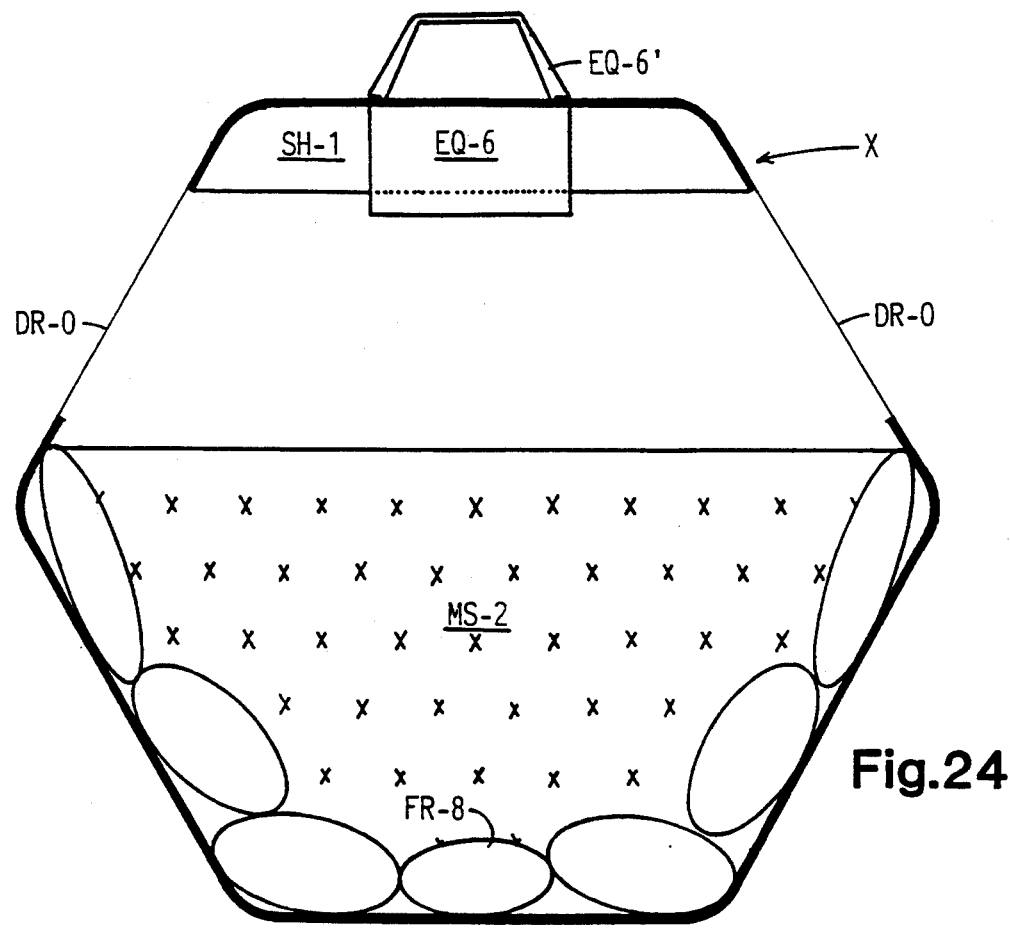
FIG. 24 is a top plan view of a vertically disposed hexagonal building module of this invention equipped with a bed, shelf, and audio-visual equipment for use as a bedroom or entertainment lounge area.

FIG. 24 discloses another sleeping space or lounge configuration for the hexagonal building module X of this invention. The module includes a pair of doorless doorways DR-0 in each of two opposed walls. Spanning the wall between the doorways DR-0 is a shelf SH-1 atop which is placed a television EQ-6. Shelves can be added above the TV for sound-system components. The rear of the television EQ-6 extends through a suitable opening provided in the associated module wall where it is enclosed by a special molded housing EQ-6'. A mattress MS-2 on a raised platform-base or the floor and a plurality of pillows FR-8 are also provided.

Figure 25:
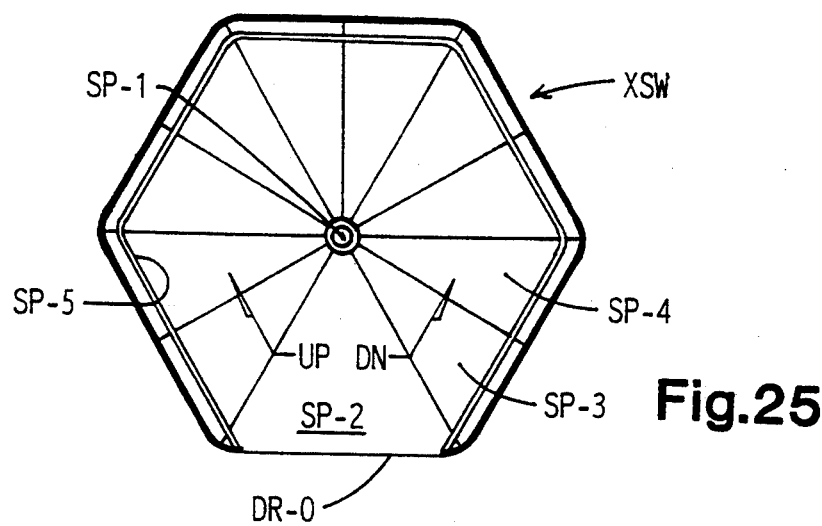
FIG. 25 is a top plan view of a vertically disposed hexagonal building module of this invention equipped with spiral stairs and a single door.
Figure 41A:
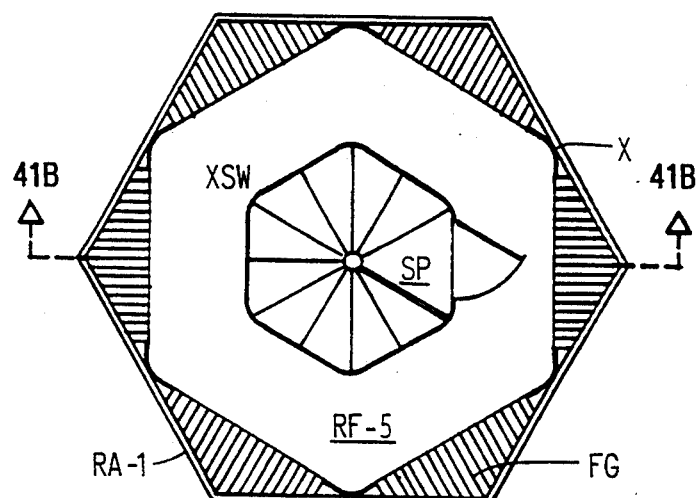
FIG. 41A is a top plan view of two vertically superimposed hexagonal building modules of this invention with a spiral stair module of smaller diameter in the lower module and equipped with a step hexagonal pyramidal roof and a deck with railings at the level of the upper module for use as a minaret.
Figure 41B:
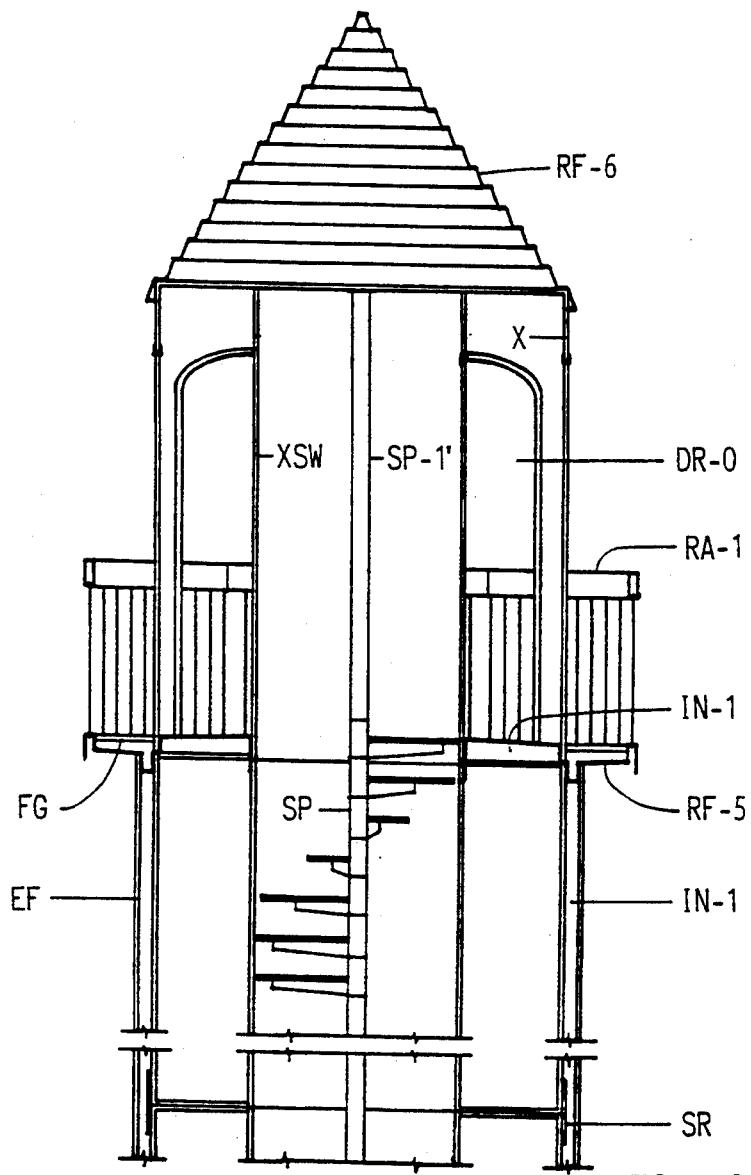
FIG. 41B is a vertical cross-sectional view taken along line 41B—41B of FIG. 41A.

As shown in FIG. 25, and further elucidated in FIG. 41A and FIG. 41B, a spiral staircase can be provided within one or more of the vertically stacked hexagonal building module walls XSW of the invention. The entire staircase, which follows a helical path, is cantilevered from a core-column SP-1 and is assembled by the alternate sliding of the integral central hub of cast metal tread units SP-3 and SP-4 from the top toward the bottom of core-column SP-1. The uppermost unit, landing SP-2 is also slid over core-column SP-1 and is also cantilevered from its integral cast metal hub. A finishing sleeve SP-1' screwed onto the top of core-column SP-1 continues the hub diameter to the ceiling of stairwell. The tread and landing units are held in precise helical alignment by the hexagonal walls of spiral stairwell XSW and the precise riser height from tread to tread is maintained by the integral hubs. A helical handrail SP-5 is attached with brackets to the inside face of the hexagonal wall. As illustrated, the "down" run of the stair is counterclockwise and the "up" run is clockwise. If desired, however, the runs can be reversed using the same components.

Figure 26:
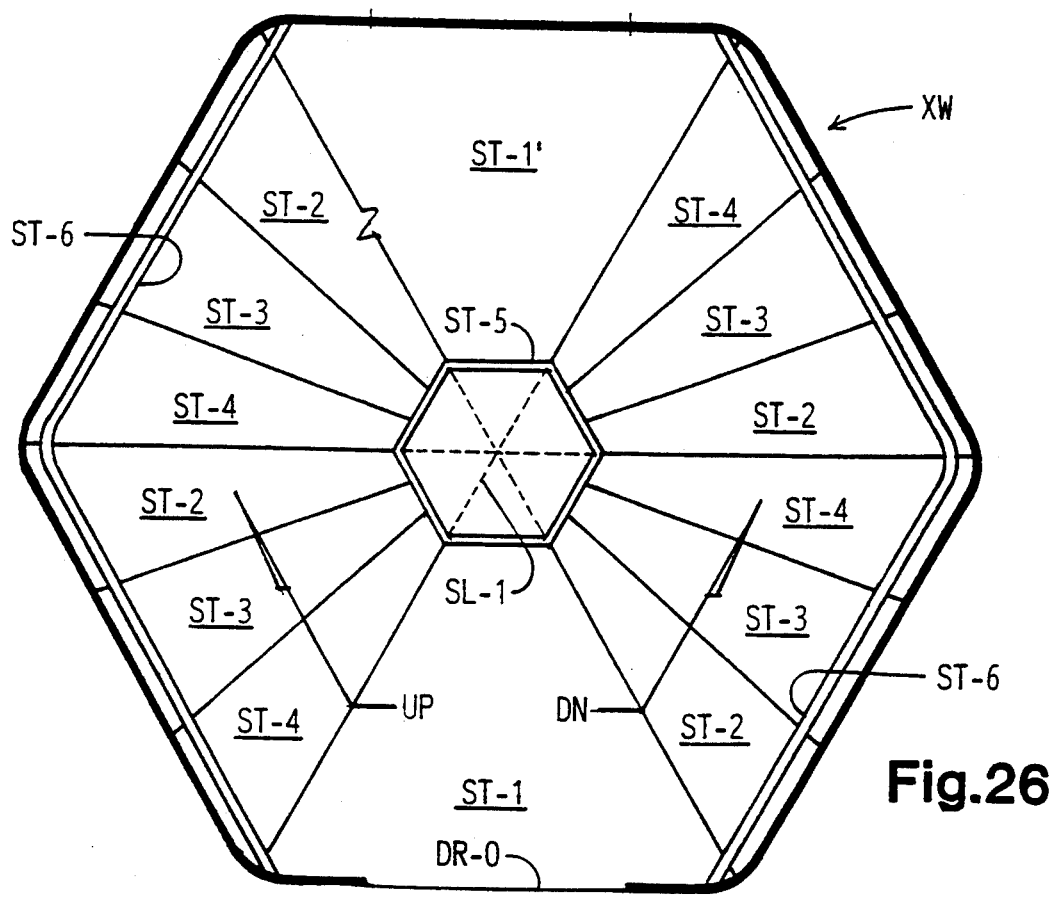
FIG. 26 is a top plan view of a vertically disposed hexagonal building module of this invention equipped with circular stairs and two doors.

A slightly different stair arrangement is shown in connection with FIG. 26. In accordance with this arrangement, a laminated hexagonal helical core ST-5 is vertically disposed in the center to support the inner ends of identical landings ST-1 and identical treads ST-2, ST-3 and ST-4. The outer ends of the landings and the treads are supported by the associated walls of the module XW. As illustrated, the "down" run extends from landing ST-1 associated with door DR-0 and continues, via mid-level landing ST-1', counterclockwise for a full flight of 14 risers to a point one story below the point of beginning. The "up" run extends from landing ST-1 and continues, via an upper mid-level landing (not shown), clockwise for a full flight of 14 risers to a point one story above the point of beginning. For the usual 105" floor-to-floor rise in residential and light commercial construction, the 14 equal risers would each be an optimum 7½". If mid-level egress is desired, a door may be provided proximate the mid-level landing ST-1'. A wall mounted handrail ST-6 is provided for the "down" and "up" runs. A skylight SL-1 may be provided over the hexagonal helical core ST-5 and windows may be placed in the module walls XW as desired.

Figure 27:
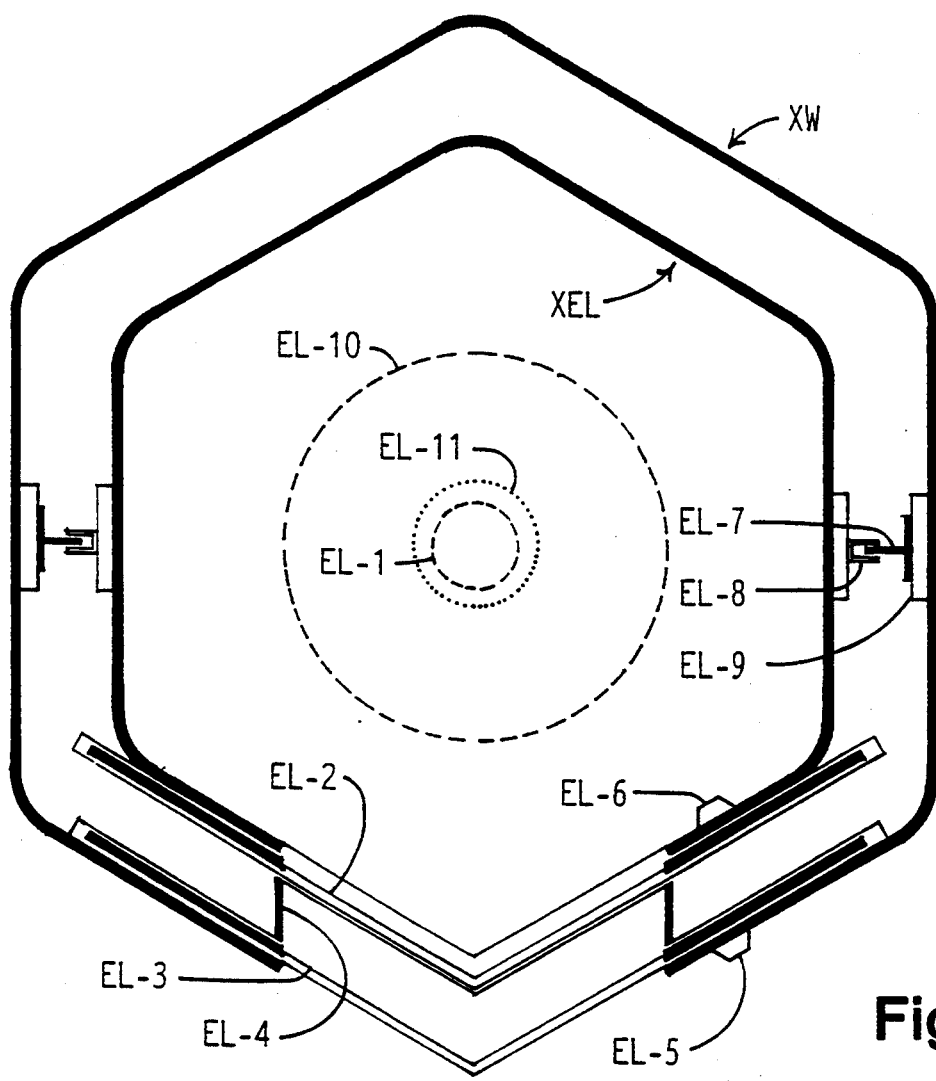
FIG. 27 is a top plan view of a vertically disposed hexagonal building module of this invention equipped with sliding doors and a cab for use as an elevator.

FIG. 27 depicts the uppermost, lowest or intermediate stacked module of this invention equipped to operate as an elevator. The elevator module includes a pair of opposed horizontal sliding outer doors EL-3 and a pair of opposed horizontal sliding inner doors EL-2 which slide in appropriate tracks. Jamb closure panels EL-4 extend between the inner and outer pairs of sliding doors on each side of the entryway. The vertically moving elevator cab XEL is maintained centered within the module XW by vertical guide tracks EL-7 extending inwardly from a pair of opposed walls of the outer module and cooperating guide brackets EL-8 extending outwardly from opposed walls of the elevator cab. The guide brackets EL-8 and guide tracks EL-7 are mounted to their associated walls via adjusting blocks EL-9 respectively. A vertical hydraulic ram EL-1 centrally disposed within the elevator shaft raises and lowers the elevator cab XEL, as desired. The load between the ram EL-1 and the cab floor is distributed via a load distribution panel EL-10 located between and concentric with the ram and cab floor. A combination fan/light EL-11 is provided in the ceiling of the cab. A call button unit EL-5 summons the cab. A cab operating panel EL-6 selects the floor, etc.

Figure 28:
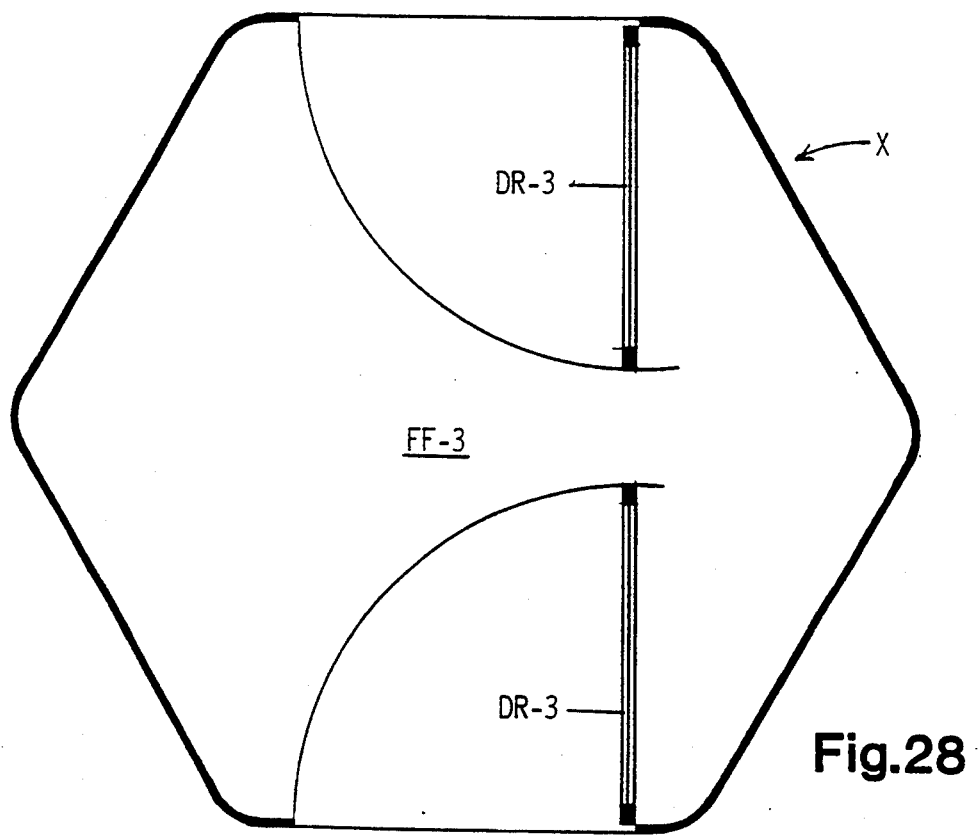
FIG. 28 a top plan view of a vertically disposed hexagonal building module of this invention equipped with opposed hinged doors for use as an air-lock entrance.
Figure 29:
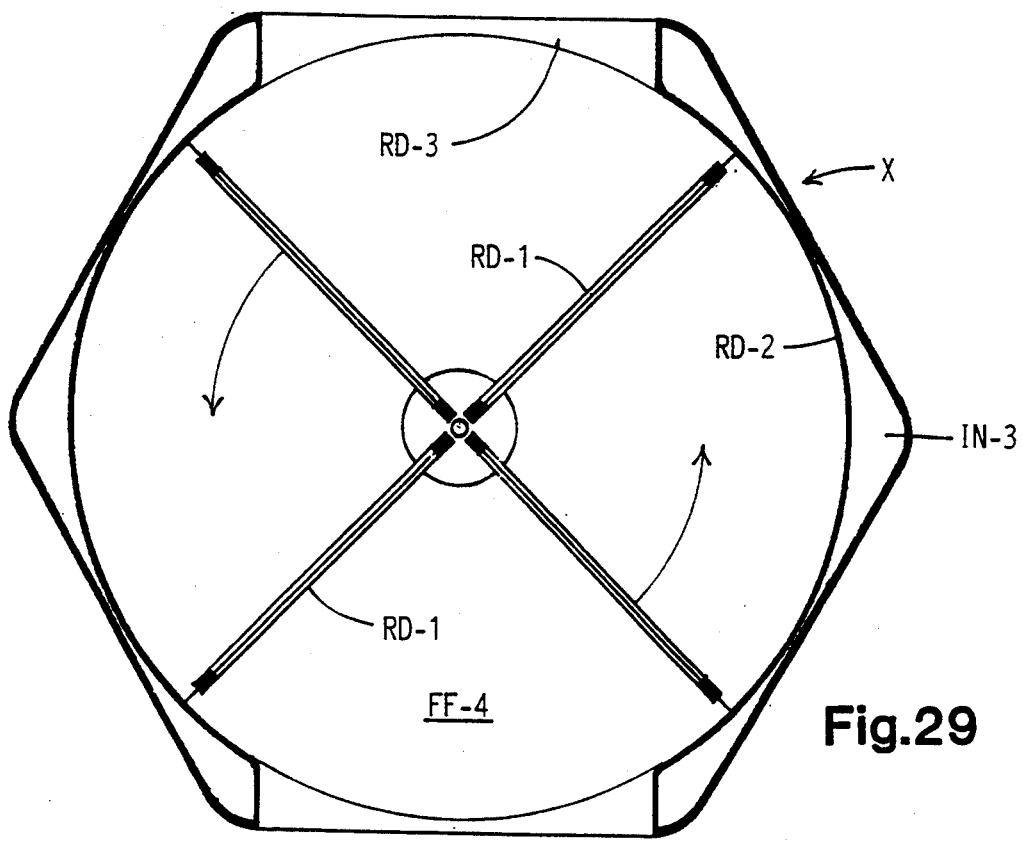
FIG. 29 is a top plan view of a vertically disposed hexagonal building module of this invention equipped with a revolving door for use as a building entrance.

As shown in FIG. 28, the hexagonal building module X can be utilized as an air-lock entrance with a replaceable hexagonal floor mat FF-3 and containing, in a pair of opposed walls, inwardly swingable doors DR-3. Alternatively, the building module of this invention can be used a revolving door module as shown in FIG. 29. A pair of doorless door openings RD-3 with sills shaped as shown are provided in a pair of opposed walls of the module X. Located centrally within the module is a conventional revolving door RD-1 having four identical, collapsible glazed door panels and a speed limiting device centered at top or bottom. Inner circular wall sections RD-2 with integral jamb closure panels are provided adjacent opposed pairs of module walls. The space between the curved walls RD-2 and the associated module walls is filled with foamed-in-place insulation IN-3. A circular floor mat FF-4 covers the floor.

Figure 30:
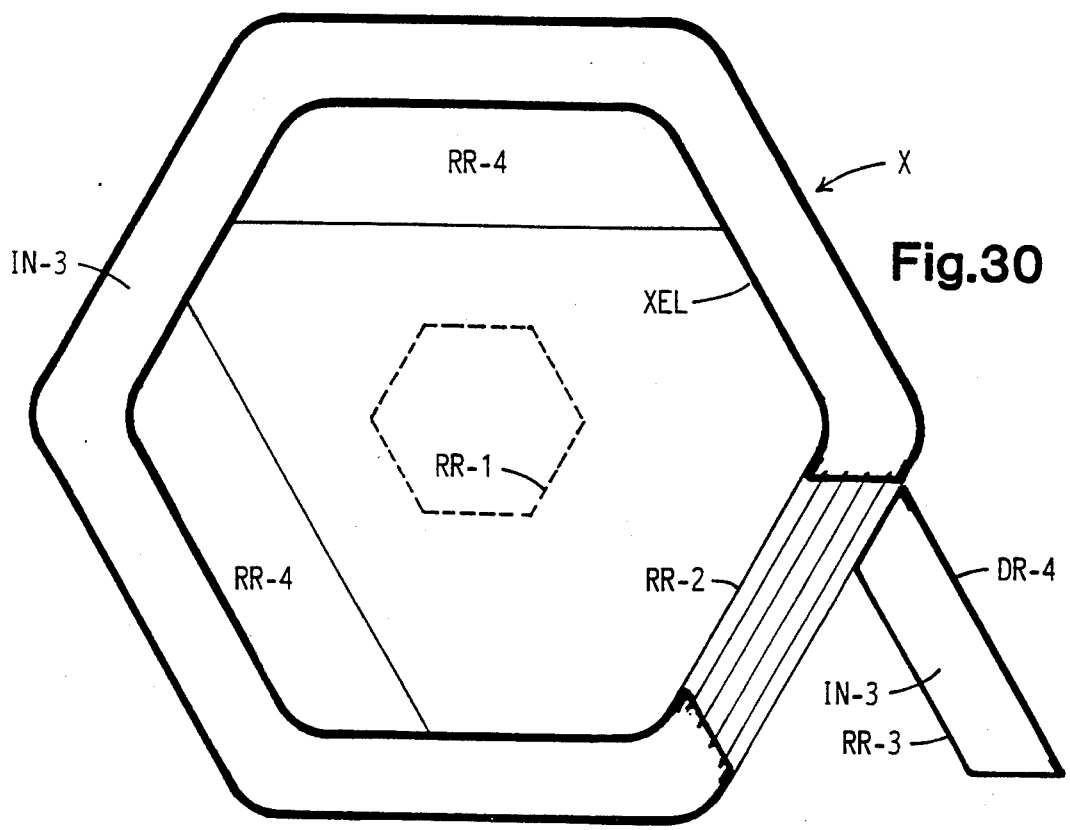
FIG. 30 is a top plan view of a vertically disposed hexagonal building module of this invention equipped with refrigeration equipment, insulated walls and a door for use as a walk-in refrigerator or freezer.

As shown in FIG. 30, the module of this invention can be equipped as a walk-in refrigerator or freezer. This is accomplished by spacing from the walls of the outer module X smaller inner module XEL. Foamed-in-place insulation IN-3 is provided in the space between the inner module XEL and the walls of the module X. A gasketed door frame RR-2 and a hinged door DR-4 having a liner RR-3 and foamed-in-place insulation IN-3, are provided in one wall of the module to facilitate access to the interior thereof. A refrigeration unit is mounted in the ceiling of the module. A plurality of adjustable wire shelves RR-4 are horizontally mounted adjacent the inner walls W-2, as required.

Figure 31:
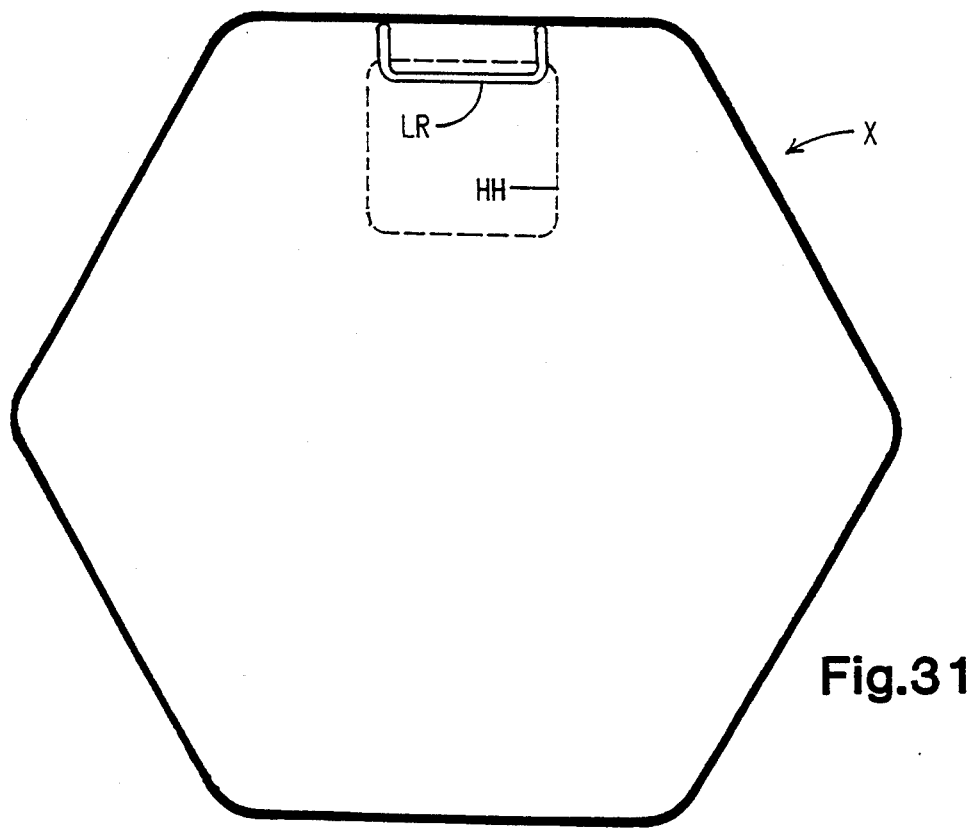
FIG. 31 is a top plan view of a vertically disposed doorless and windowless hexagonal building module of this invention for use as a granary, bulk storage bin, or tank.

FIG. 31 depicts the building module X used a granary, bulk storage bin, silo or tank accessible through roof-hatch HH via ladder LR.

Figure 32:
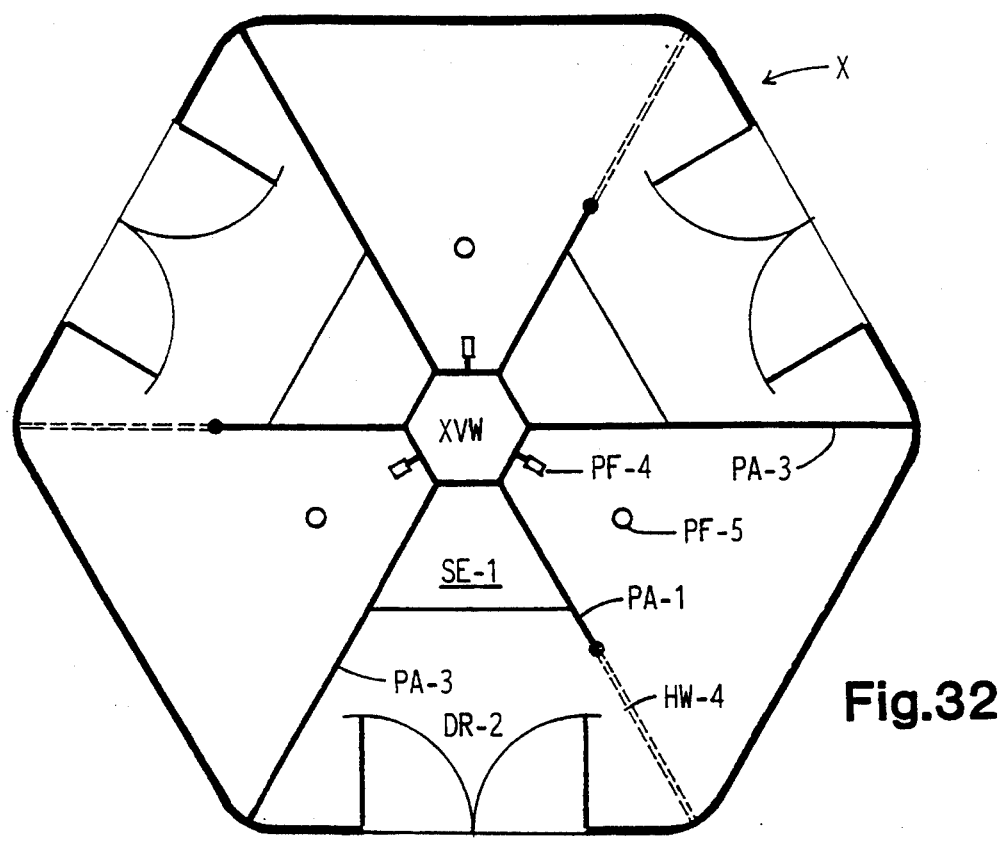
FIG. 32 is a top plan view of a vertically disposed hexagonal building module having three separate compartments, each with a door, equipped for showers and dressing rooms.

FIG. 32 depicts the module X equipped with three combination shower and changing compartments each having a door DR-2 to provide ingress and egress. The dressing and shower spaces of each of the three compartments are separated by a panel PA-1 extending radially from a hexagonal vent shaft XVW a curtain rod HW-4 spans the outer end of the panel PA-1 and the associated all of the module for supporting a shower curtain. The other wall of the shower compartment is defined by a partition PA-3 which extends between the shaft HVW and the outer wall of the module. A shower head PF-4 and floor drain PF-5 complete the shower compartment which already has inner membrane XE-2 for a finished floor. The dressing compartment includes a horizontally disposed seat SE-1 which spans the associated divider panels PA-1 and PA-3.

Figure 33:
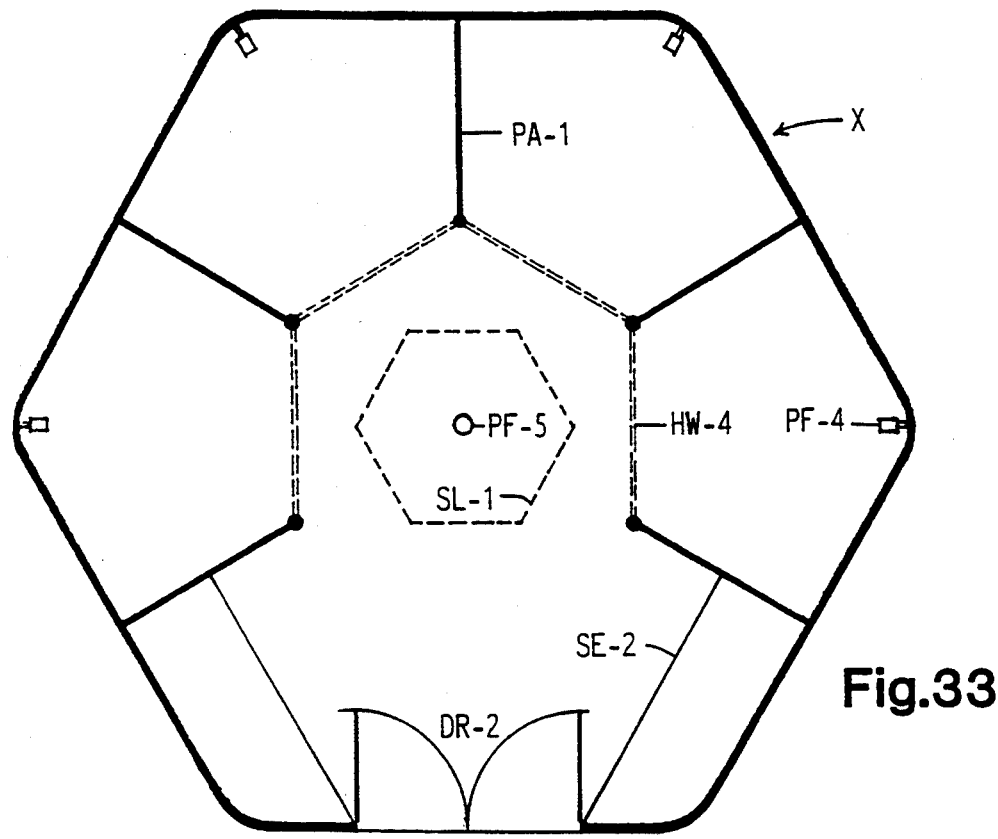
FIG. 33 is a top plan view of a vertically disposed hexagonal building module having a single door and equipped for showers with a dressing area.

FIG. 33 depicts another combination shower and dressing room configuration for the hexagonal building module X. In accordance with this arrangement, five spaced panels PA-1 are provided to define four shower compartments each having a shower head PF-4. Spanning the inner vertical edges of each pair of panels PA-1 defining each shower compartment is a curtain rod HW-4 for supporting a shower curtain. A central floor drain PF-5 is provided above which is located a ventilating skylight SL-1. A pair of seats SE-2 flank a door DR-2.

Figure 34:
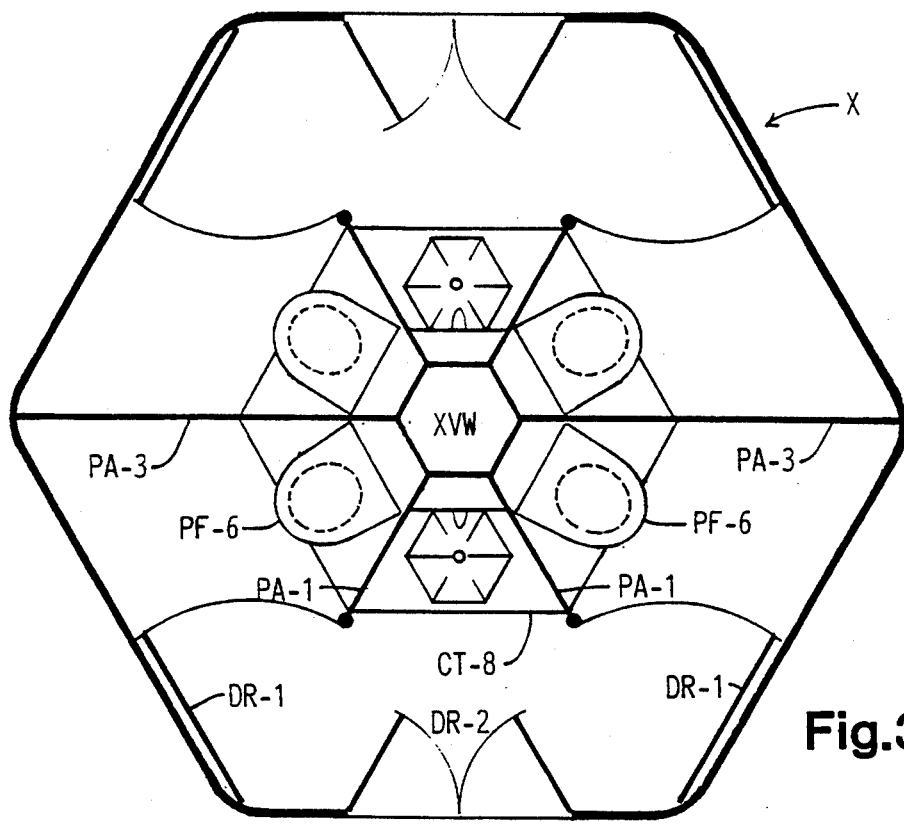
FIG. 34 is a top plan view of a vertically disposed hexagonal building module divided into two separate compartments, each having its own door, which compartments have two separate door-accessible commode areas separated by a lavatory sink unit.

FIG. 34 discloses a module X equipped with two lavatory compartments each of which is accessible form the outside by a door DR-2. The lavatory compartments accessible from the doors DR-2 are separated from each other by panels PA-3 which extend radially in opposite directions from the central vent shaft XVSW. Each lavatory compartment accessible via doors DR-2 is identical, and includes two panels PA-1 extending radially outwardly from the vent shaft XVSW. Panels PA-1 divide their respective lavatory compartments accessible via doors DR-2 into three sub-compartments, which include a lavatory sink-top CT-8 disposed between commodes PF-6. The commode sub-compartments are accessible via doors DR-1 from the sub-compartment containing the lavatory sink-top CT-8.

Figure 35:
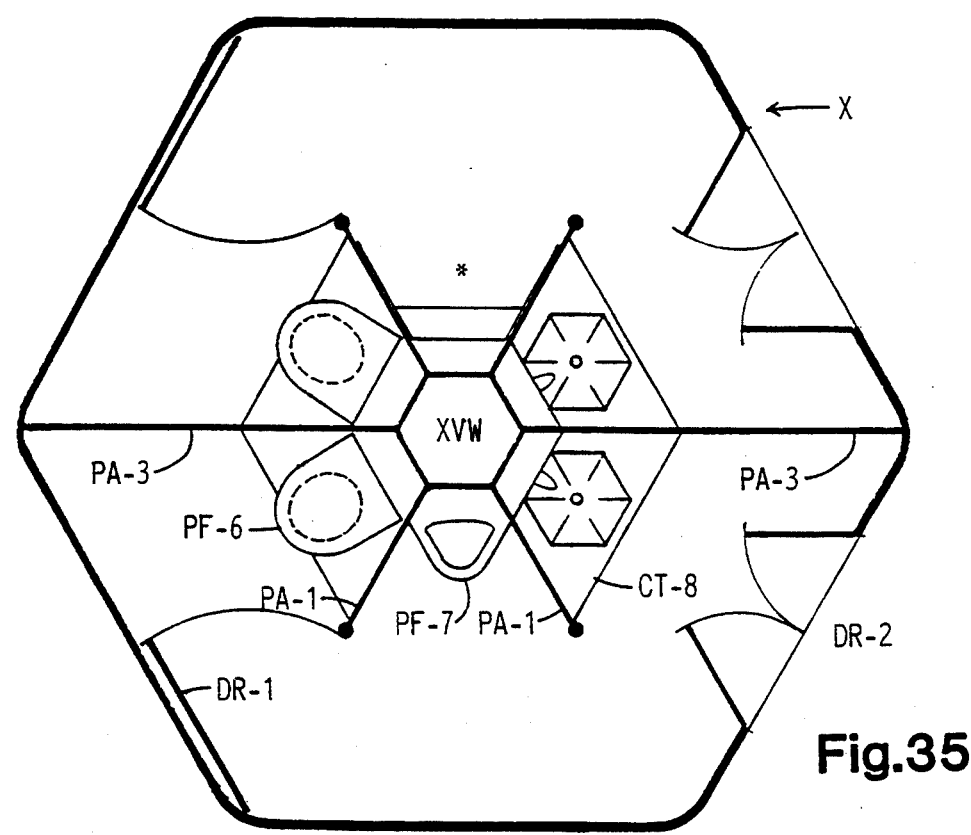
FIG. 35 is a top plan view of a vertically disposed hexagonal building module showing a different lavatory configuration.

FIG. 35 depicts a still further lavatory configuration for the building module X. In accordance with this arrangement, the module is divided into two identical compartments by a pair of panels PA-3 extending in opposite directions from the vertical vent shaft XVW. The two compartments are identical in configuration and each include a pair of panels PA-1 extending radially from the vent shaft XVSW to define three sub-compartments. One of the sub-compartments contains a urinal PF-7, another contains a commode PF-6, and third contains a lavatory sink-top CT-8. The commode sub-compartment is accessible via a swinging door DR-1. The two lavatory compartments are each accessible via swinging doors DR-2. If desired, in lieu of a urinal PF-7 in one of the lavatory compartments accessible via door DR-2, a three-way mirror and make-up shelf may be provided as designated by the asterisk.

Figure 36:
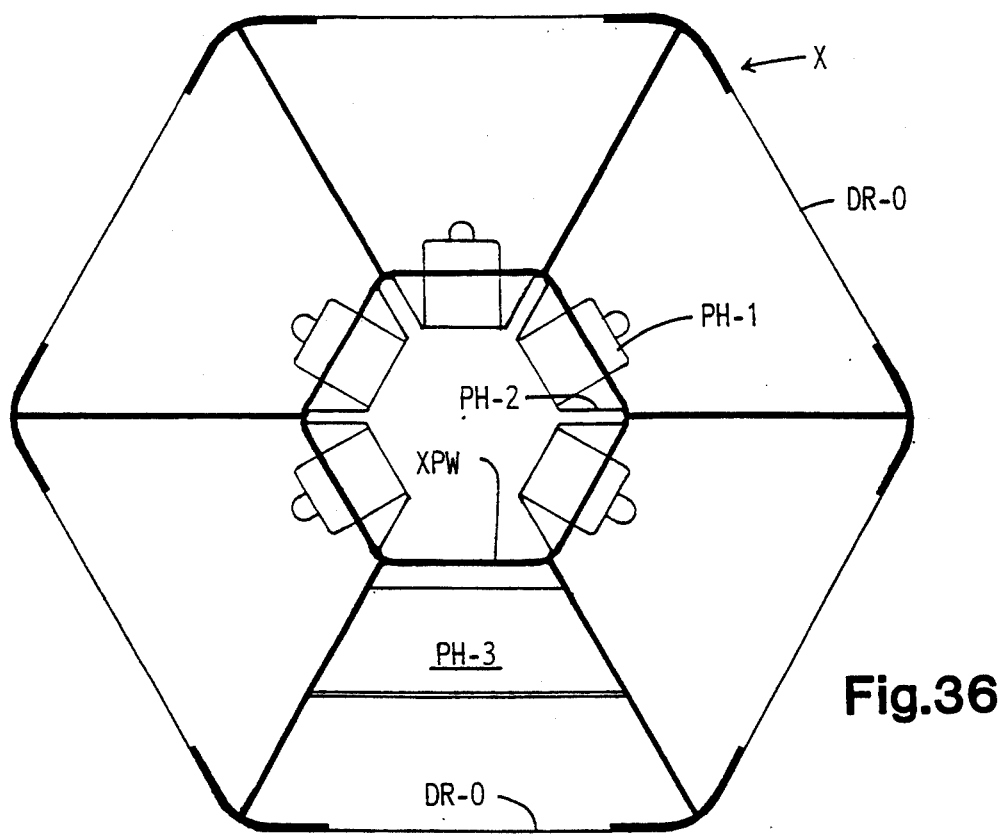
FIG. 36 is a top plan view of a vertically disposed hexagonal building module equipped for use as a multi-booth telephone unit.

FIG. 36 depicts the module X of this invention used as a multicompartment telephone booth. Each of the compartments is accessible via a doorless doorway DR-0. Five of the six compartments include a standard coin telephone PH-1 supported by a centrally disposed hexagonal column XPW. The remaining compartment includes a telephone directory shelf PH-3 with telephone book storage below it.

Figure 37:
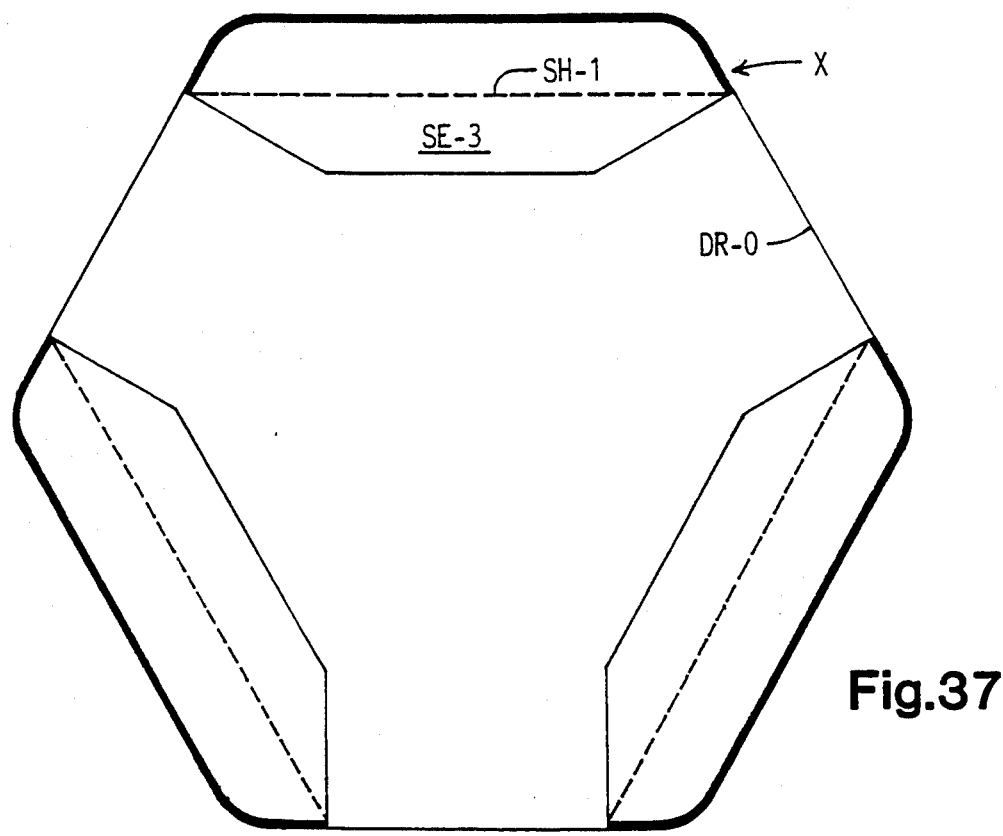
FIG. 37 is top plan view of a vertically disposed hexagonal building module equipped with doors, seats and shelves for use as a shelter at a bus stop or as a merchant's kiosk.

FIG. 37 depicts the module X of this invention equipped with three doorless doorways DR-0 between which are placed seats SE-3 and one or more overhead shelves SH-1. A module so equipped can be used as a merchant's kiosk or in-store boutique, as a sheltered waiting space, such as at a bus stop, or as a backyard gazebo.

Figure 38:
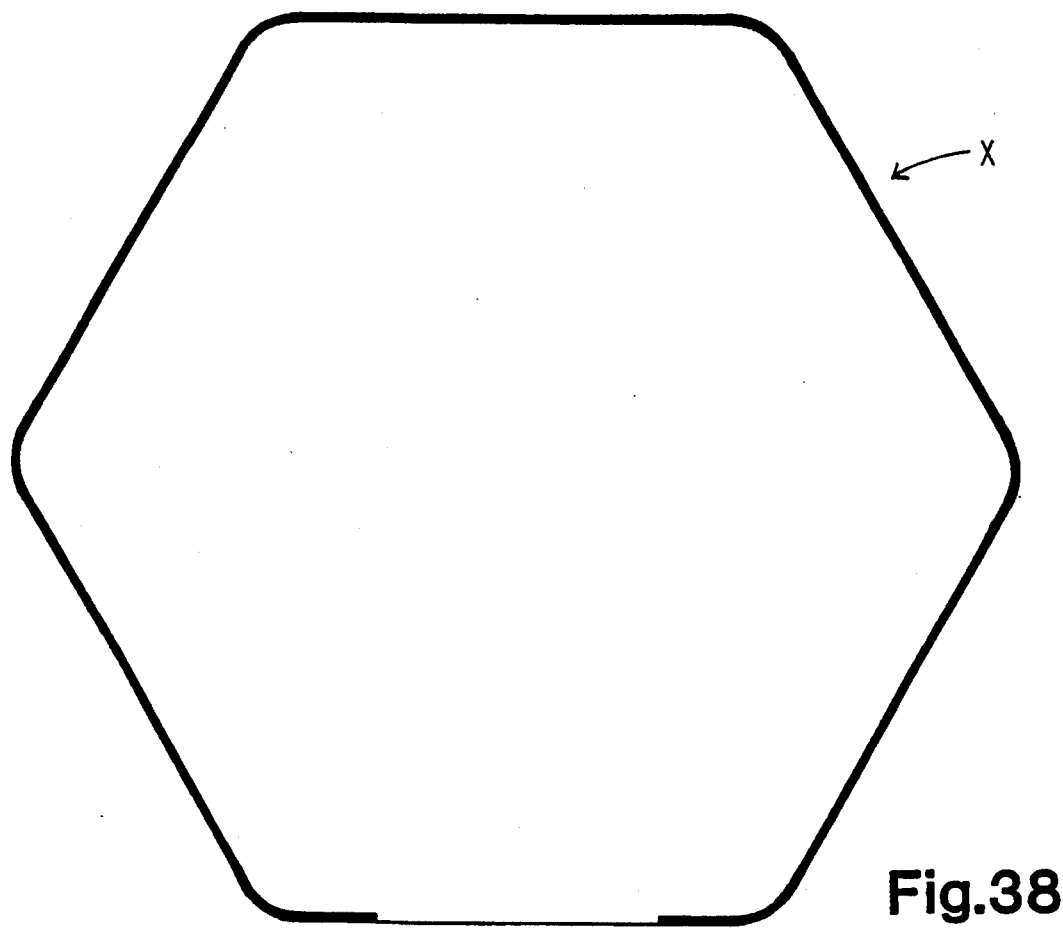
FIG. 38 is a top plan view of a vertically disposed hexagonal building module having a single door for general purpose use.

FIG. 38 depicts the module X of this invention provided only with a doorless door opening DR-0 to be equipped, as desired, as a living space or the like.

Figure 39A:
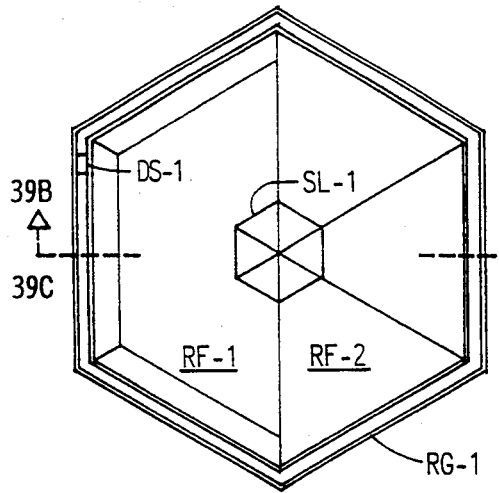
FIG. 39A is a top plan view of a vertically disposed hexagonal building module showing a hexagonal-pyramidal roof on the right side and a flat roof on the left side.
Figure 39B:
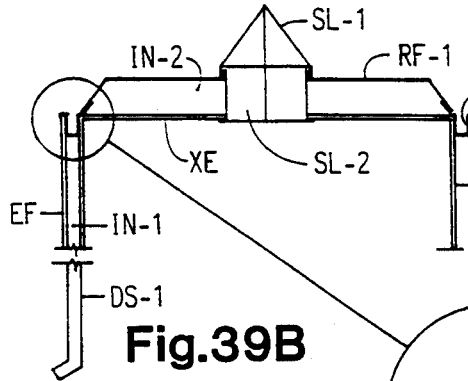
FIG. 39B is a vertical cross-sectional view along lines 39B—39B of FIG. 39A, assuming the module of FIG. 39A to have a flat roof over the entire module.
Figure 39C:
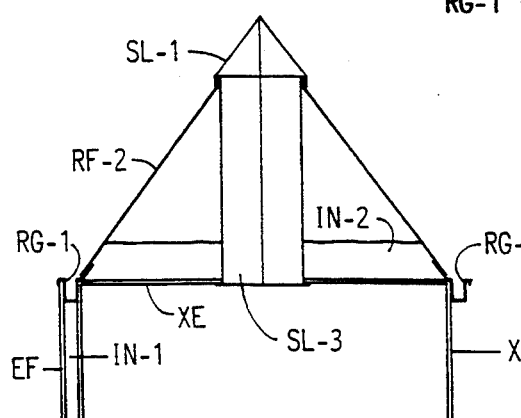
FIG. 39C is a vertical cross-sectional view along line 39C—39C of FIG. 39A, assuming the module of FIG. 39A to have a hexagonal-pyramidal roof over the entire module.

FIGS. 39A, 39B and 39C depict possible roof configurations for the module X of this invention. As shown in FIG. 39C, a roof module RF-2 may be provided in pyramidal form consisting of six triangular panels disposed around a hexagonal light shaft SL-3 at the top of which is a pyramidal skylight SL-1. A gutter RG-1 encircles the lower edge of the pyramidal roof. As shown in the lower left corner of FIG. 39C, the gutter RG-1 can be located between the module wall and an exterior finish panel EF applied over rigid insulation IN-1. Alternatively, and as shown in the lower right portion of FIG. 39C, the rain gutter RG-1 can be disposed outboard of the upper portion of the walls of the module X. FIG. 39B depicts a flat roof RF-1 at the center of which is a light shaft SL-2 at the top of which is a pyramidal skylight SL-1. A rain gutter RG-1 surrounds the perimeter of the roof RF-1. As shown in the lower left portion of FIG. 38B, the rain gutter may be located between the upper edges of an exterior finish wall EF and the wall of the module X. Positioned below the roof gutter RG-1 is rigid insulation IN-1. A concealed downspout DS-1 may connect the rain gutter RG-1 to the exterior of the building or to a storm drain. The downspout DS-1 is located between the wall of the module X and the finished wall EF in the space containing the rigid insulation IN-1. Loose insulation IN-2 can be located in the space between the upper end cap XE of the module X and the roof module RF-1 or roof module RF-2.

Figure 40A:
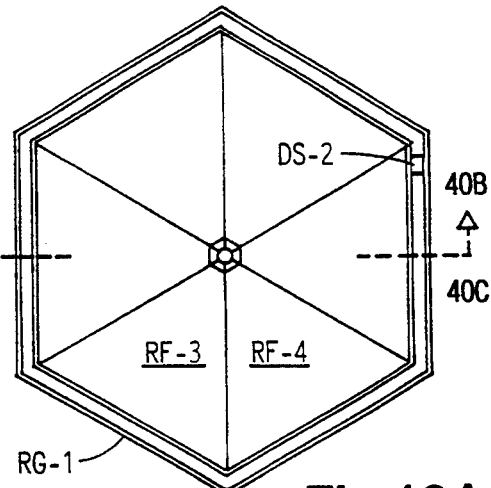
FIG. 40A is at top plan view of a vertically disposed hexagonal building module showing a hexagonal dome-shaped roof on the left side and a hexagonal spire roof on the right side.
Figure 40B:
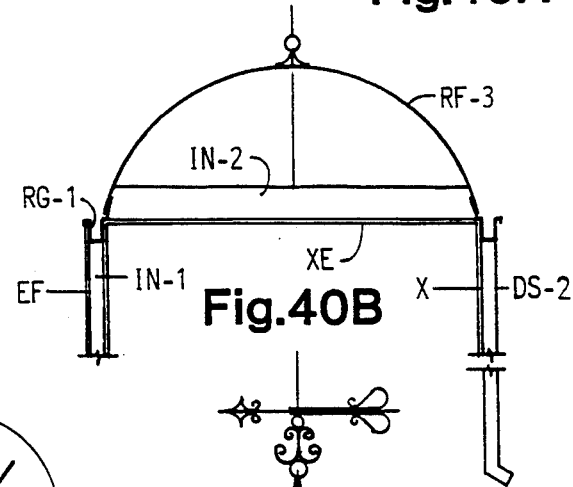
FIG. 40B is a vertical cross-sectional view along line 40B—40B of FIG. 40A, assuming the module of FIG. 40A to have a hexagonal dome roof over the entire module.
Figure 40C:
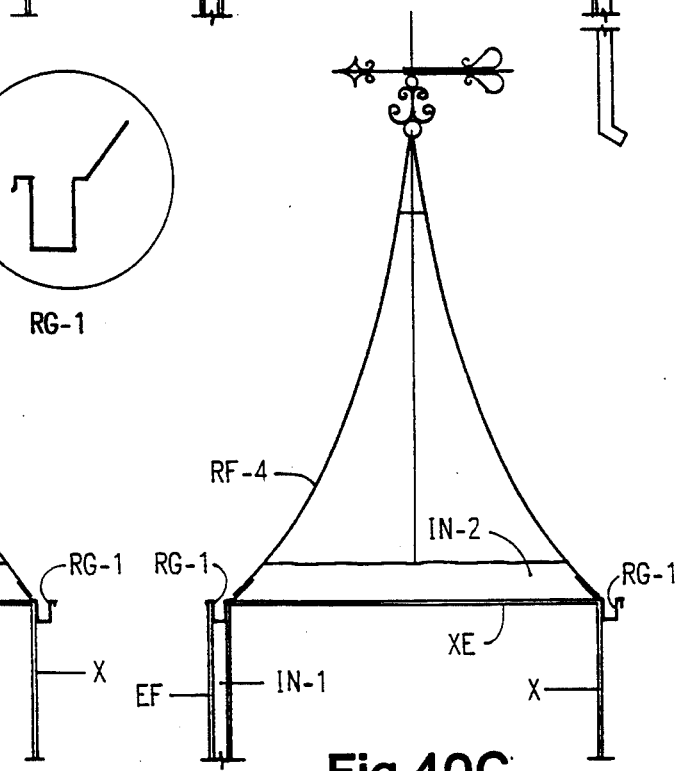
FIG. 40C is a vertical cross-sectional view along line 40C—40C of FIG. 40A, assuming the module to have a spire roof over the entire module.

If desired, hexagonal dome roof RF-3 may be provided, as shown in FIG. 40B and in the left hand section of FIG. 40A, are hexagonal spire RF-4 as shown in FIG. 40C and the right half of FIG. 40A. The details of the rain gutter RG-1 and rigid insulation IN-1 exterior finish EF and loose insulation IN-2 depicted in connection with FIGS. 40A, 40B and 40C are the same as in connection with the flat and hexagonal-pyramidal roofs RF-1 and RF-2 depicted in connection with FIGS. 39A, 39B and 39C.

As shown in FIG. 41A and 41B, the modules X can be vertically stacked one on top of the other with a spiral stair unit XSW located centrally therein, containing a spiral stair with constructed in accordance with FIG. 25. An intermediate roof, molded with an integral rain gutter and supporting six floor grates FG can be provided exteriorly of the stacked modules with an appropriate railing RA-1 at the perimeter thereof. The upper module X can be provided with appropriate doorless doorways DR-0 if desired, to facilitate use as a lookout or a minaret. Exterior finish EF can be located in surrounding relationship to the stacked module X with rigid insulation IN-1 disposed therebetween and with splice rings SR surrounding and reinforcing the joint between each stacked module. A step pyramidal roof RF-6 can be placed atop the upper stacked module X.

Figure 42A:
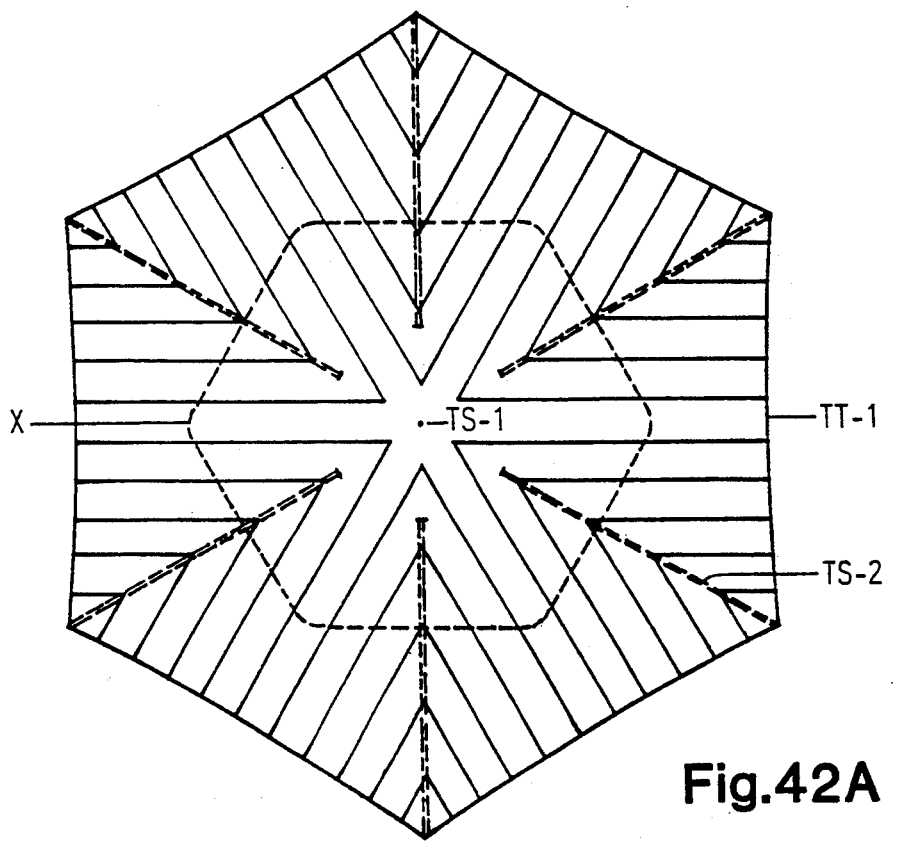
FIG. 42A is a top plan view of a vertically disposed hexagonal building module of this invention equipped with a tent top.
Figure 42B:
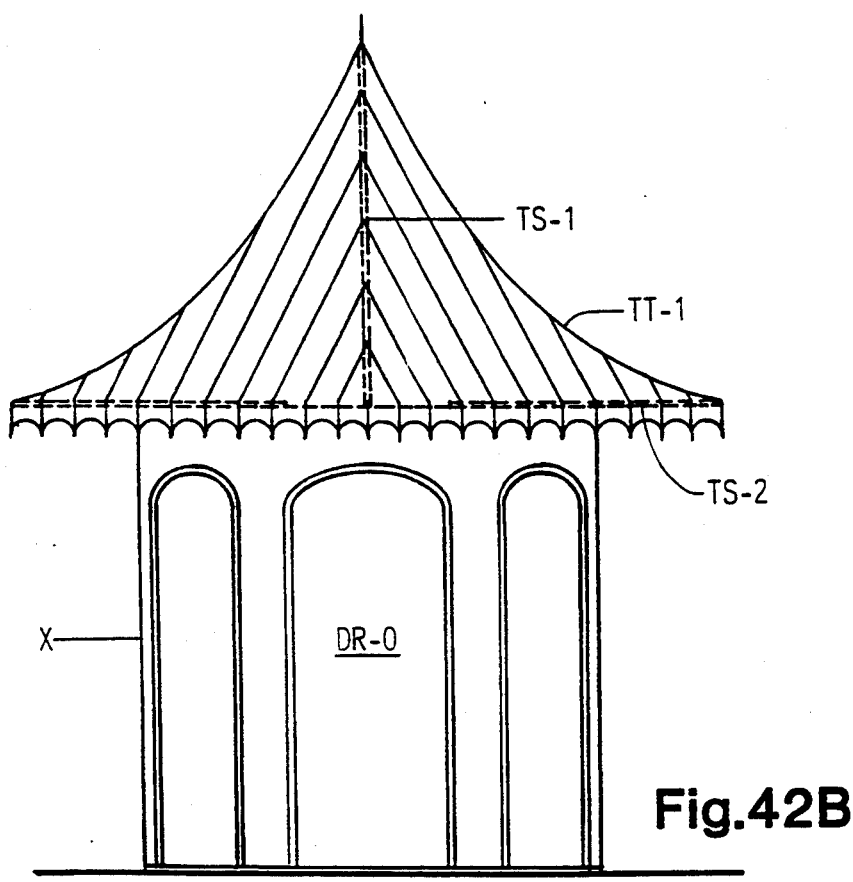
FIG. 42B is a front elevational view of the building module of FIG. 42A.

FIGS. 42A and 42B depict the module X with a plurality of doorless doorways DR-0 and each wall thereof with a tent top TT-1. Appropriate tent-supporting struts TS-1 and TS-2 are provided. Struts TS-1 is vertically disposed in the center of the tent top while struts TS-2 are horizontally disposed.

Figure 43A:
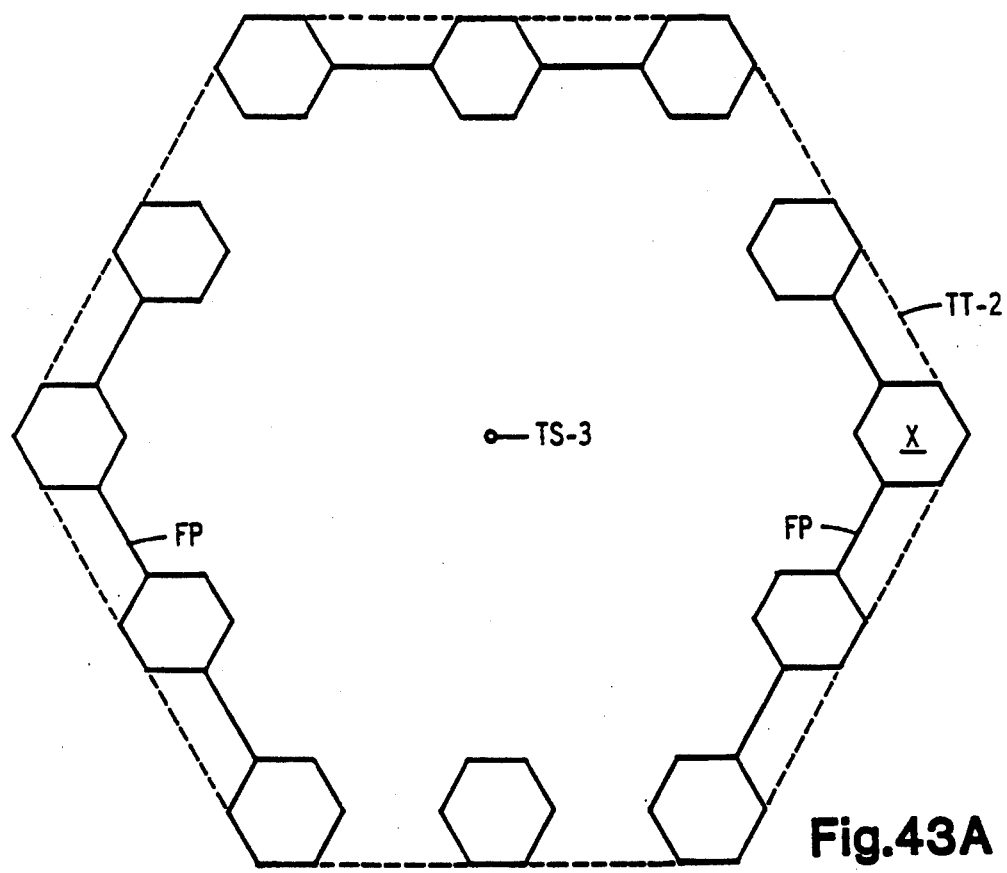
FIG. 43A is a top plan view of a plurality of vertically disposed hexagonal building modules of this invention arranged in spaced horizontal relationship with flat filler panels connecting the building modules to define and enclose a polygon at which corners are located some of the hexagonal building modules and over which a tent roof is to be erected.
Figure 43B:
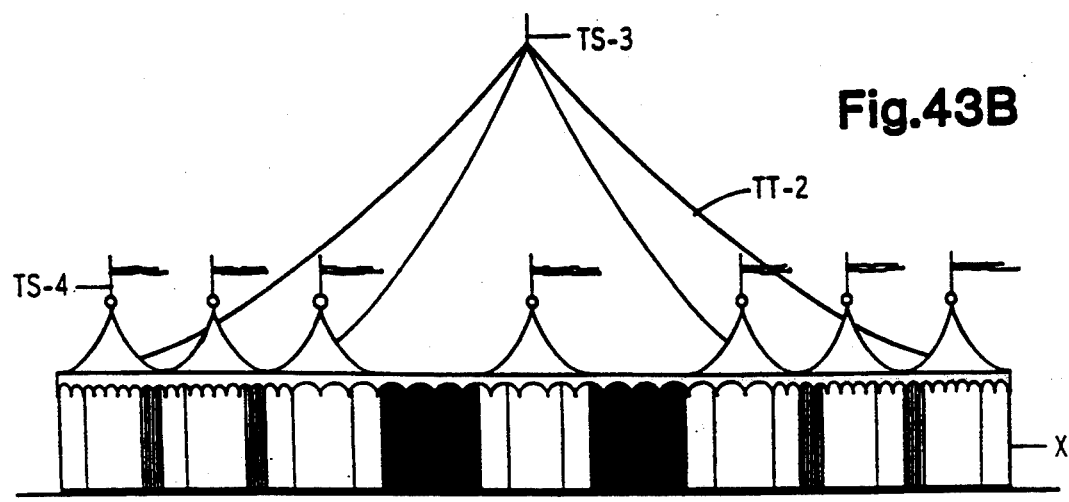
FIG. 43B is a front elevational view of the building system of FIG. 43A.

FIG. 43A shows a plurality of building modules X disposed in a generally hexagonal configuration with certain of the modules X disposed at the corners of the hexagon. Flat wall panels FP connect certain ones of the modules X to partially enclose the building. A tent top TT-2 supported from a central vertical strut TS-3 provides the roof structure along with spire struts TS-4 atop each module X. If complete enclosure is desired, all intermodular spaces can be closed with flat wall panels FP with ingress and egress provided through selected modules equipped with air-lock or revolving door entrances as described in FIGS. 28 and 29. With complete enclosure and blowers in other selected modules a modified tent top could thus be supported by air pressure and the strut TS-3 removed, and year-round climate control provided.

Figure 44:
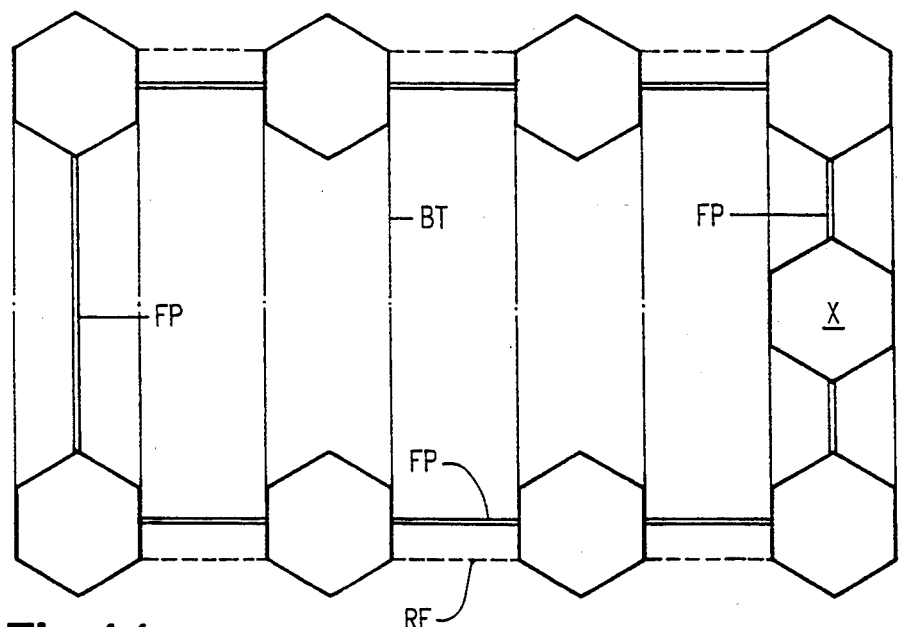
FIG. 44 is a top plan view of a plurality of vertically disposed hexagonal building modules of this invention arranged in spaced horizontal relationship to define a generally rectangular building with flat filler panels connecting the building modules.

FIG. 44 depicts a plurality of building modules X arranged to define a generally rectangular building.

Filler panels FP interconnect the various modules X to enclose the building. Beams or trusses BT can be provided to span the modules X for supporting a flat, pitched or arched roof RF.

Figure 45:
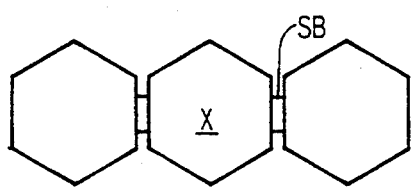
FIG. 45 is a top plan view of a plurality of vertically disposed hexagonal building modules of this invention arranged in generally side-by-side relationship with spacer blocks therebetween.

FIG. 45 depicts three modules X supported in side-by-side relation with a spacer block SB between adjacent modules.

Figure 46:
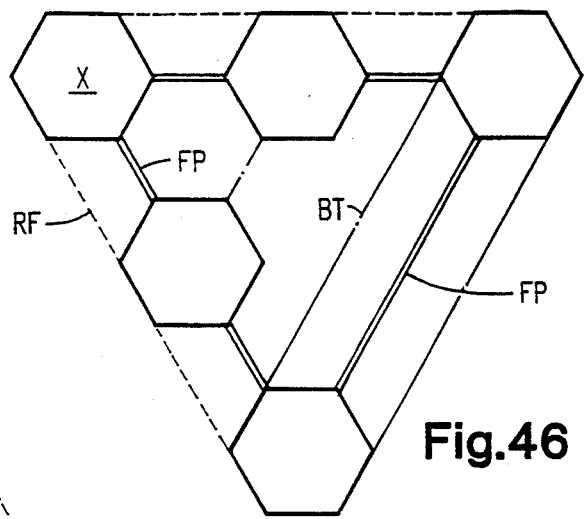
FIG. 46 is a top plan view of a plurality of vertically disposed hexagonal building modules of this invention arranged in spaced horizontal relationship with flat filler panels connecting the building modules to define and enclose a triangular building with hexagonal building modules at each corner.

FIG. 46 depicts five modules X disposed in a generally triangular configuration with filler panels FP interconnecting the various modules to enclose the space. Beams BT span between the modules X supporting a roof RF over the entire building.

Figure 47:
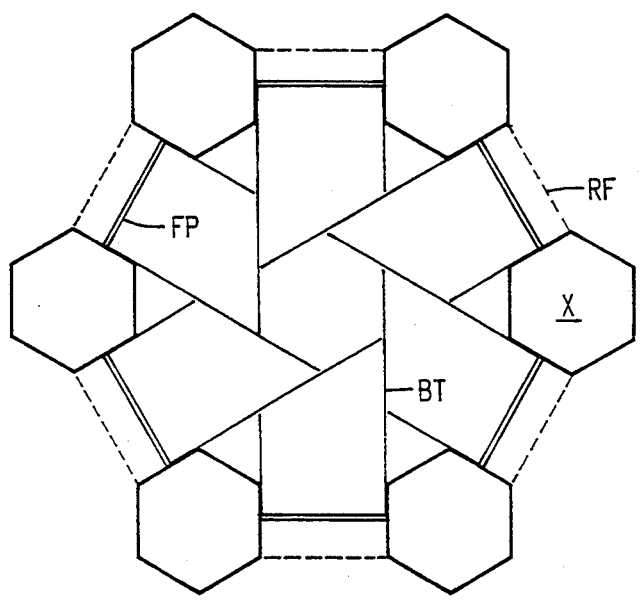
FIG. 47 is a top plan view of a plurality of vertically disposed hexagonal building modules of this invention arranged in spaced horizontal relationship with flat filler panels connecting the building modules to define and enclose a hexagonal building with hexagonal building modules at each corner.

FIG. 47 depicts six modules X disposed in a generally hexagonal configuration with filler panels FP interconnecting adjacent modules. Beams BT are provided spanning various modules X for supporting intermediate floors in a multistory stacked module structure and a roof RF.

Figure 48:
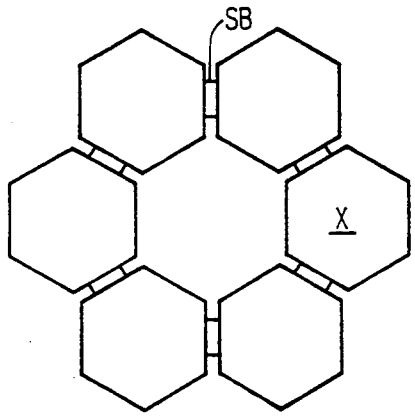
FIG. 48 is a top plan view of a plurality of vertically disposed hexagonal building modules of this invention arrange in spaced horizontal relationship with spacer blocks disposed between the building modules to define and enclose a hexagonal floor plan.

FIG. 48 depicts six modules X disposed in a generally circular configuration with spacer blocks SB between adjacent modules.

Figure 49:
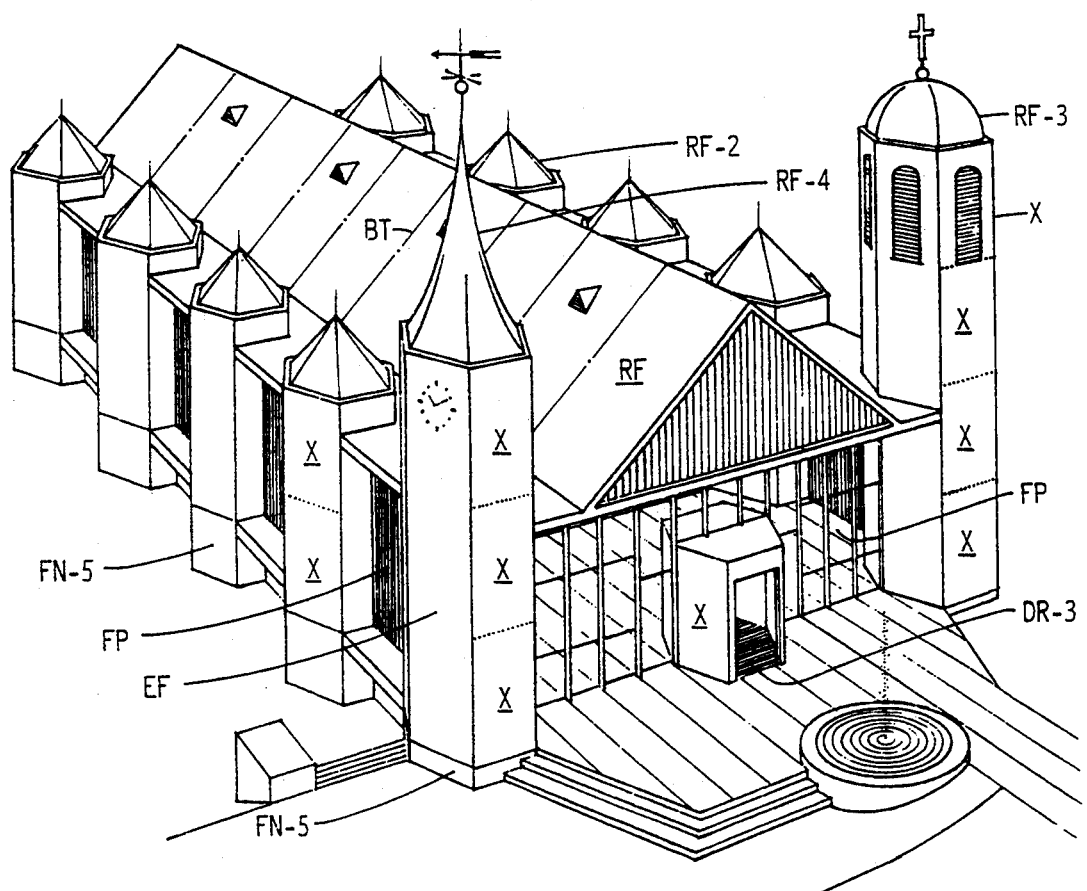
FIG. 49 is a perspective view of a plurality of vertically disposed hexagonal building module stacks arranged in spaced horizontal relationship with filler panels connecting the module stacks to define and enclose a rectangular building topped by a conventional wood-truss pitched roof.

FIG. 49 depicts 10 vertical stacks of modules X disposed in a generally rectangular configuration. Eight of the module stacks each have two stacked modules, while a ninth stack has three stacked modules and the tenth stack has four stacked modules. The dual module stacks have pyramidal roofs RF-2 while the triple module stack has a spire roof RF-4. The quad module stack has a dome roof RF-3. Appropriate foundations FN-5 are provided under each module stack. Suitable filler panels of various configurations span between the adjacent module stacks. The central space thus defined is sheltered by a pitched roof structure RF supported by ten trusses BT spanning between the two rows of stacked modules. The filler panel between the triple and quad module stacks is provided with a entry module X having glazed air-lock entry doors DR-3 as shown in FIG. 28.

Figure 50:
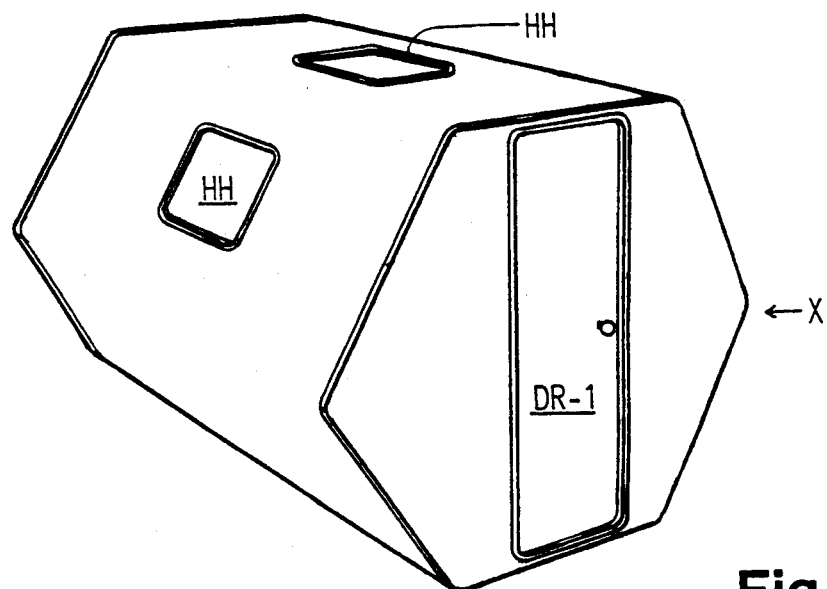
FIG. 50 is a perspective view of the hexagonal building module of this invention with its longitudinal axis of symmetry disposed horizontally which is equipped with a door and hatches.
Figure 51:
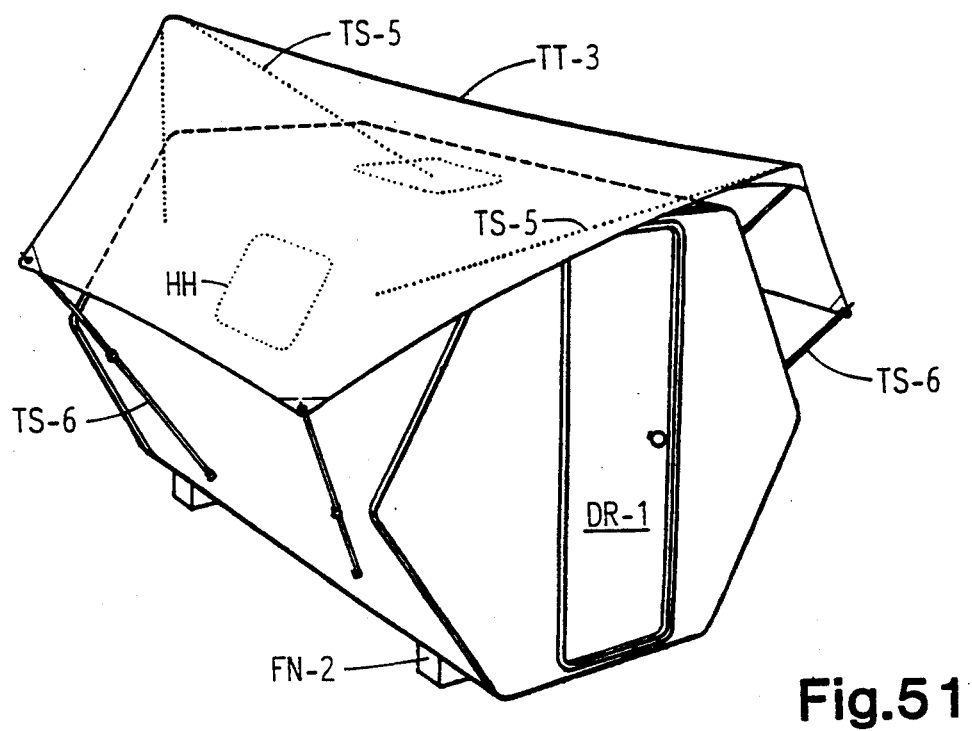
FIG. 51 is a view similar to that of FIG. 50, showing the module provided with a ventilating tent top.

FIGS. 50–77 depict a further preferred embodiment of the hexagonal building module of this invention in which the hexagonal module X is rotated 90° from the disposition of the embodiment shown in FIGS. 1–49. The hexagonal building module of FIGS. 50–79 is oriented such that its walls collectively define a hexagonal structure having its central symmetrical axis disposed parallel to the ground, that is, horizontally, rather than vertically as shown in FIGS. 1–49. Appropriate end panels XE at opposite ends of the horizontally disposed hexagonal module enclose the module. End panel XE, as shown in FIG. 50, is provided with a door 12. If desired, the opposite end panel XE can be provided with a window W (not shown) and one or more hinged roof hatches HH having optional screens. As shown in FIG. 51, a tent top TT-3 can be placed over the module of FIG. 50, supported by struts TS-6 to provide shade and ventilation when it rains. Blocks FN-2 support the module X spaced above the ground.

Figure 52A:
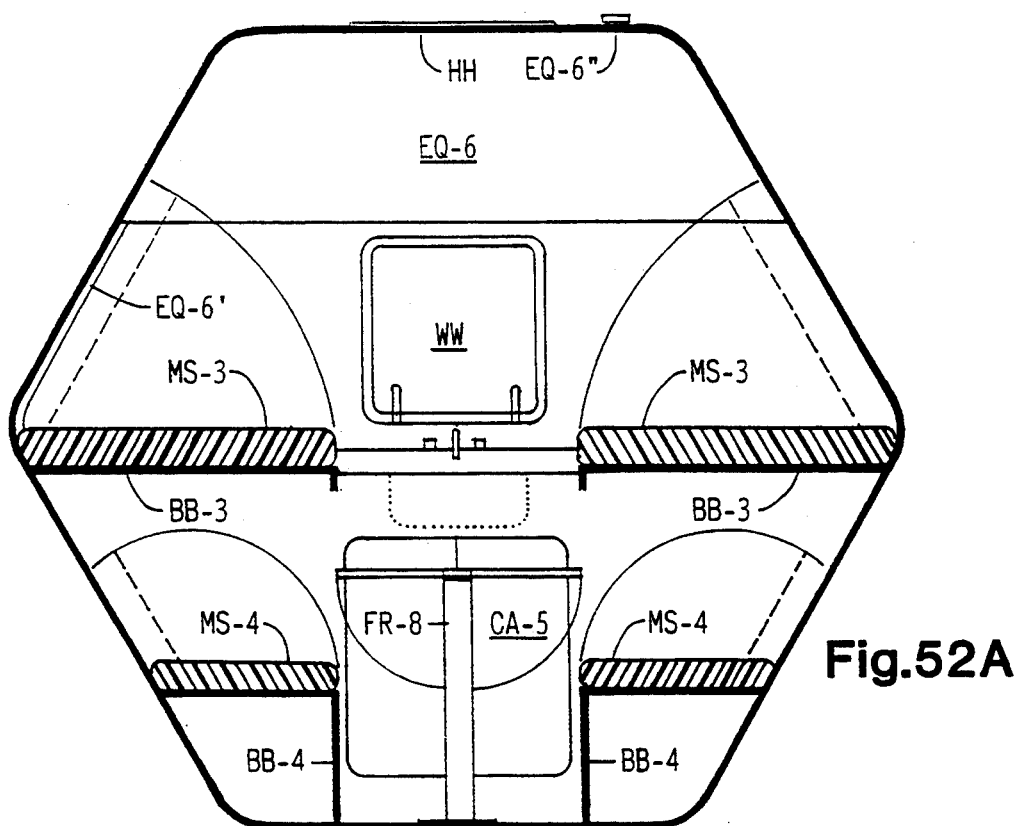
FIG. 52A is a vertical cross-sectional view along lines 52A—52A of FIG. 52B.
Figure 52B:
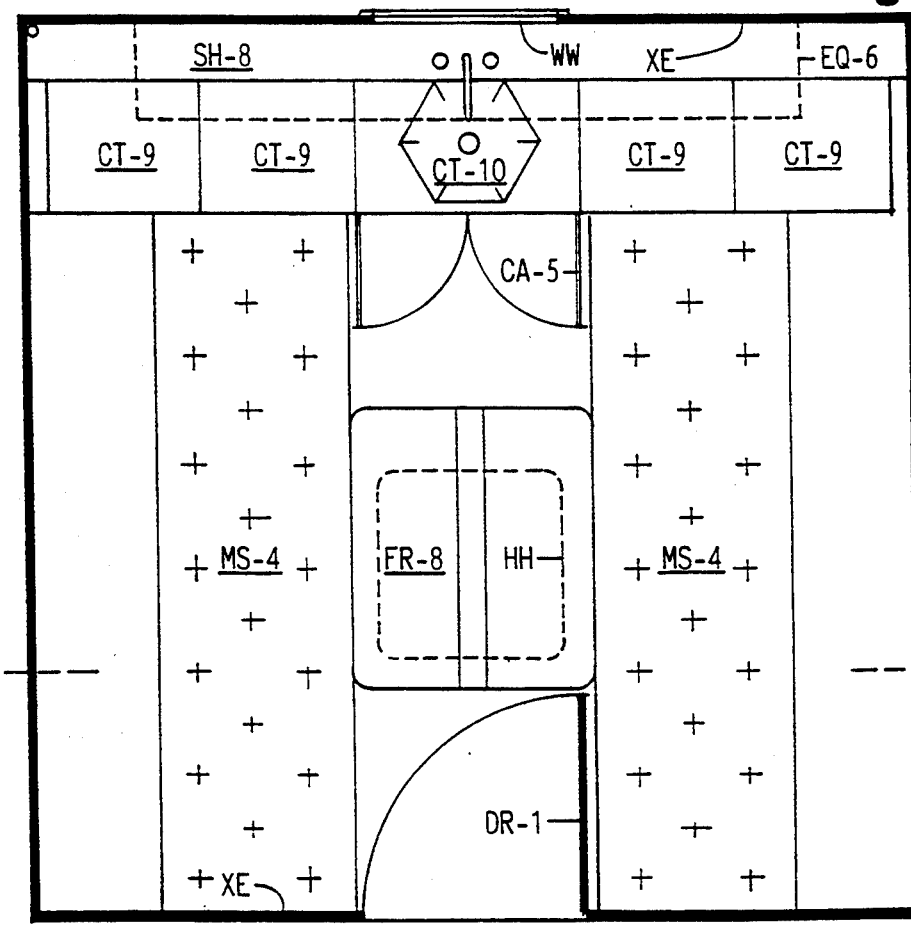
FIG. 52B is a top plan view of the hexagonal building module of this invention with its longitudinal axis of symmetry disposed horizontally which is equipped as a family living unit for emergency or recreational uses.

When the module X is horizontally disposed it can be used as a living unit as shown in FIGS. 52A and 52B. Specifically, module X is provided with hinged beds or berths BB-3, having mattresses MS-3, which in their open position are horizontally disposed and supported by suitable chains or the like interconnecting the inboard edges thereof to the module walls. When desired, the berths BB-3 can be pivoted upwardly into a stowed position against and parallel to the interior of module walls. Horizontally disposed bed bases BB-4, having mattresses MS-4, extend outwardly from the module walls below beds, BB-2. Suitable storage bins are provided under bed bases BB-4. Disposed between bed bases BB-4 is a dropleaf pedestal table FR-8. A wall hatch WW is provided in one end wall XE, a door DR-1 in the other end wall XE, and a roof hatch HH in the upper panel. A hinged sectional counter CT-9 having a bin below each section and a sink CT-10 is horizontally disposed between the bed base BB-3 and the windowed end wall XE. Located below the sink counter CT-10 is a storage cabinet having doors CA-5. An optional water storage tank EQ-6 above the sink has a gravity sink supply line EQ-6' and an external fill cap EQ-6''.

Figure 53A:
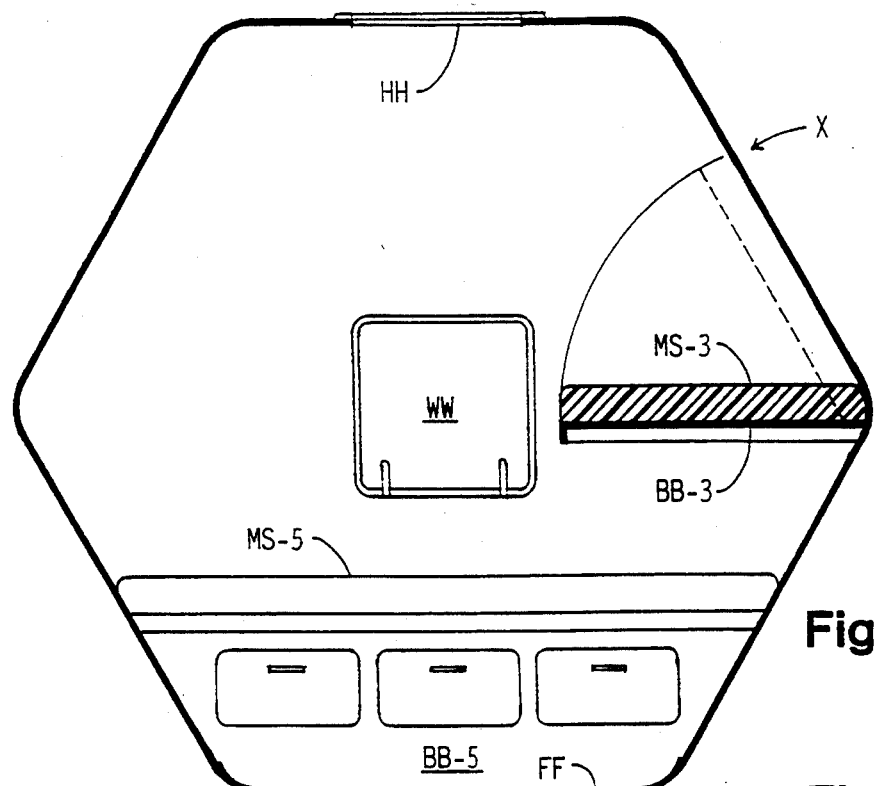
FIG. 53A is a vertical cross-sectional view along line 53A—53A of FIG. 53B.
Figure 53B:
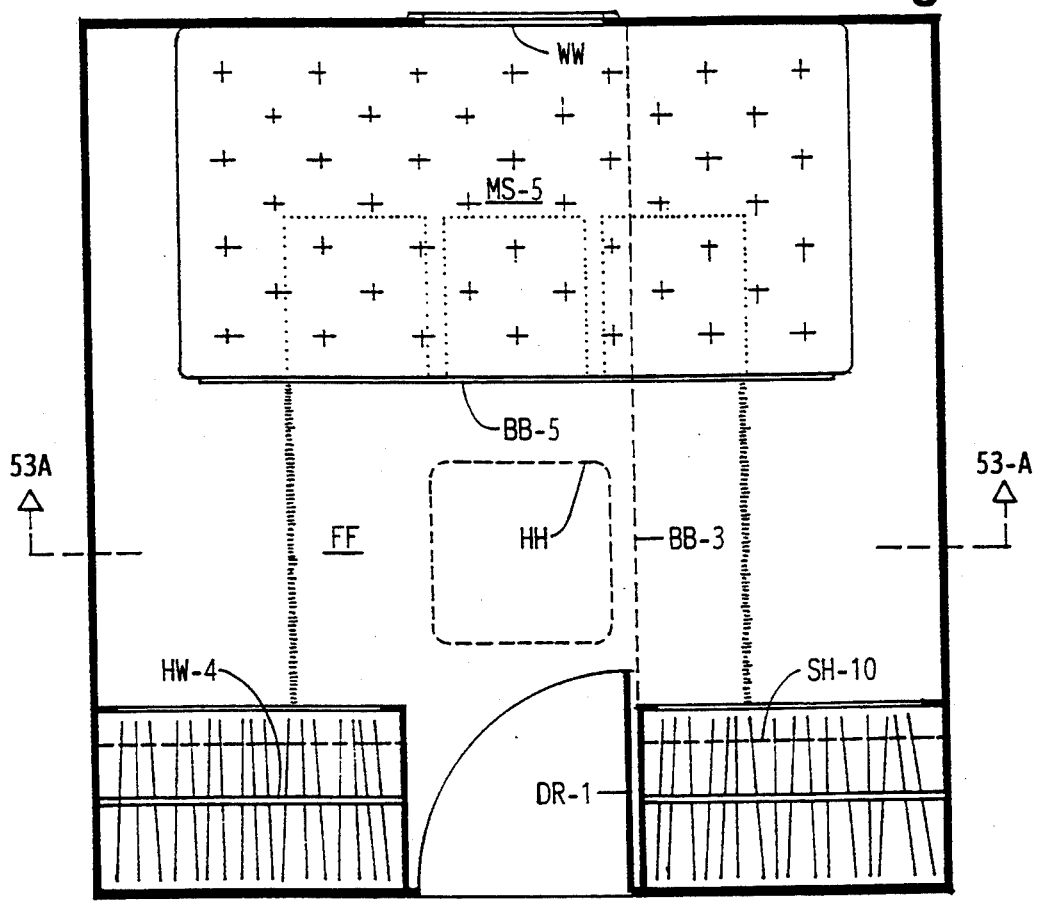
FIG. 53B is a top plan view of a horizontally disposed hexagonal building module of this invention equipped as a bedroom.

If desired, the horizontally disposed building module of this invention can be equipped as a two-bunk living space as shown in FIGS. 53A and 53B. With reference to these Figures, the sleeping space seen to include rear end-wall XE of the space a horizontally disposed lower bunk bed base BB-5 containing three drawers and supporting mattress MS-5 which extends between a pair of module walls. An optional hinged upper bunk bed BB-3 with mattress MS-5 extends between rear end panel XE and the face of an open closet. The closet and a similar closet are provided adjacent the interior of front end wall XE on either side of the door DR-1. The closets each have a clothes rod HW-4 and a shelf SH-10 above it. If desired, a hatch HH can be located in the upper module panel, and a window WW can be located in the rear vertical end wall 10-7. Carpet FF can also be provided.

Figure 54A:
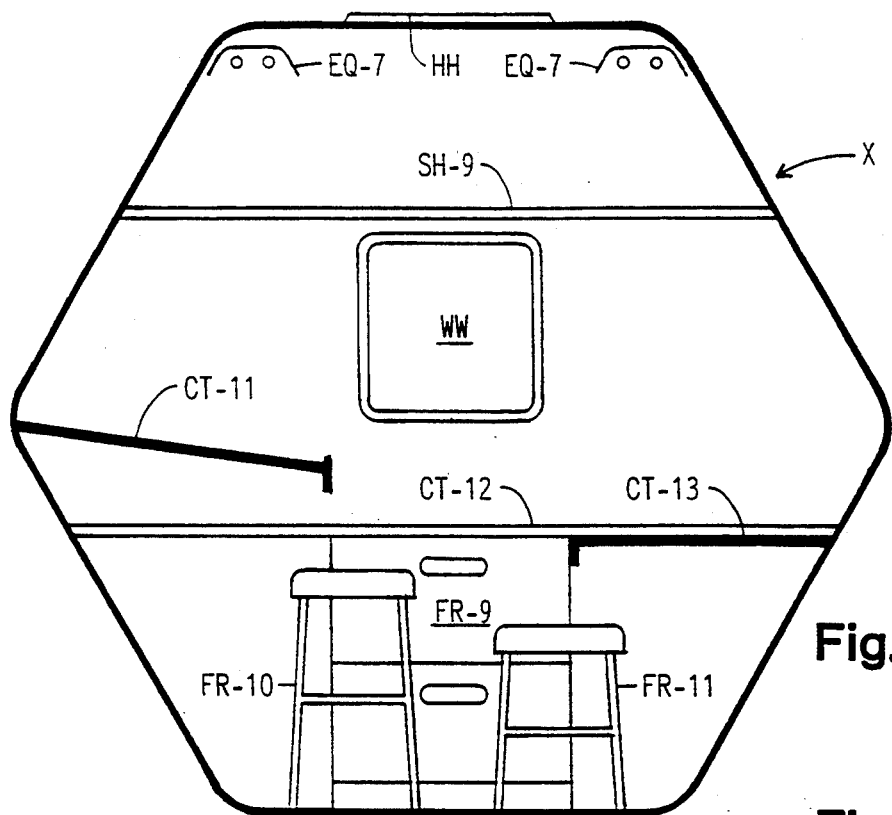
FIG. 54A is a vertical cross-sectional view along line 54A—54A of FIG. 54B.
Figure 54B:
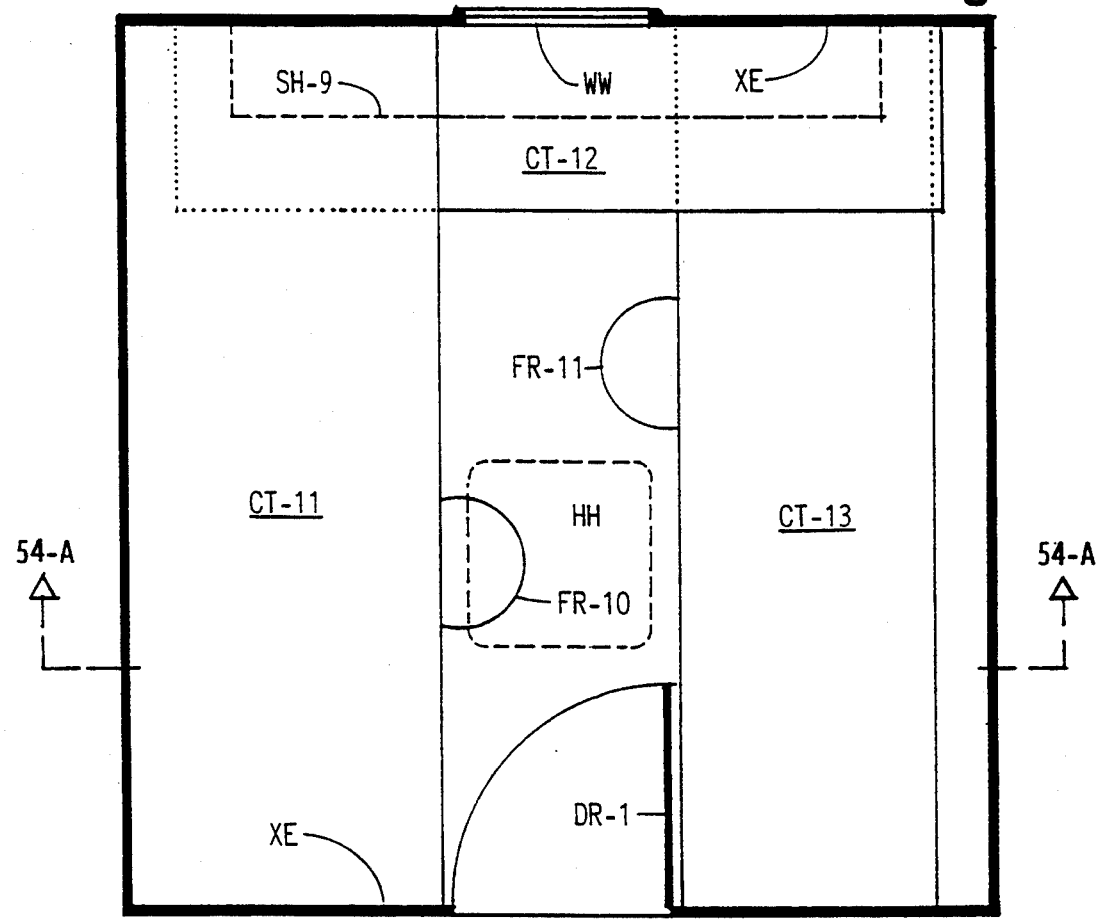
FIG. 54B is a top plan view of a horizontally disposed hexagonal building module of this invention equipped as a field or in-plant office.

As shown in FIGS. 54A and 54B, the horizontally disposed module X can be outfitted and equipped as a field office. The field office includes a shelf SH-9 extending horizontally inwardly from the inner wall of rear end panel XE above the wall-hatch WW. Extending longitudinally between the two end panels XE are tables CT-11 and CT-13 which function as drafting tables, work tables, or the like. Suitable seats FR-10 and FR-11 are provided for use with each of the tables. A hatch HH is located in the top panel of the module. Located in the uppermost corners and extending along the longitudinal axis of the building module are lighting fixtures EQ-7. A counter CT-12 extending horizontally across the inside of the rear panel XE is also provided, and has positioned below it a file cabinet FR-9. To provide convenient ingress and egress to the field office, a door DR-1 is provided in front end wall XE.

Figure 55A:
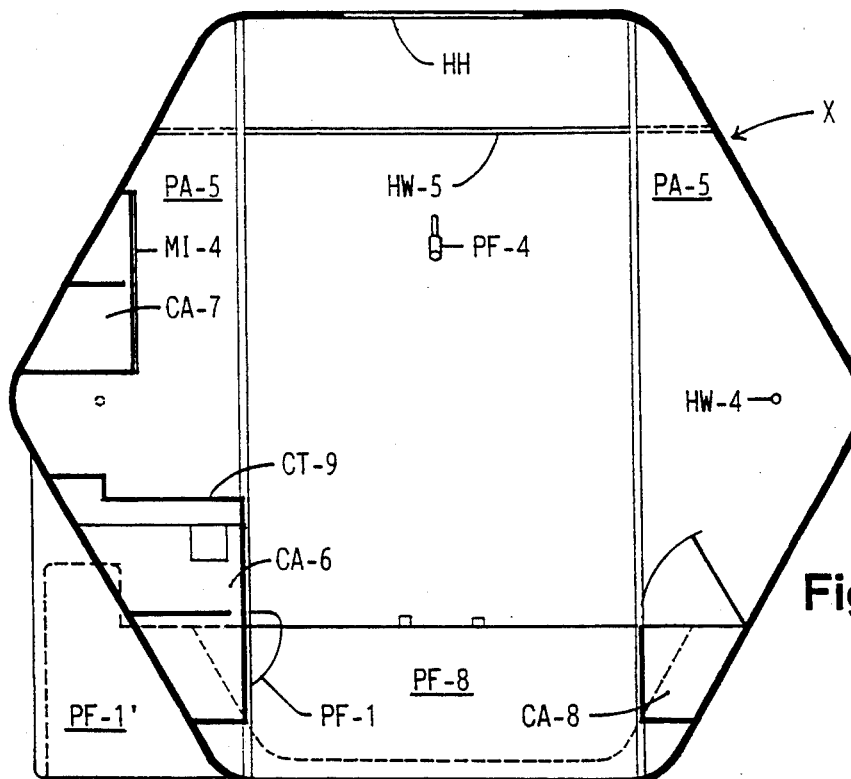
FIG. 55A is a vertical cross-sectional view along line 55A—55A of FIG. 55B.
Figure 55B:
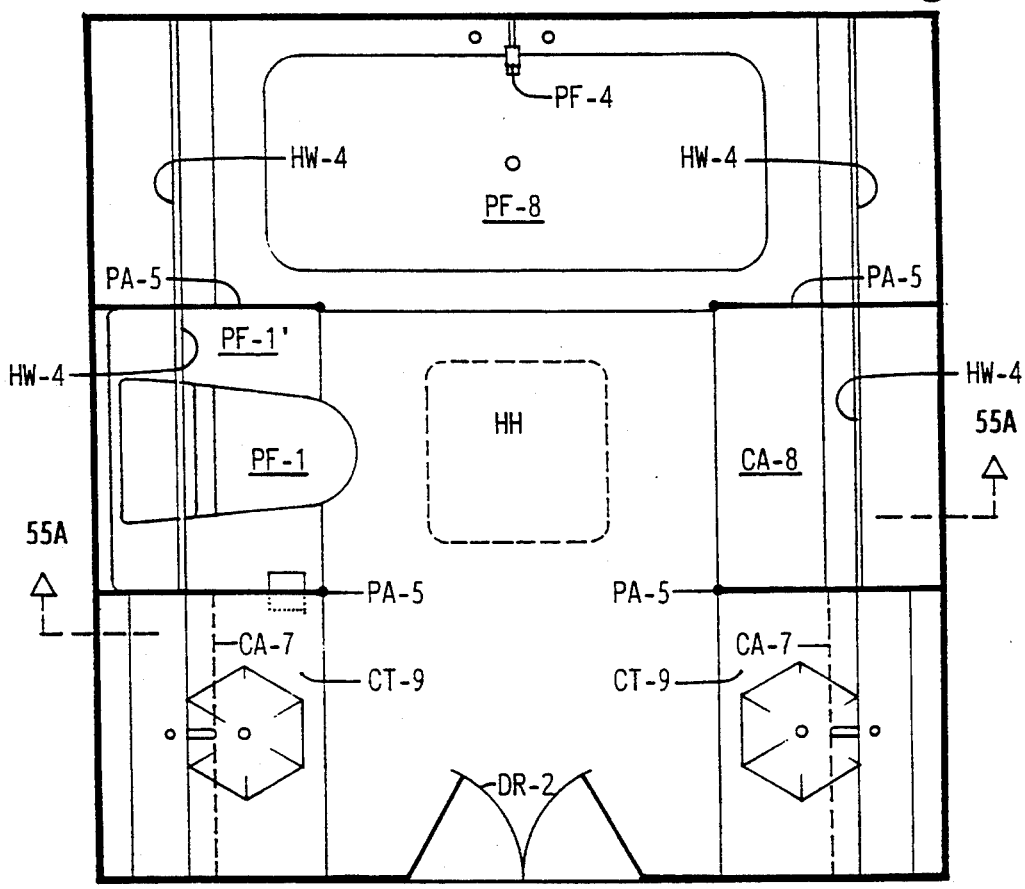
FIG. 55B is a top plan view of a horizontally disposed hexagonal building module of this invention equipped as a bathroom.

The horizontally disposed module X as shown in FIGS. 55A and 55B, can be equipped as a bathroom. To provide ingress and egress a door DR-2 is provided in the front end wall XE. Disposed adjacent the rear end wall XE is a bathtub PF-8 having a suitable spout, a shower head PF-4 and a curtain rod HW-5. Horizontally disposed towel rods HW-4 are located at opposite ends of the bathtub PF-8 and span between the end wall XE and divider panels PA-5. A second set of divider panels PA-5 are provided between which a commode housing PF-1' and a commode PF-1 are located. Opposite the commode PF-1 is a combined seat/storage compartment CA-8 with a hinged top. Located above the commode and seat/compartment CA-8 are horizontal towel bars HW-4 which span between the divider panels PA-5 at either end thereof. Located on each side of the door DR-2 are lavatory countertops CT-9 with cabinets CA-6 below them. Wall cabinets CA-7 with mirrored doors MI-4 are provided above the countertops. An exhaust fan (not shown) is located in the module wall above the commode PF-1 and in the ceiling panel a hatch HH is provided.

Figure 56A:
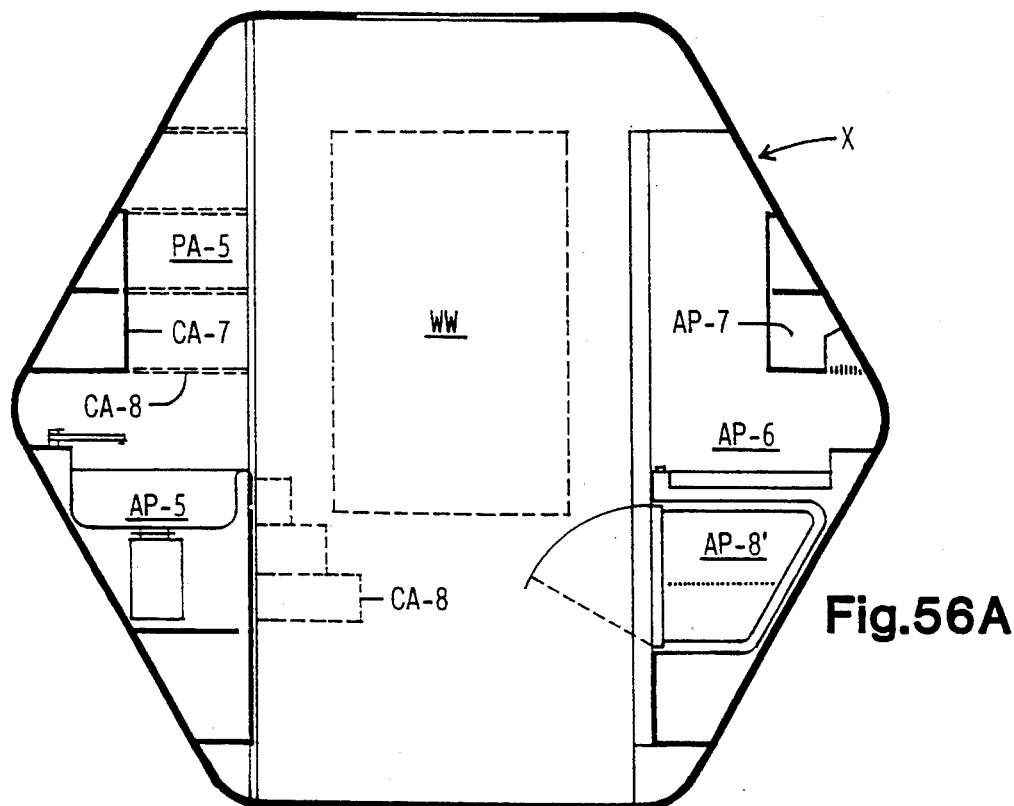
FIG. 56A is a vertical cross-sectional view along line 56A—56A of FIG. 56B.
Figure 56B:
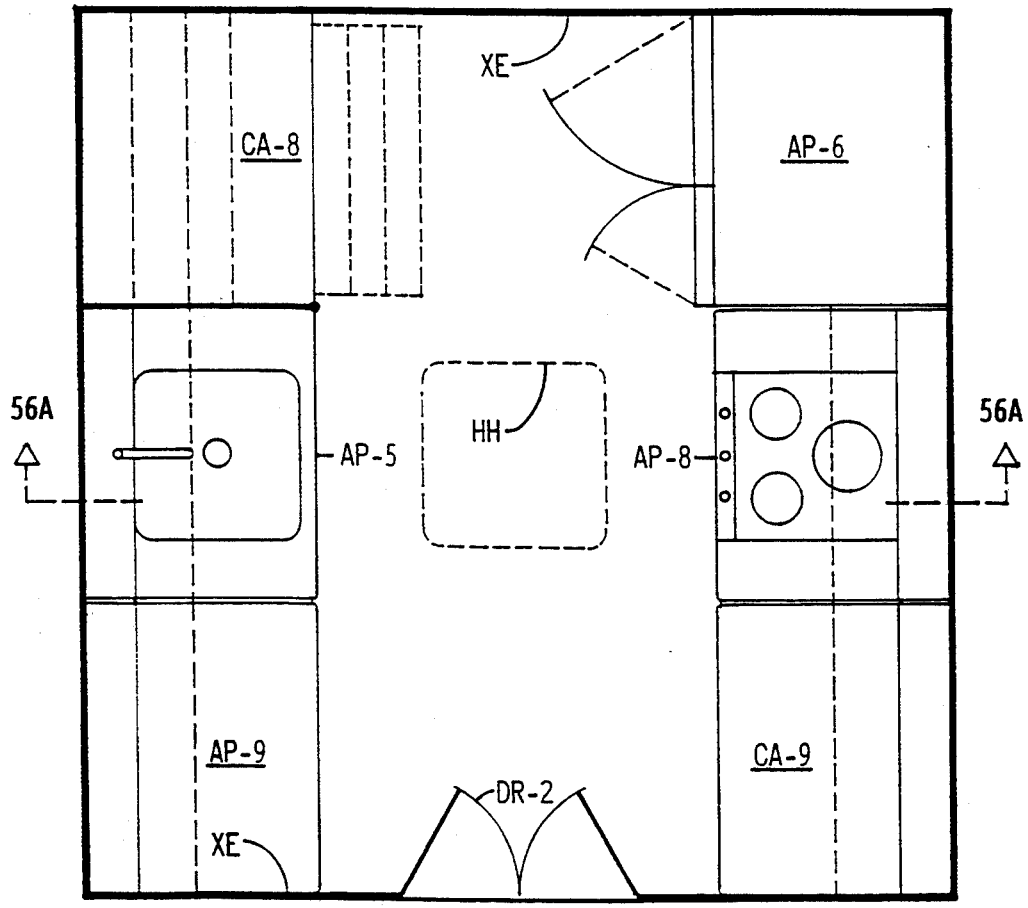
FIG. 56B is a top plan view of a horizontally disposed hexagonal building module of this invention equipped as a kitchen.

FIGS. 56A and 56B depict a horizontally disposed building module X equipped to function as a kitchen. An optional window WW is provided within the rear wall XE and a door DR-2 is provided in the front wall XE. A cabinet CA-8 comprised of shelves above and drawers below a countertop, provided adjacent the rear wall XE functions as a pantry. Disposed opposite the pantry cabinet CA-8 is a refrigerator/freezer unit AP-6. Centrally disposed midway between the front and rear walls XE is a large kitchen sink and disposer unit AP-5 opposite which is a range and oven AP-8. Flanking the door DR-2 is a dishwasher AP-9 and a base cabinet CA-9. Disposed above the cooktop AP-8 and oven AP-8' is a exhaust fan/duct wall cabinet AP-7. A cabinet CA-7 is located above the sink and disposer unit AP-5. The kitchen cabinets, appliances and the like have a width and depth which is the same enabling these units to be interchangeably located within the module.

Figure 57A:
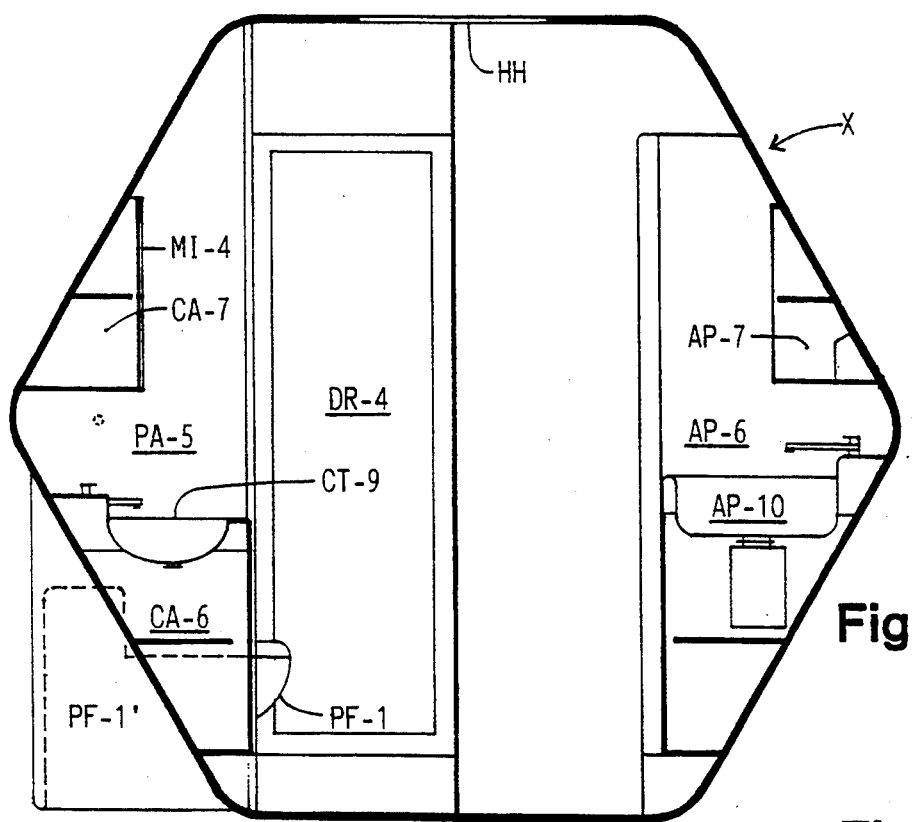
FIG. 57A is a vertical cross-sectional view along lines 57A—57A of FIG. 57B.
Figure 57B:
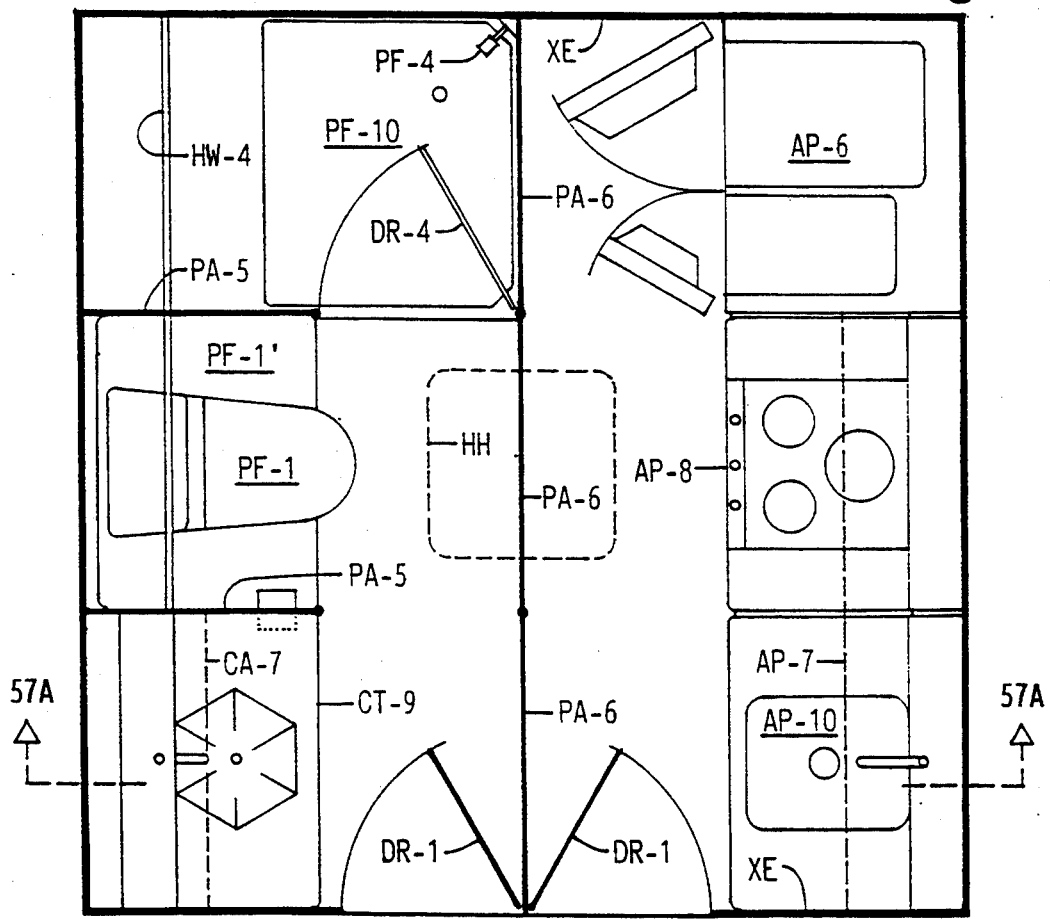
FIG. 57B is a top plan view of the hexagonal building module of this invention with its longitudinal axis of symmetry disposed horizontally which is equipped as a combination small bathroom and small kitchen.

FIGS. 57A and 57B depict a combination bath and kitchen unit for a horizontally disposed module X. The module includes a vertical divider PA-6 which spans between the front and rear end walls XE. The right hand compartment, which functions as the kitchen, includes a refrigerator/freezer AP-6, a cooktop AP-8 and oven AP-8 with a suitable cabinet and exhaust fan/vent AP-7 positioned above it. A small kitchen sink with disposer unit AP-10 completes the kitchen unit. The bath compartment of the module of FIGS. 57A and 57B includes a shower compartment, having a shower base and drain PF-10, a door DR-4, a towel bar HW-4, and a showerhead PF-4. A commode PF-1 is provided in the center of the bath compartment between a pair of divider panels PA-5. The commode sub-compartment has an extended rear wall section PF-1'. The forward part of the bath compartment includes a lavatory countertop CT-9 with a base cabinet CA-6 below it and a mirrored wall cabinet CA-7 and MI-4 above it. A ceiling hatch HH shared by the two spaces is also provided. The various plumbing fixtures and appliances of the bath and kitchen are sized to be interchangeable.

Figure 58A:
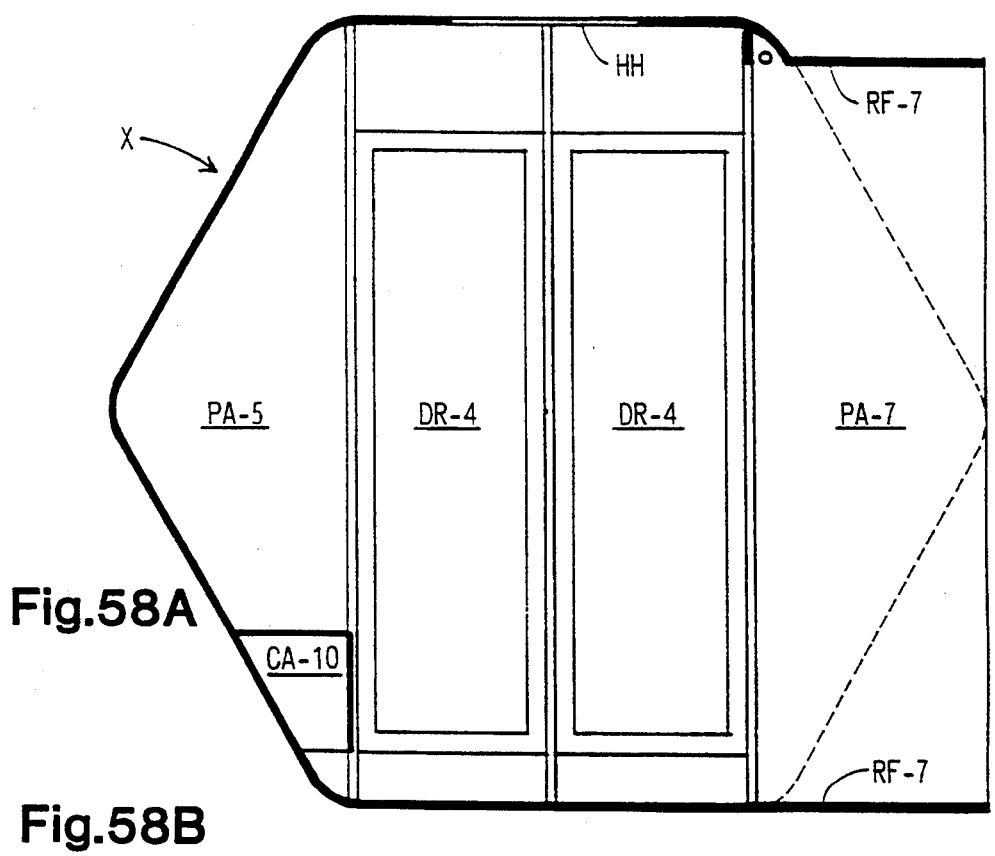
FIG. 58A is a vertical cross-sectional view along lines 58A—58A of FIG. 58B.
Figure 58B:
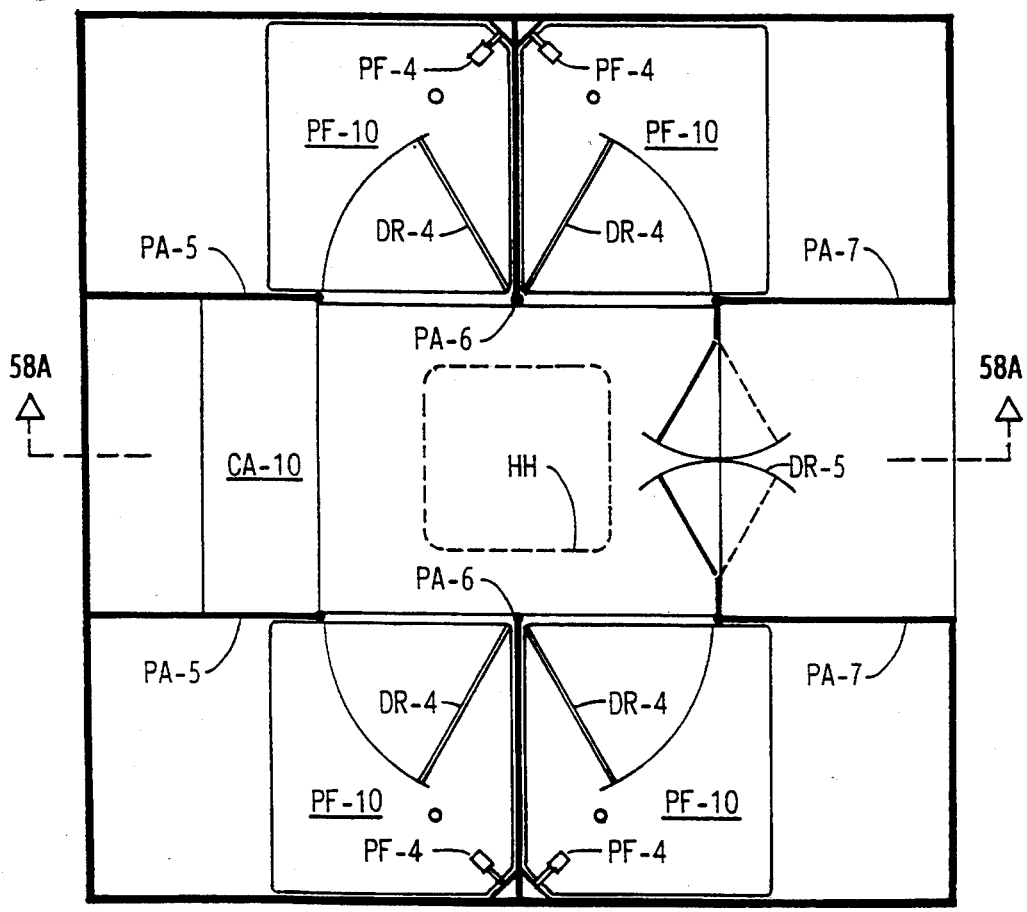
FIG. 58B is a top plan view of the hexagonal building module of this invention with its longitudinal axis of symmetry disposed horizontally and which is provided with a side-entry roof and floor extension panel and equipped with four shower stalls and a dressing area.

FIGS. 58A and 58B depict a shower module having roof and floor extension panels RF-7 and side entry partitions PA-7 between which is located a door DR-5 entering into a central dressing area above which is located a roof hatch HH. A seat CA-10 is located in the central compartment opposite the door DR-5. Communicating with the central compartment accessible via the doors DR-5 are four shower bases PF-10 each having an individual glazed door DR-4, a shower head PF-4 and an appropriate drain. Partitions PA-6 separate the shower compartments and partitions PA-5 separate the central dressing area from the shower compartments located on either side of it.

Figure 59A:
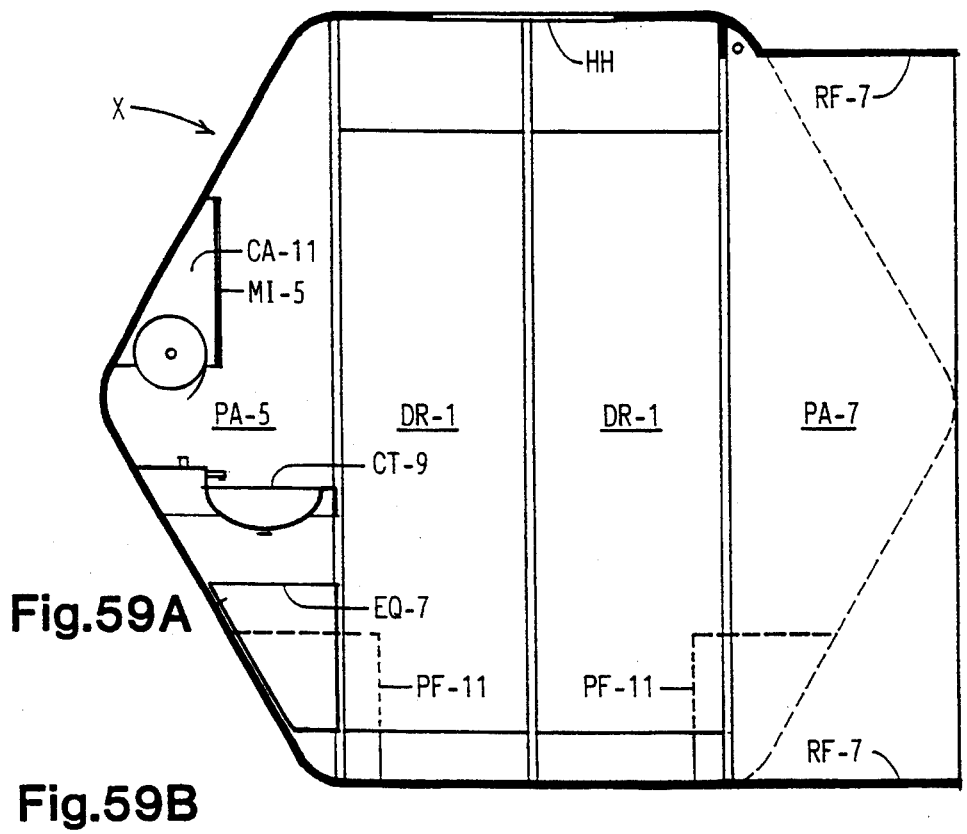
FIG. 59A is a vertically cross sectional view along lines 59A—59A of FIG. 59B.
Figure 59B:
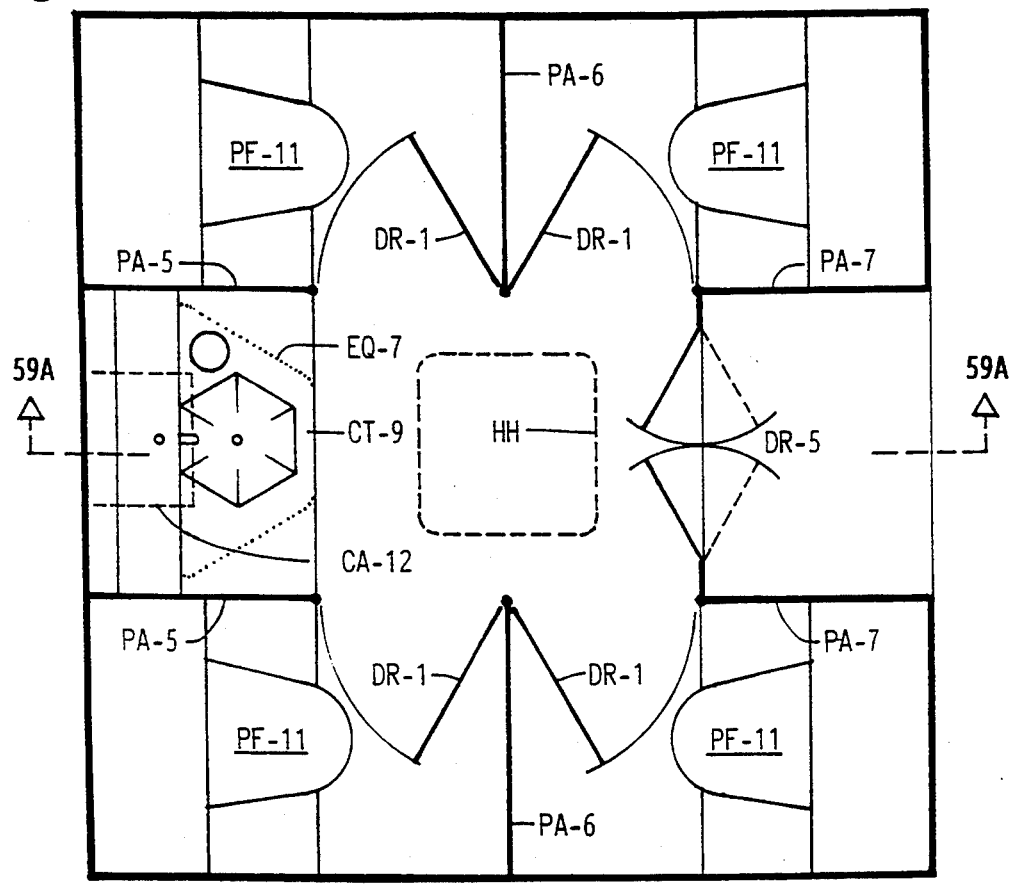
FIG. 59B is a top plan view of the hexagonal building module of this invention with its longitudinal axis of symmetry disposed horizontally which is provided with side-entry roof and floor extension panels and ,equipped with four toilet stalls and a sink.

FIGS. 59A and 59B depict a horizontally disposed module with side entry roof/floor extension panels identical to those of the unit of FIGS. 58A and 58B. However, in the FIGS. 59A and 59B the shower units PF-10 are substituted with commodes PF-11 and the seat CA-10 is substituted with a sink countertop CT-9 having a waste hole therein. A towel cabinet CA-11 with mirror MI-5 is located, above the sink countertop CT-9. A waste bin EQ-7 is located below the countertop CT-9. The commodes PF-11, if desired, can be chemical or pneumatic water-saver toilets or with use of commode housing PF-1' as shown in FIG. 57A, they can be conventional flush commodes. If a building module with two commodes PF-11 and two shower stalls PF-10 is desired, the units are interchangeable.

Figure 60A:
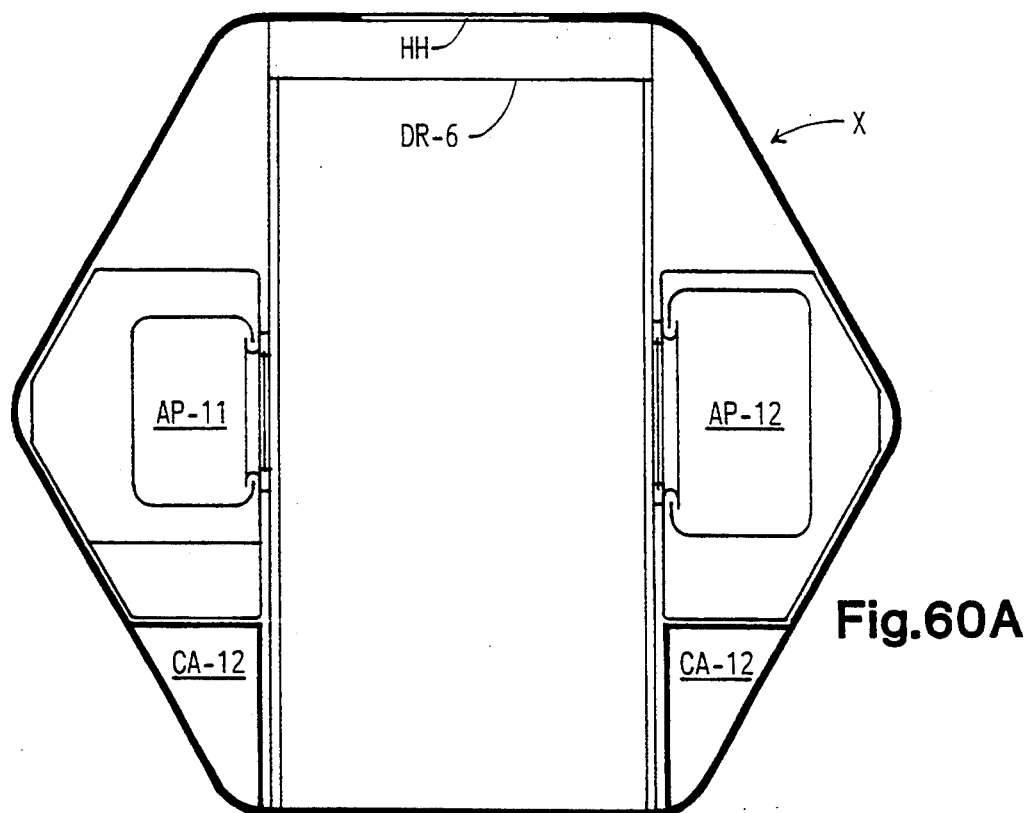
FIG. 60A is a vertical cross-sectional view along line 60A—60A of FIG. 60B.
Figure 60B:
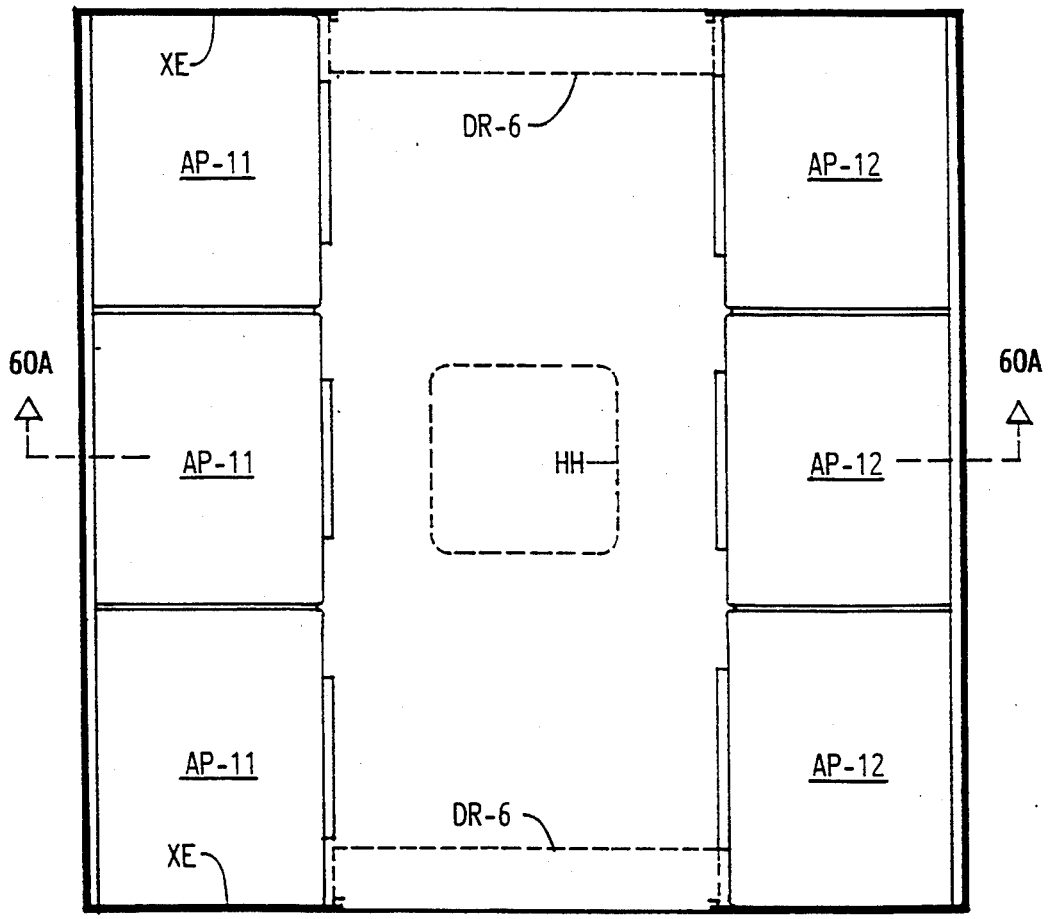
FIG. 60B is a top plan view of the hexagonal building module of this invention with its longitudinal axis of symmetry disposed horizontally which is equipped with washers and dryers to serve as a laundry module.

FIGS. 60A and 60B depict a horizontally disposed building module used as a laundry. The unit includes a rolling door DR-6 in the front end wall XE and a similar optional door in the rear end wall XE. A ceiling hatch HH is also provided. Three washers AP-11 are located side by side on the left portion of the module located above base cabinets CA-12. Three dryers AP-12 are located side-by-side on the right half of the module atop base cabinets CA-12. The washers and dryers are designed to be interchangeable.

Figure 61A:
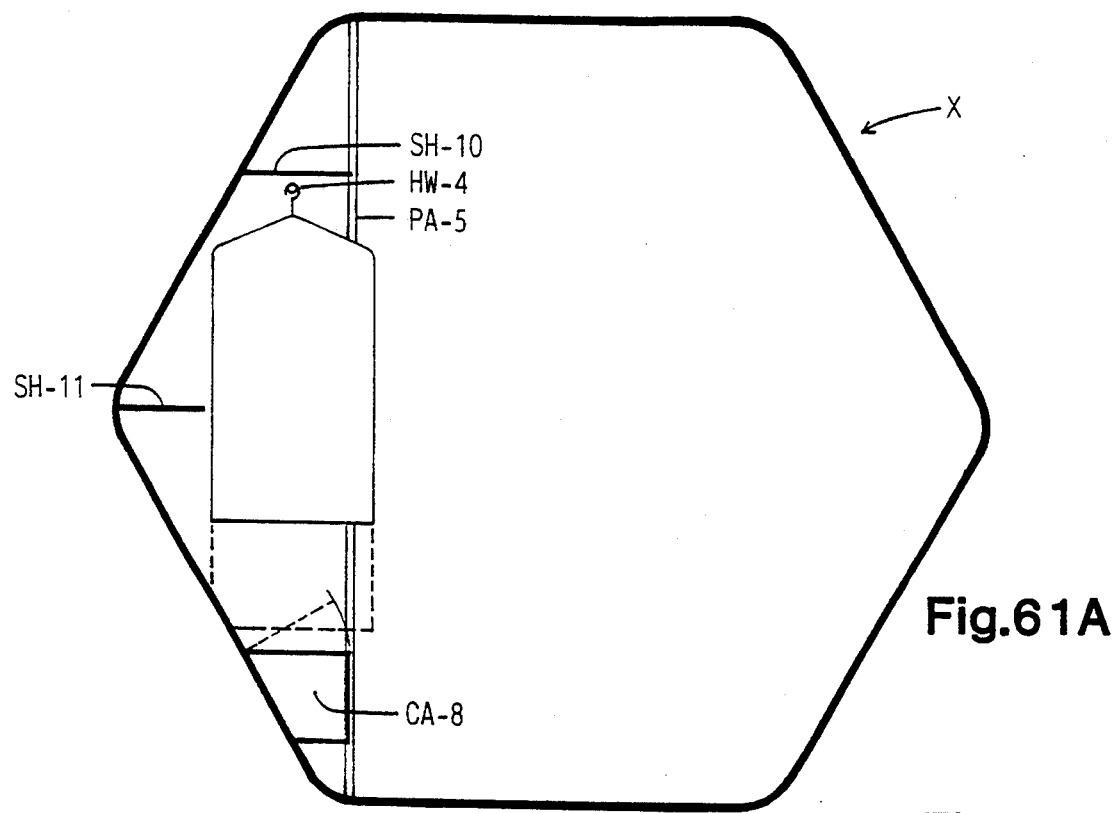
FIG. 61A is a vertical cross-sectional view along line 61A—61A of FIG. 61B.
Figure 61B:
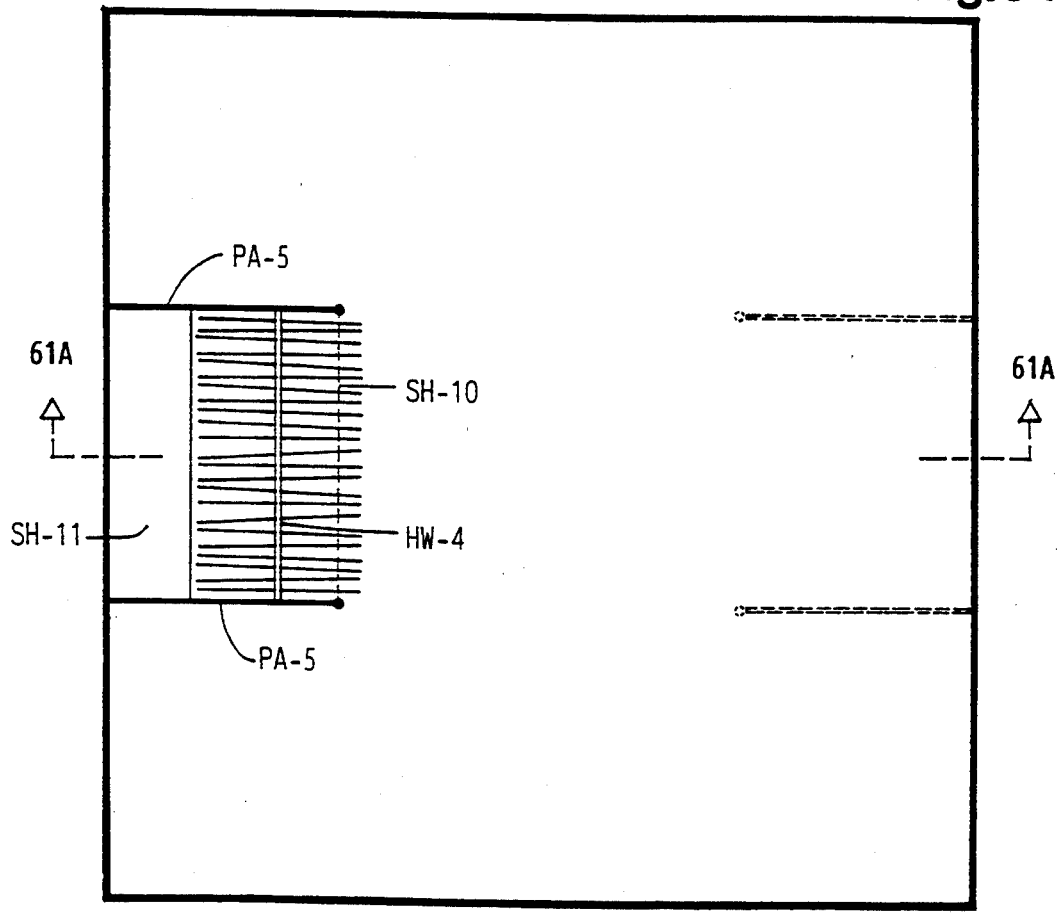
FIG. 61B is a top plan view of the hexagonal building module of this invention with its longitudinal axis of symmetry disposed horizontally which is equipped with a close hanger rod, an upper shelf, and a lower hamper/locker to function as a clothes storage module.

FIGS. 61A and 61B depict a horizontally disposed module configured for storage of clothing. The module includes partitions PA-5 between which spans a horizontally disposed clothes rod HW-4 above which is located a shelf SH-10. Rear horizontal shelf SH-11 is also provided in the closet. Located substantially below the clothes rod HW-4 is a hamper/locker CA-8 having a hinged lid. The remaining compartments of the module of FIGS. 61A and 61B can be provided with clothes storage units of the type just described. If, however, a building module with hanging space for clothing, a lavatory countertop, a commode, a shower stall, a washer and a dryer is desired, the units are interchangeable and will fit in a single module.

Figure 62A:
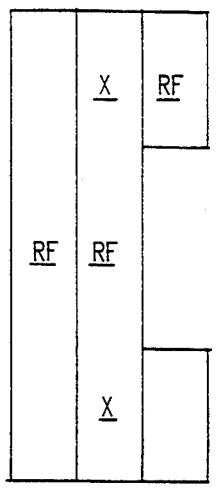
FIG. 62A is a top plan view of a building comprised of two horizontally disposed hexagonal building modules of this invention which are axially spaced from each other on two sides of a central rectangular space which is sheltered by a roof component spanning between the modules.
Figure 62B:
FIG. 62B is a side elevational view of the building of 62A.

FIGS. 62A and 62B depict a building on an appropriate floor slab and foundation FN-5 comprised of two horizontally spaced horizontally disposed modules X which are arranged to have their horizontal axis of symmetry coaxial. A roof component RF spans the modules X and the space between them.

Figure 63A:
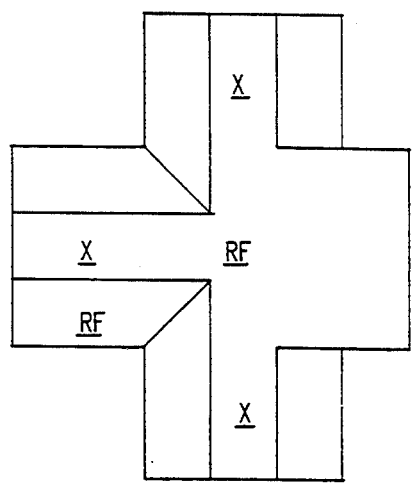
FIG. 63A is a top plan view of a building comprised of three horizontally disposed hexagonal building modules of this invention which are arranged along three sides of a central rectangular space which is sheltered by a roof component spanning between the modules and two associated flat panel walls.
Figure 63B:
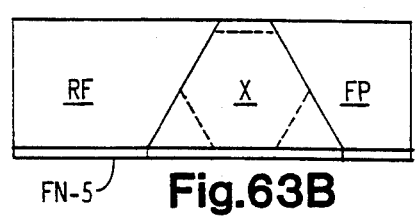
FIG. 63B is a side elevational view of the building of FIG. 63A.

FIGS. 63A and 63B depict a building on an appropriate floor slab and foundation FN-5 comprised of three horizontally disposed modules X. Two of the modules are spaced as shown in FIG. 62A while the third module is oriented 90° with respect thereto. Flat wall panels FP extend forwardly and on either side of the central module X. A roof component RF spans all three modules X panels FP and the space between.

Figure 64A:
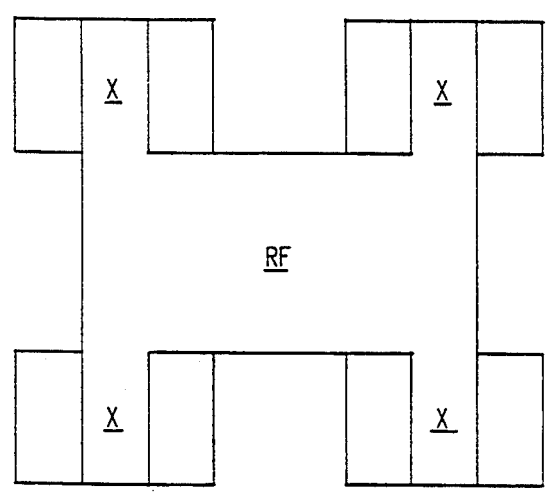
FIG. 64A is a top plan view of of a building comprised of four horizontally disposed hexagonal building modules of this invention which are horizontally spaced from each other at the corners of a central rectangular space sheltered by a roof component spanning between the modules.
Figure 64B:
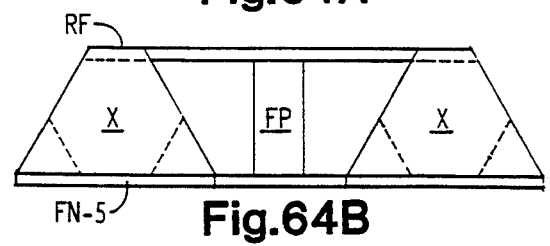
FIG. 64B is a front elevational view of the building of FIG. 64A.

FIGS. 64A and 64B depict a building on an appropriate floor slab and foundation FN-5 comprised of four horizontally disposed modules X which are located at corners of a rectangular space. A roof component RF spans the space and all four modules. Flat panels FP interconnect adjacent pairs of modules X.

Figure 65A:
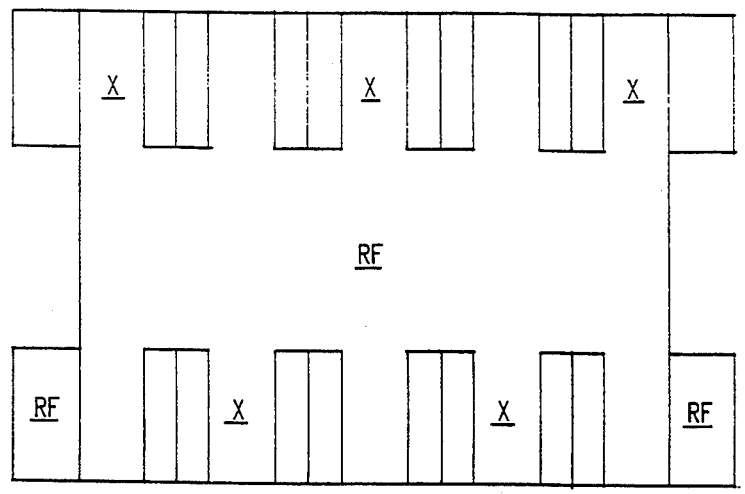
FIG. 65A is a top plan view of a building comprised of ten horizontally disposed hexagonal building modules of this invention placed side by side along each side of a central rectangular space which is sheltered by a roof component spanning between the rows.
Figure 65B:
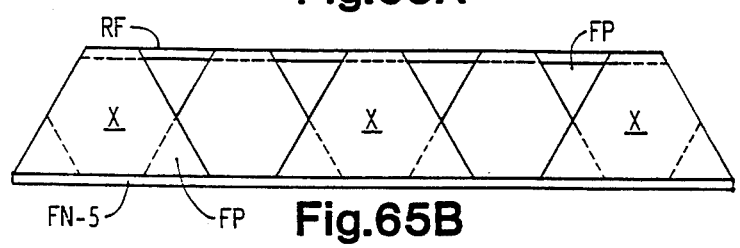
FIG. 65B is a front elevational view of the building of FIG. 65A.

FIGS. 65A and 65B depict a building on an appropriate floor slab and foundation FN-5 comprised of ten horizontally disposed modules X arranged in opposed five-module rows on each side of a central rectangular space. The roof component RF spans all modules X and the central space. The flat filler panels FP interconnect the modules of each array.

Figure 66A:
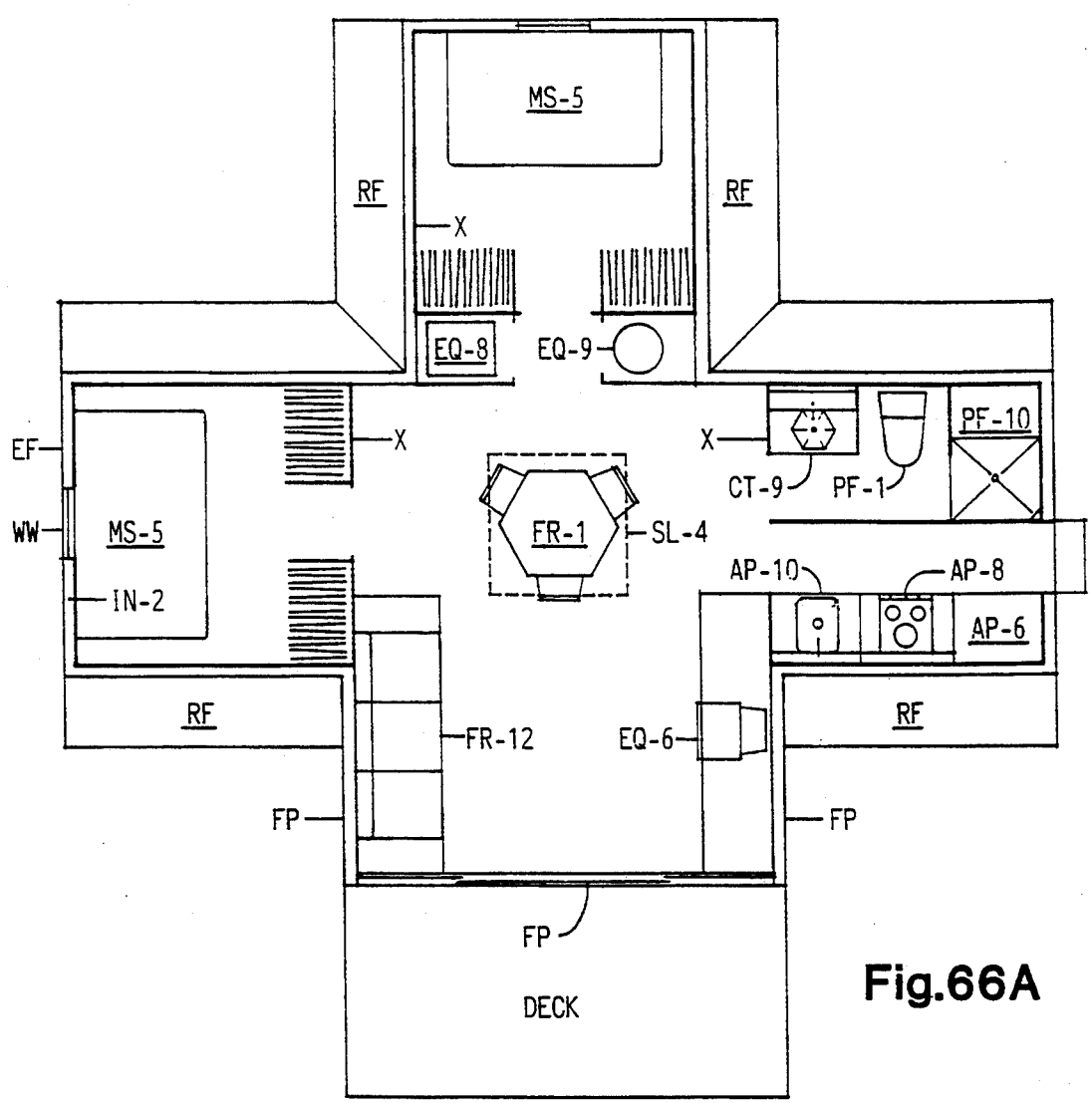
FIG. 66A is a top plan view showing three horizontally disposed hexagonal building modules of this invention ranged generally as shown in FIG. 63A and equipped as a two bedroom cottage.
Figure 66B:
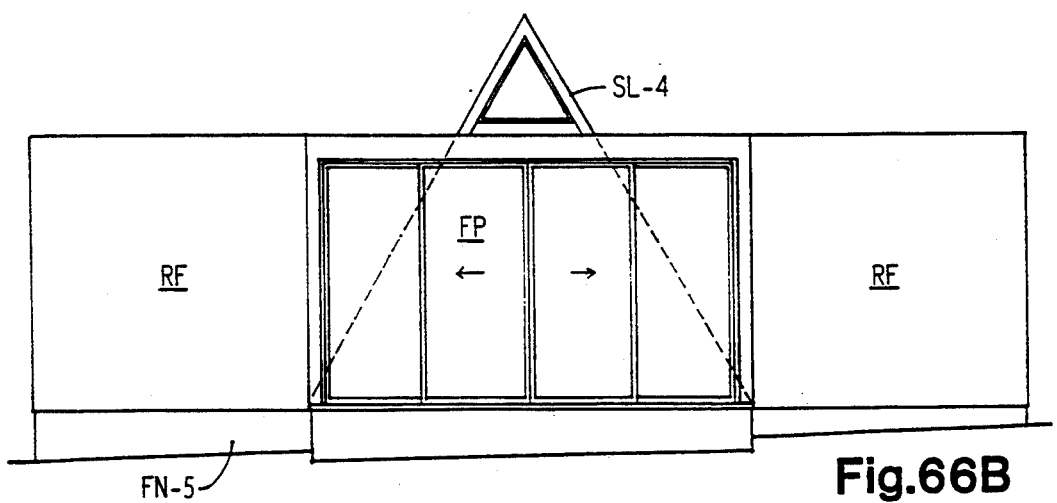
FIG. 66B is a front elevational view of the building of 66A.

FIGS. 66A and 66B depict a building on an appropriate floor slab and foundation FN-5 comprised of three horizontally disposed modules X arranged as described in FIGS. 63A and 63B and equipped as a two-bedroom dwelling with a kitchen/bathroom module X as further described in FIGS. 57A and 57B and two bedroom modules described in FIGS. 53A and 53B. The central space defined in part by end walls of the three modules and in part by flat panel walls FP and a flat roof RF contains living and dining areas equipped with a couch FR-12, a TV EQ-6 and a dining table FR-1 under an optional skylight SL-4. Adjacent spaces contain an HVAC unit EQ-8 and a water heater EQ-9. The structure has an optional deck.

Figure 67A:
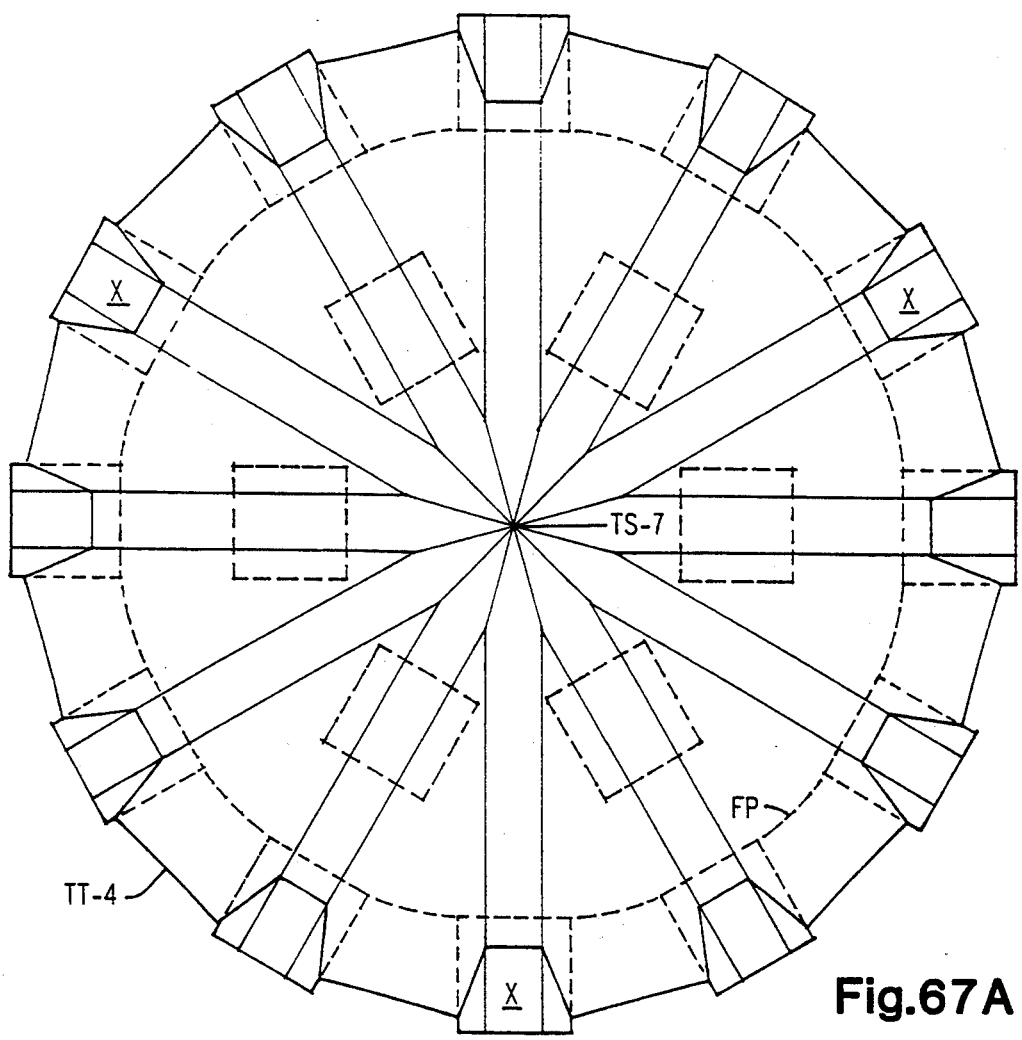
FIG. 67A is a top plan view of a building comprised of a plurality of horizontally disposed hexagonal building modules of this invention arranged in a generally concentric circular array with their longitudinal axes of symmetry being radially disposed, the array then being sheltered by a tent-top.
Figure 67B:
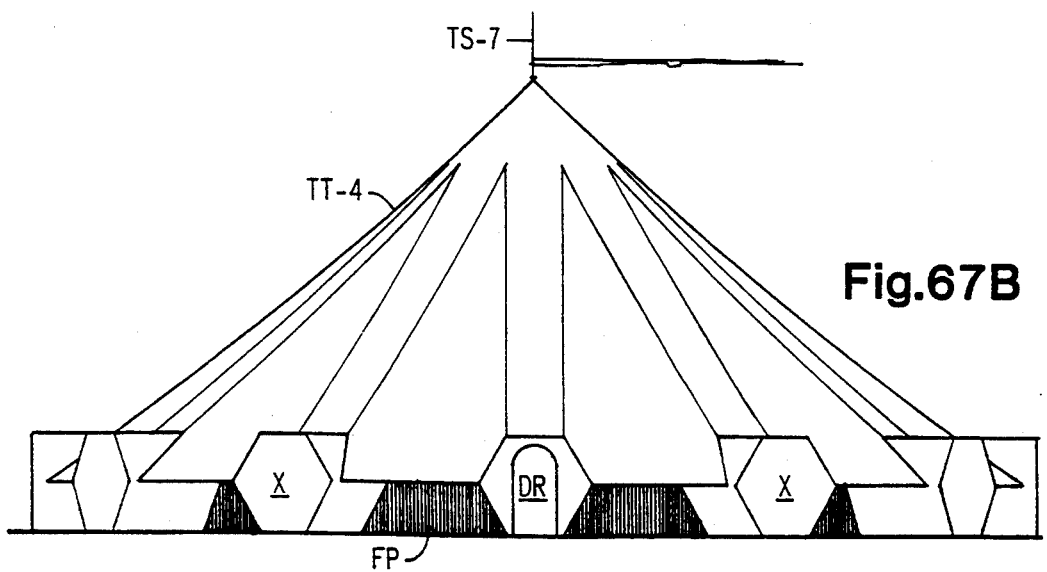
FIG. 67B is a front elevational view of the building of 67A.
Figure 69A:
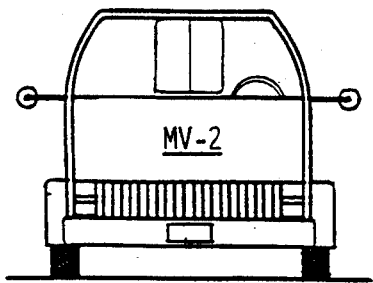
FIG. 69A is a front elevational view of a truck having a bed contoured for mounting horizontally disposed hexagonal building modules of this invention.
Figure 69B:
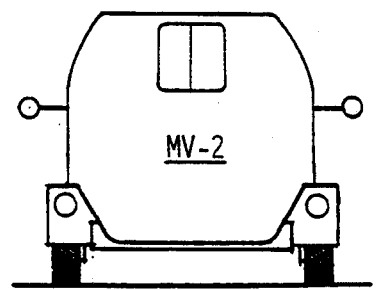
FIG. 69B is a rear elevational view of the truck shown in FIG. 69A having a bed contoured for mounting horizontally disposed hexagonal building modules of this invention.
Figure 69C:
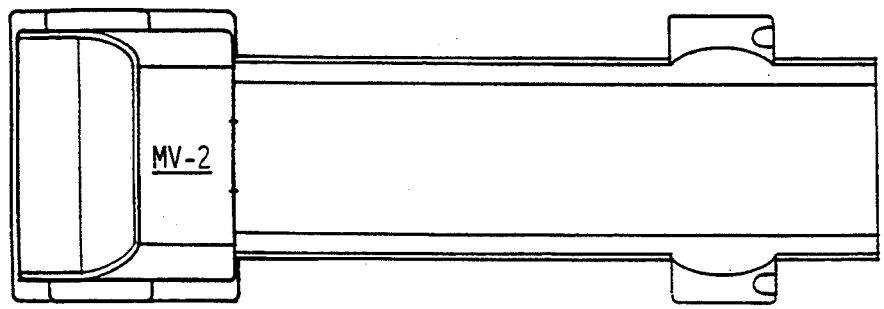
FIG. 69C is a top plan view of the truck shown in 69A and 69B.
Figure 69D:
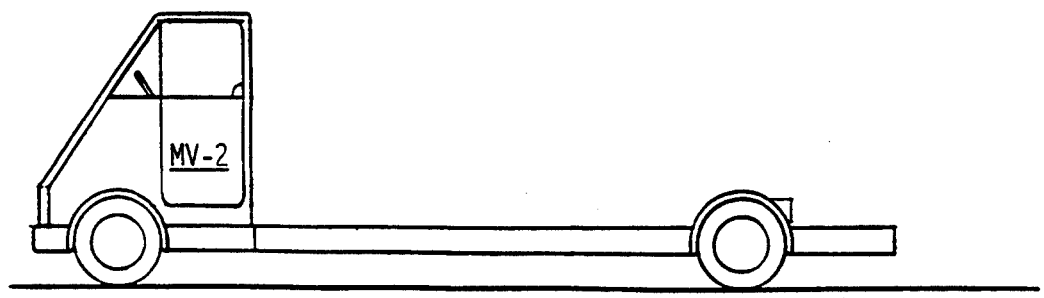
FIG. 69D is a side elevational view of the truck of FIGS. 69A, 69B, and 69C designed to carry the horizontally disposed hexagonal building modules of this invention.
Figure 70A:
FIG. 70A is a front elevational view of a truck having a contoured bed on which is mounted two horizontally disposed hexagonal building modules of this invention equipped for use as a bus.
Figure 70B:
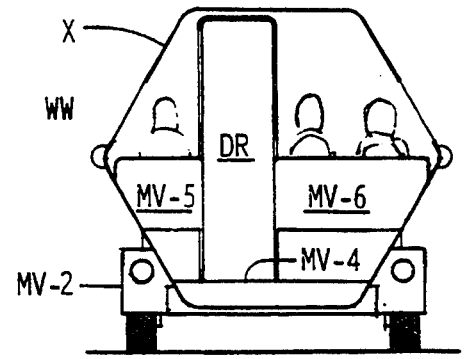
FIG. 70B is a rear elevational view of the truck and horizontally disposed hexagonal building module shown in FIG. 70A.
Figure 70C:
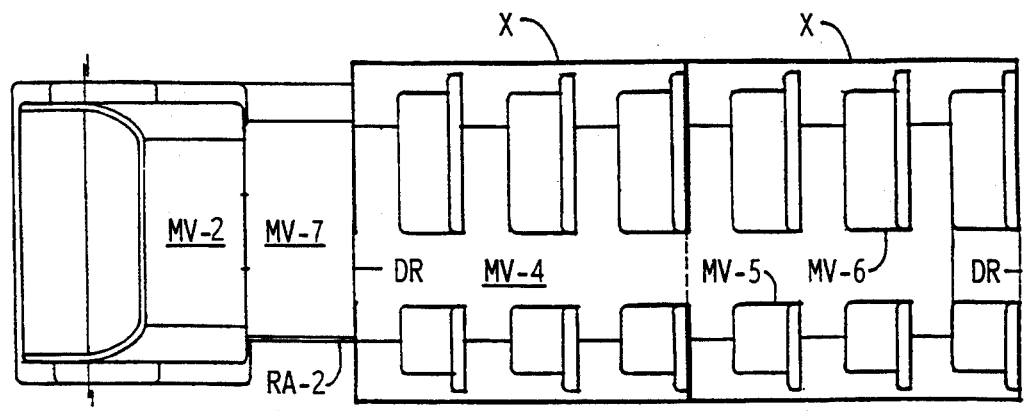
FIG. 70C is a top plan view of the truck/bus in FIGS. 70A and 70B.
Figure 70D:
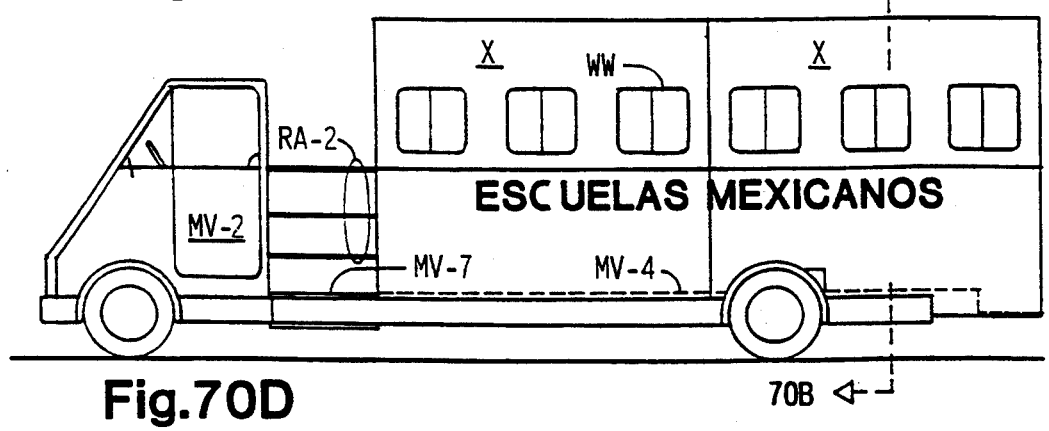
FIG. 70D is a side elevational view of the truck/bus shown in 70A, 70B and 70C.
Figure 71A:
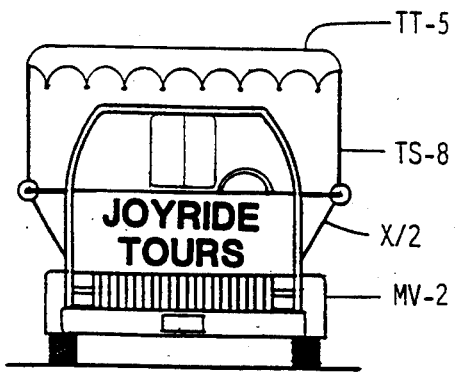
FIG. 71A is a front elevational view of the truck having mounted on its contoured bed the two halves of a horizontally disposed hexagonal building module of this invention which are equipped with seats and a canvas canopy top to function as an open-air tour bus.
Figure 71B:
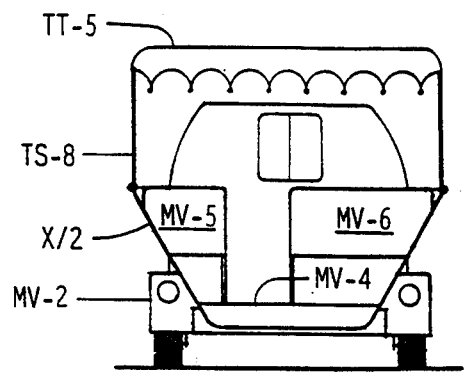
FIG. 71B is a rear elevational view of the truck/tour bus of FIG. 71A.
Figure 71C:
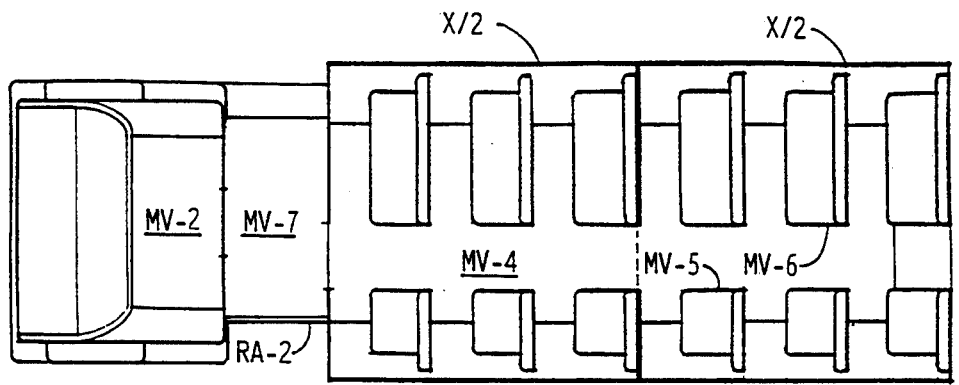
FIG. 71C is a top plan view of the combination truck/tour bus of the FIG. 71A and 71B.
Figure 71D:
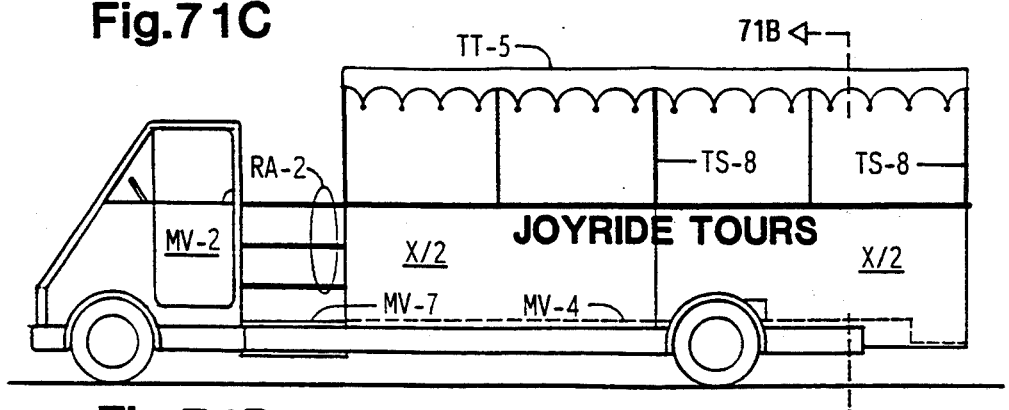
FIG. 71D is a side elevational view of the combination truck/tour bus of FIGS. 71A, 71B and 71C.
Figure 72A:
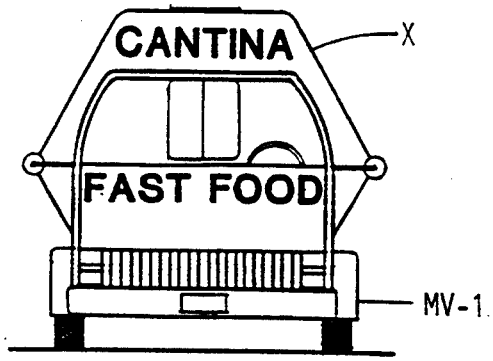
FIG. 72A is a front elevational view of a truck having mounted on its contoured bed a horizontally disposed hexagonal building module of this invention equipped as a mobile food service unit.
Figure 72B:
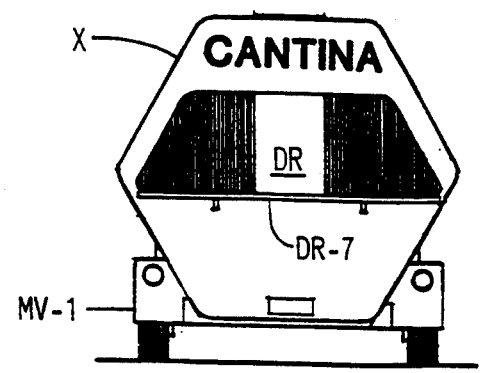
Figure 72C:
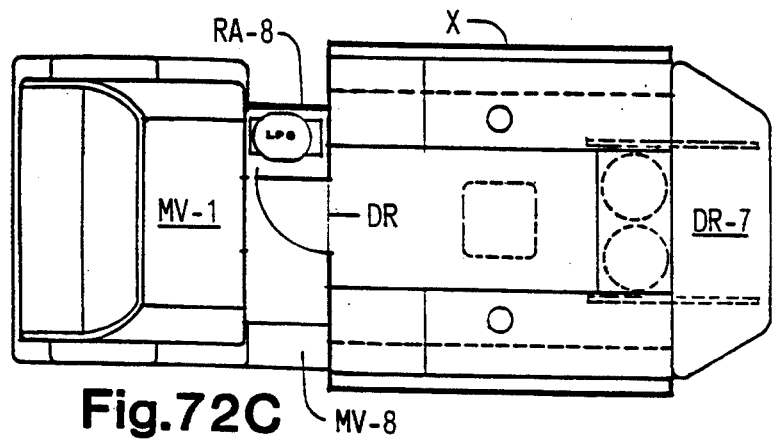
Figure 72D:
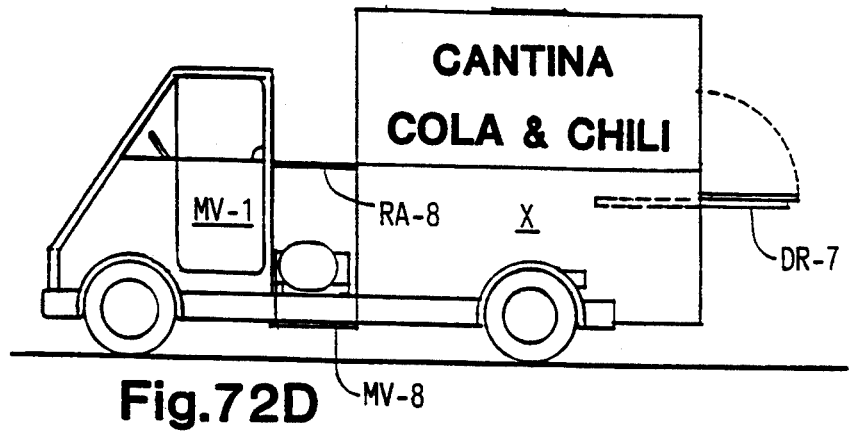
Figure 73A:
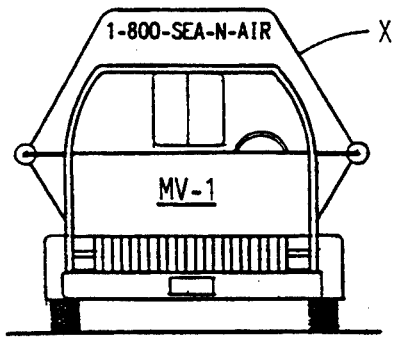
Figure 73B:
Figure 73C:
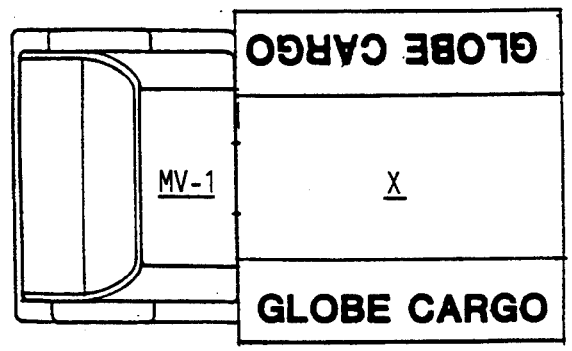
Figure 73D:
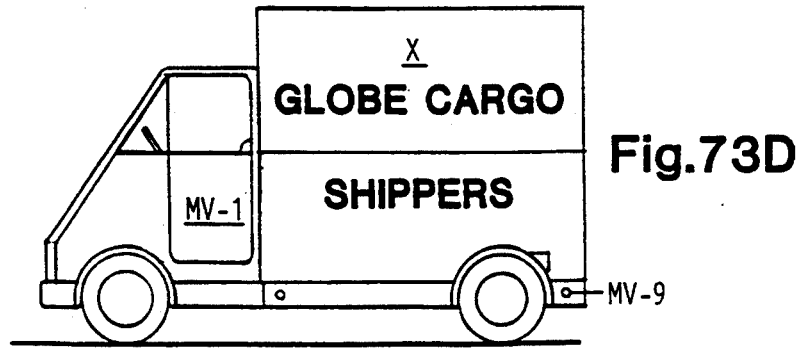
Figure 74:
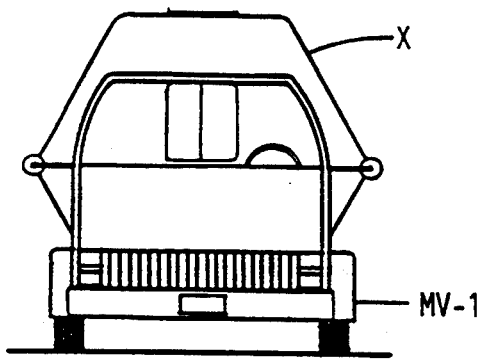
Figure 74:
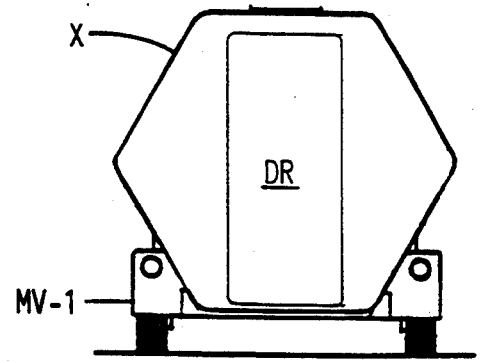
Figure 74:
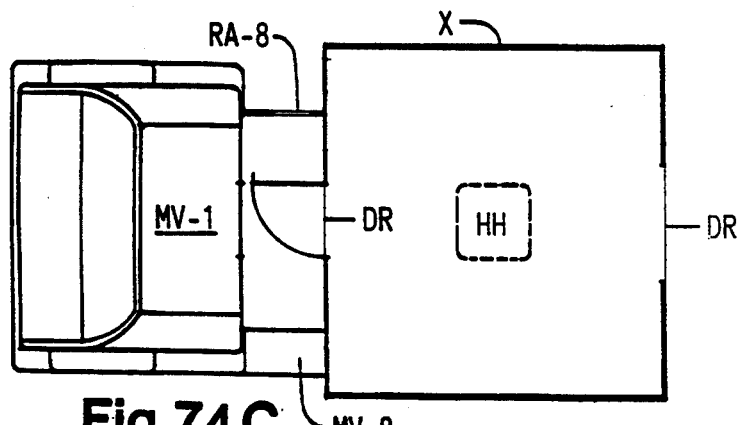
Figure 74:
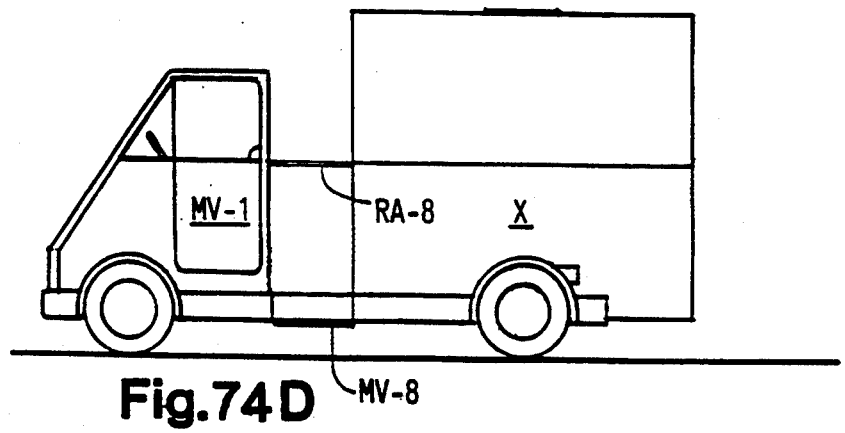

FIGS. 67A and 67B depict a structure comprised of twelve horizontally disposed modules X arranged in a circular configuration with their horizontal axis of symmetry radiating from a common central point. Flat filler panels FP interconnect the various modules X. A tent roof TT-4 supported by a central strut TS-7 shelters the central space which can remain clear or contain additional modules X. Designated modules X with doors DR at each end can serve as entrances and exits as required.

To facilitate moving the horizontal module X should such be desired, a suitable trailer undercarriage TR-1 is provided including a pair of wheels, as shown in FIG. 68A-68D. The axle is configured to center and locate the module X in balanced fashion between the wheels. Suitable fasteners TR-2 secure the undercarriage TR-1 to the bottom panel of the module X. A horizontally disposed tongue or bar extending from below the module can be connected to a hitch provided on the rear of a tow vehicle to enable transport of the module X, as desired. Once at a desired site as shown in FIG. 68C, the mobile building module X can be supported in a stationary balanced position shown in FIG. 68D, by appropriate foundation piers or blocks FN-21 located below the bottom panel, first under the right end of the module X and then, after the trailer TR-1 has been pulled to the left, under the left end of the module X. The trailer can then be removed entirely from beneath the module X. Rollers TR-3 provided on the undercarriage of the trailer TR-1 facilitate convenient sliding removal of the trailer TR-1 from beneath the module X once the module is supported by the blocks FN-2. Stakes FN-1 through holes TR-4 in the module floor can be used to secure the module to the ground. The above procedure, in reverse, can subsequentially be used to load the module on the trailer again.

FIGS. 69A-69D depict a long-bed truck MV-2 having a low road clearance and a contoured bed between the rear wheels thereof which is configured to snugly embrace a pair of modules X disposed end-to-end.

FIGS. 70A-70D depict the long-bed truck MV-2 having a contoured bed supporting two horizontally disposed modules X arranged in end-to-end relation with a space between the truck cab and the forward module. Both end walls XE of each module X is provided with a door opening DR. Located between the door DR of the forward most module X and the cab of the truck MV-2 is a reversible raised floor panel and step MV-7. A set of horizontally disposed vertically spaced rails RA-2 is located along the side of the floor panel/step MV-7 opposite the step. Inside the modules X are provided with a raised floor panel MV-4 and with bus seats MV-5 and MV-6 separated by an aisle. Windows WW at the ends of each row of seats provide natural light and views.

FIGS. 71A-71D depict a bus configuration similar to that of FIGS. 70A-70D except the upper half of each horizontally disposed module X is removed and in its place is substituted a canvas canopy roof TT-5 supported by strut-bows TS-8. The bus configuration of FIGS. 71A-71D provides an "open air" bus for sightseeing purposes.

FIGS. 72A-72D depict a horizontally disposed module X mounted on a short-bed truck MV-1 which is configured to serve as a mobile food service unit. The rear end panel of the module X is provided with a panel DR-7 hinged along its lower edge. In the horizontal position the hinged panel DR-7 functions as a countertop. In its vertical position it closes the opening in the end wall. A floor panel and step MV-8 is provided in the space between the front end wall of the module X and the rear of the cab. A rail assembly RA-8 is provided at one end of the floor panel and step component MV-8 on which an LPG tank may be provided if needed. The interior of the module X is equipped in any desired way to facilitate the storage, preparation and service of food.

FIGS. 73A-73D depict a horizontally disposed module X mounted to the contoured bed of a short-bed truck MV-1. In the configuration shown in these Figures, module X is used as a land-sea-air cargo container. Quick disconnecting bolts MV-9 on each side of the contoured truck bed secure module X containers to the truck and facilitate loading and unloading.

A horizontally disposed module X, as shown in FIGS. 74A-74D, may be mounted on a short bed truck MV-1 and provided with doors DR in the front and rear end panels thereof for use as a van or for other purposes. If desired a hatch HH can be provided in the roof. Located between the forward end of the module X and the rear of the cab is a reversible step/floor panel component MV-8 and rail set RA-8.

As shown in FIGS. 75A and 75B the horizontally disposed modules X can be configured as pontoons of a catamaran-type marine vessel. As shown in this Figure, four modules X are provided in spaced coaxial pairs. At the forward end tapered bow fairings CC-7 are provided and function as lockers having deck hatches. A suitable deck panel. CC-10 spans the bow fairings CC-7 to provide a foredeck and a gangway panel CC-11 can be deployed to port or starboard. A rail RA-11 is associated with the fore deck CC-10 for safety purposes. Forward and rear central deck panels CC-9 with scupperholes along their edges span the forward pair of modules X and the rearward pair of modules X. Located in the space between the forward pair of modules and the rearward pair of modules, short entry modules CC-1 each side, a transversely disposed deck and three steps each side make it is possible to enter the forward end of the rear modules and the rear end of the forward modules. A suitable canopy TT-6, supported by strut-bows TS-9, shelters these entrances and the helm CC-12. Each module X can be provided with windows WW and hatches HH.

Stern fairings CC-8, which serve as fuel tanks, are provided at the rear end of the rear pair of modules X. The stern fairings are provided with a transverse deck, a transom bar CC-6 spans the rear of the stern fairings CC-8 to facilitate mounting of a pair of outboard engines CC-5 for propelling the boat. A steering pedestal CC-12 is conveniently located between the rear pair of modules X extending upwardly from the deck panel CC-9 disposed therebetween. The modules can carry appropriate cargo or can be provided with seats SE-6 running fore and aft along each side of each module for passengers. Transverse beams CC-3 connect, athwarship, the ends of each module X and longitudinal beams CC-4 run full length from the transom bar CC-6 forward along the inside of each pontoon.

The canopy TT-6 is supported by struts TS-9. Horizontally disposed splice panels CC-2 span the forward entry and rear modules at the top and the bottom of each pontoon. Appropriate handrails RA-9 and RA-10 are provided in the entry module along each side of each passenger compartment. Appropriate rub-rails CC-13 protect the hull along each side of the craft.

FIGS. 76A, 76B and 76C depict an airplane having a fuselage designed for the suspension of several modules X for air cargo purposes. FIGS. 76B and 76C depict top and side views of the airplane with no horizontally disposed modules suspended from the fuselage.

FIGS. 77A and 77B depict top and side views of the airplane showing three horizontally disposed modules suspended end-to-end from the fuselage. In the top plan view of FIG. 77A, the middle module $X_2$ is obscured by the wing.

From the foregoing description of the various figures, it is seen that the hexagonal building module X of this invention is susceptive of a wide variety of applications such as a living space, cargo space, working space, and/or storage space, whether disposed with its axis vertical or horizontal and whether used alone or in conjunction with other modules X; that it has great inherent strength in resistance to vertical torsional and horizontal loads and in resistance to damage of its contents or human occupants by weather, insects, rodents, marauding animals, thieves or earthquakes; that it is optimum in size for the applications shown and for over-the-road transport without special permits; that it is optimum in weight for handling by small crews of workers with a minimum of heavy equipment or none at all.

The following is a key to the drawing notations:

| | |
|---|---|
| AA/ | aircraft component |
| AP/ | appliance |
| BB/ | bed base |
| BT/ | beam or truss line |
| CA/ | cabinet |
| CC/ | watercraft component |
| CT/ | countertop |
| DR/ | door, including frame, threshold, hinges and appropriate hardware |
| DR-0/ | doorway & frame only (no door) |
| DR-1/ | single swing |
| DR-2/ | double swing |
| DR-X/ | special door |
| DS/ | downspout |
| EF/ | exterior finish (EIFS type assumed - could be most anything) |
| EL/ | elevator component |
| EQ/ | equipment |
| FF/ | special floor finish (carpet or other appropriate finish assumed) |
| FG/ | floor grate, for drainage |
| FN/ | foundation component |
| FP/ | flat wall panel (solid, glazed, ½ or ⅓, with or without doorway) |
| FR/ | furniture item |
| HH/ | hinged hatch, whether in roof or sidewall area |
| IN/ | insulation |
| IN-1/ | rigid |
| IN-2/ | loose fill |
| IN-3/ | foamed in place |
| LR/ | ladder |
| LV/ | ventilation louver |
| MI/ | mirror |
| MV/ | truck component |
| PA/ | partition |
| PF/ | plumbing fixture (toilets can be conventional, chemical or electric) |
| RA/ | railing |
| RD/ | revolving door component |
| RG/ | roof gutter |
| RF/ | roof component |
| RR/ | refrigeration component |
| SB/ | spacer blocks (to allow for gutters) |
| SE/ | seat |
| SH/ | shelf |
| SL/ | skylight |
| SP/ | spiral stair component |
| SR/ | splice ring (to interconnect stacked modules) |
| ST/ | stair component |
| TS/ | tent strut |
| TT/ | tent top |
| TR/ | trailer component |
| WW/ | window of any appropriate size or kind |
| X/ | the entire hexagonal building module including ends and membranes |
| XE/ | end panels including membranes |
| XD/ | details of X construction |
| XEL/ | smaller x for elevator cab and freezer interior |
| XPW/ | phone booth core (wall only) |
| XSW/ | spiral stair well (wall only) |
| XVW/ | vent shaft (wall only) |
| XW/ | hexagonal wall (only) whether integral or fabricated |
| XWA/ | individual panel for fabricated hexagonal wall construction (C-style) |
| XWB/ | individual panel for fabricated hexagonal wall construction (J-style) |
| XWC/ | integral spiral wound hexagonal wall (only) |

What is claimed is:

1. A panel for use in constructing hexagonal building modules, comprising:

a rectangular unitary sheet of substantially uniform predetermined thickness measured between parallel inner and outer panel faces and having a predetermined length and a predetermined width, said panel having first and second parallel vertical edges extending between upper and lower edges of said panel and spaced apart from each other by a distance equal to the width of said panel, said upper and lower edges being spaced apart from each other by a distance equal to the length of said panel, said first and second vertical edges having internal and external rabbet, respectively, along the lengths thereof, the internal and external rabbets of the panel extending horizontally between said first and second vertical panel edges, respectively, and first and second shoulders, respectively, disposed parallel to said first and second edges and extending along the length thereof, to enable the formation of lap joints between contiguous vertical edges of adjacent panels when six of said panels are configured to form a hexagonal building module, said panel further including a smoothly curving corner section extending vertically along the length of said panel, said curved corner section subtending an arc of approximately 60° measured in a horizontal plane perpendicular to said panel, said curved section extending horizontally between one of said first and second shoulders and an imaginary line spaced through an arc of 60° from said one shoulder toward the other of said first and second shoulders, said panel additionally including a remaining section extending vertically along the length of said panel between said corner section and the other of said internal and external rabbet-defining first and second shoulders, said remaining section being integral with said corner section and substantially flat to define a flat section substantially larger in size than said curved section, said predetermined length of said sheet at least as great as the approximate height of an average adult person.

2. A panel for use in constructing hexagonal building modules, comprising:

a rectangular unitary sheet of substantially uniform predetermined thickness measured between parallel inner and outer panel faces and having a predetermined length and a predetermined width, said panel having first and second parallel vertical edges extending between upper and lower edges of said panel and spaced apart from each other by a distance equal to the width of said panel, said upper and lower edges being spaced apart from each other by a distance equal to the length of said panel, said first and second vertical edges having internal and external rabbets, respectively, along the lengths thereof, the internal and external rabbets of the panel extending horizontally between said first and second vertical panel edges, respectively, and first and second shoulders, respectively, disposed parallel to said first and second edges and extending along the length thereof, to enable the formation of lap joints between contiguous vertical edges of adjacent panels when six of said panels are configured to form a hexagonal building module, said panel further including a flat central rectangular section disposed between first and second smoothly curved sections extending vertically along the length of said panel, each said curved section including one of said rabbets and extending inwardly to an imaginary line at the junction of the curved section and the flat central section, the arc subtended between each imaginary line and the center of the respectively associated rabbet on each side of the panel is approximately 30°, said flat central section located between said curved sections being integral with said curved sections and substantially larger in size than said curved sections, said predetermined length of said sheet being at least as great as the approximate height of an average adult person.

3. The panel of claim 1 or claim 2 wherein said predetermined length is approximately 8', said predetermined width is approximately 4' and said predetermined thickness is approximately ¾", and said corner section has a radius of approximately 6".

4. The panel of claim 1 or claim 2 wherein said panel is fabricated of plywood.

5. The panel of claim 1 or claim 2 wherein said internal and external rabbets have a width measured between their respective shoulders and vertical panel edges of approximately 1½".

6. The panel of claim 1 or claim 2 wherein said rectangular sheet of predetermined thickness comprises inner and outer sheets secured together in face-to-face relationship, the individual thickness of the inner and outer sheets collectively equaling said predetermined thickness, said inner and outer sheets being offset horizontally with respect to each other in the direction of their widths to define said internal and external rabbets, the lengths of said inner and outer sheets being substantially equal and their respective upper and lower edges being in registration to define said upper and lower edges of said rectangular sheet of predetermined thickness and predetermined length.

7. The panel of claim 1 or claim 2 wherein said internal and external rabbets have vertically spaced through-holes formed therein, with the holes in said inner and outer rabbets being positioned such that, when two panels are positioned with an outer rabbit of one overlapping an inner rabbit of the other and their respective shoulders and edges in abutment to form a lap joint, the holes of the overlapping inner and outer rabbets will be in alignment for receiving fasteners to secure the adjacent panels at the lap joint.

8. The panel of claim 1 or claim 2 wherein said predetermined length exceeds the height of an average adult person by approximately 2 to 3 feet.

9. A hexagonal building module, comprising:

six substantially identical unitary rectangular panels each including a rectangular unitary sheet of substantially uniform predetermined thickness measured between parallel inner and outer panel faces and having a predetermined length and a predetermined width, said panel having first and second parallel vertical edges extending between upper and lower edges of said panel and spaced apart from each other by a distance equal to the width of said panel, said upper and lower edges being spaced apart from each other by a distance equal to the length of said panel, said first and second vertical edges having internal and external rabbet, respectively, along the lengths thereof, the internal and external rabbets of the panel extending horizontally between said first and second vertical panel edges, respectively, and first and second shoulders, respectively, disposed parallel to said first and second edges and extending along the length thereof, to enable the formation of lap joints between contiguous vertical edges of adjacent panels when six of said panels are configured to form a hexagonal building module, said panel further including a smoothly curving corner section extending vertically along the length of said panel, said curved corner section subtending an arc of approximately 60° measured in a horizontal plane perpendicular to said panel, said curved section extending horizontally between one of said first and second shoulders and an imaginary line spaced through an arc of 60° from said one shoulder toward the other of said first and second shoulders, said panel additionally including a remaining section extending vertically along the length of said panel between said corner section and the other of said internal and external rabbet-defining first and second shoulders, said remaining section being integral with said corner section and substantially flat to define a flat section substantially larger in size than said curved section, said predetermined length of said sheet at least as great as the approximate height of an average adult person, said panels being disposed vertically in horizontal juxtaposition to form a hexagonal building module having an upper module end and a lower module end with the internal and external rabbets of a given panel aligned in substantial overlapping confronting relationship with the external and internal rabbets, respectively, of the contiguous adjacent panels disposed on opposite sides of said given panel to form lap joints, fastening means for fastening together the lapped edges of contiguous adjacent panels to secure said panels together at said lap joints to form said six panels into an hexagonal building module collectively having six of said relatively large substantially flat sections collectively separated by six of said curved corner sections, and the height of said building module measured vertically and the diameter of said building module measured horizontally being approximately equal to each other, with said height being at least as much as the approximate height of an average adult person.

10. A hexagonal building module, comprising:

six substantially identical unitary rectangular panels each including a rectangular unitary sheet of substantially uniform predetermined thickness measured between parallel inner and outer panel faces and having a predetermined length and a predetermined width, said panel having first and second parallel vertical edges extending between upper and lower edges of said panel and spaced apart from each other by a distance equal to the width of said panel, said upper and lower edges being spaced apart from each other by a distance equal to the length of said panel, said first and second vertical edges having internal and external rabbets, respectively, along the lengths thereof, the internal and external rabbets of the panel extending horizontally between said first and second vertical panel edges, respectively, and first and second shoulders, respectively, disposed parallel to said first and second edges and extending along the length thereof, to enable the formation of lap joints between contiguous vertical edges of adjacent panels when six of said panels are configured to form a hexagonal building module, said panel further including a flat central rectangular section disposed between first and second smoothly curved sections extending vertically along the length of said panel, each said curved section including one of said rabbets and extending inwardly to an imaginary line at the junction of the curved section and the flat central section, the arc subtended between each imaginary line and the center of the respectively associated rabbet on each side of the panel is approximately 30°, said flat central section located between said curved sections being integral with said curved sections and substantially larger in size than said curved sections, said predetermined length of said sheet being at least as great as the approximate height of an average adult person, said panels being disposed vertically in horizontal juxtaposition to form a hexagonal building module having an upper module end and a lower module end with the internal and external rabbets of a given panel aligned in substantial overlapping confronting relationship with the external and internal rabbets, respectively, of the contiguous adjacent panels disposed on opposite sides of said given panel to form lap joints, fastening means for fastening together the lapped edges of contiguous adjacent panels to secure said panels together at said lap joints to form said six panels into an hexagonal building module collectively having six of said relatively large substantially flat sections collectively separated by six of said curved corner sections, and the height of said building module measured vertically and the diameter of said building module measured horizontally being approximately equal to each other, with said height being at least as much as the approximate height of an average adult person.

11. The building module of claim 9 or claim 10 further comprising upper and lower substantially uniform thickness flat unitary hexagonal end caps secured at said upper and lower module ends, respectively.

12. The building module of claim 9 or claim 10 wherein each of said six panels has a length measured vertically which is approximately 8', each of said six panels has a width measured horizontally which is approximately 4', and each of said six panels has a thickness which is approximately ¾", said curved corner section of each of said panels has a radius of approximately 6".

13. The building module of claim 12 wherein each of said six panels is fabricated of plywood.

14. The building module of claim 12 wherein said internal and external rabbets have a width measured between their respective shoulders and vertical panel edges of approximately 1½".

15. The building module of claim 9 or claim 10 wherein each of said rectangular sheets of predetermined thickness comprises inner and outer sheets secured together in face-to-face relationship, the individual thickness of the inner and outer sheets collectively equaling said predetermined thickness, said inner and outer sheets being offset horizontally with respect to each other in the direction of their widths to define said internal and external rabbets, the lengths of said inner and outer sheets being substantially equal and their respective upper and lower edges being in registration to define said upper and lower edges of said rectangular sheet of predetermined thickness and predetermined length.

16. The building module of claim 9 or claim 10 wherein said internal and external rabbets have vertically spaced throughholes formed therein, with the holes in said inner and outer rabbets being positioned such that, when two panels are positioned with an outer rabbet of one overlapping an inner rabbet of the other and their respective shoulders and edges in abutment to form a lap joint, the holes of the overlapping inner and outer rabbets will be in alignment for receiving fasteners to secure the adjacent panels at the lap joint.

17. The hexagonal building module of claim 9 further comprising:

a spiral staircase positioned within said module and having an outer helical edge successively traversing the inner panel faces of adjacent panels which define said hexagonal module, and securing means for securing the helical edge of said spiral staircase to said panels proximate the interior faces thereof.

18. The hexagonal building module of claim 9 or claim 10 further comprising at least one window located entirely within the flat section of one of the panels defining said module.

19. The hexagonal building module of claim 9 or claim 10 further comprising at least one door located entirely within the flat section of one of said panels defining said module.

20. The hexagonal building module of claim 9 or claim 10 further comprising at least one window located entirely within the flat section of one of said panels defining said module, and at least one door located entirely within the flat section of another of said panels defining said module.

21. The building module of claim 9 designed for use as a modular latrine and further comprising:
a vertically disposed vent shaft located at the approximate center of the building module, and
at least one commode or urinal located adjacent said central shaft and having a vent connected to vent exteriorly of said building module via said vent shaft.

22. The latrine building module of claim 21 further comprising:
at least one commode and one urinal located adjacent said central vent shaft and being connected to vent exteriorly of said module via said vent,
at least two vertical partitions within said module each having an inner vertical edge disposed proximate said vertical shaft, said two partitions being disposed radially within said module on opposite sides of said commode to separate said commode from said urinal and the remainder of module interior.

23. The building module of claim 22 wherein said partitions each have outer edges with the outer edges of the two partitions being positioned proximate two curved sections located on opposite sides of a flat panel section across from which is located said commode.

24. The building module of claim 9 designed for use as a storeroom, comprising:
a plurality of shelves having inner and outer edges, said shelves being disposed horizontally adjacent said panels with their outer edges proximate the inner faces of said panels and their inner edges facing the center of said module, and
shelf support means for supportingly mounting said shelves in said horizontal disposition adjacent said panels.

25. The building module of claim 9 designed for use as a clothing closet, comprising:
a plurality of clothing hanger rods horizontally disposed parallel to and spaced from different ones of said flat panel sections, and
rod support means for supportingly mounting said clothing hanger rods in said horizontally disposed position parallel to and spaced from said flat panel sections.

26. The clothing closet building module of claim 25 wherein said rod support means comprises vertical dividers disposed radially within said module with the outer vertical edges of different dividers thereof proximate different ones of said corner sections of said panels, said clothing hanger rods being located between said dividers with the opposite ends thereof supportingly attached to said dividers.

27. The building module of claim 9 designed for use as a kitchen module, comprising:
a plurality of kitchen appliances selected from the group consisting of refrigerators, ovens, ranges, and dishwashers, said appliances having generally flat vertical rear walls and being located within said module with their rear walls proximate the flat sections of different panels.

28. The kitchen module of claim 27 further including a sink with said module located proximate the flat section of one of said panels.

29. The kitchen module of claim 27 further comprising:
a roof structure spanning the upper edges of said panels, and
a vented skylight mounted in a suitably configured opening formed in said roof structure.

30. The building module of claim 9 or claim 10 further comprising a roof structure spanning the upper edges of the panels.

31. The building module of claim 9 or claim 10 further comprising a floor structure spanning the lower edges of the panels.

32. A hexagonal building module comprising:
six rectangular unitary sheets of substantially uniform thickness measured between parallel inner and outer panel faces thereof and having a predetermined length and a predetermined width, each panel having first and second parallel vertical edges extending between upper and lower edges of said panel and spaced apart from each other by a distance equal to the width of said panel, said upper and lower edges being spaced apart from each other by a distance equal to the length of said panel, said first and second vertical edges each panel having internal and external rabbets, respectively, along the lengths thereof, the internal and external rabbets of the panel extending horizontally between said first and second vertical panel edges, respectively, end first and second shoulders, respectively, disposed parallel to said first and second edges and extending along the length thereof, wherein lap joints are formed between contiguous vertical edges of adjacent panels, each panel further including a flat rectangular section disposed adjacent at least one smoothly curved section extending vertically along the length of said panel, said curved section extending through an angle of up to 60°, said flat rectangular section located adjacent said curved section being substantially larger in size than said curved section, and said predetermined length of said sheet being at least as great as the approximate height of an average adult person.

33. The building module of claim 30 further comprising a pair of end cads secured to respective ends of said module wherein each end cap includes an outer liquid-impervious membrane secured to an outer surface of each said end cap, each membrane including a portion extending perpendicular to a plane defining each end cap and thereby extending over and sealing against outer surface portions of said six flat panels and said six smoothly rounded corners to form a liquid-impervious seal at junctions formed between said end caps, said flat panels and said smoothly rounded corners.

34. The building module of claim 33 wherein each end cap includes an inner liquid-impervious membrane secured to an inner surface of each said end cap, each membrane including a portion extending perpendicular to a plane defining each end cap and thereby extending over and sealing against inner surface portions of said six flat panels and said six smoothly rounded corners to form a liquid-impervious seal at junctions formed between said end caps, said flat panels and said smoothly rounded corners.

35. A panel for use in constructing hexagonal building modules, comprising:
a rectangular unitary sheet of substantially uniform thickness measured between parallel inner and outer panel faces and having a predetermined length and a predetermined width, said panel having first and second parallel vertical edges extending between upper and lower edges of said panel and spaced apart from each other by a distance equal to the width of said panel, said upper and lower edges being spaced apart from each other by a distance equal to the length of said panel, said first and second vertical edges having internal and external rabbets, respectively, along the lengths thereof, the internal and external rabbets of the panel extending horizontally between said first and second vertical panel edges, respectively, and first and second shoulders, respectively, disposed parallel to said first and second edges and extending along the length thereof, to enable the formation of lap Joints between contiguous vertical edges of adjacent panels when six of said panels are configured to form a hexagonal building module, said panel further including a flat rectangular section disposed adjacent at least one smoothly curved section extending vertically along the length of said panel, said curved section extending through, an angle of up to 60°, said flat rectangular section located adjacent said curved section being substantially larger in size than said curved section, and said predetermined length of said sheet being at least as great as the approximate height of an average adult person.

* * * * *